US012649753B2

(12) United States Patent
Zhang et al.

(10) Patent No.: US 12,649,753 B2
(45) Date of Patent: Jun. 9, 2026

(54) INOSITOL DERIVATIVE AND USE THEREOF

(71) Applicants: SHANGHAI SENHUI MEDICINE CO., LTD., Shanghai (CN); SHANGHAI SHENGDI PHARMACEUTICAL CO., LTD., Shanghai (CN); JIANGSU HENGRUI PHARMACEUTICALS CO., LTD., Lianyungang (CN)

(72) Inventors: Lianshan Zhang, Jiangsu (CN); Jian Huang, Shanghai (CN); Lingjian Zhu, Shanghai (CN); Yinggang Tang, Shanghai (CN); Qi Huang, Shanghai (CN); Jia Meng, Shanghai (CN)

(73) Assignees: Shanghai Senhui Medicine Co., Ltd., Shanghai (CN); Shanghai Shengdi Pharmaceutical Co., Ltd., Shanghai (CN); Jiangsu Hengrui Pharmaceuticals Co., Ltd., Lianyungang (CN)

( * ) Notice: Subject to any disclaimer, the term of this patent is extended or adjusted under 35 U.S.C. 154(b) by 663 days.

(21) Appl. No.: 17/920,736

(22) PCT Filed: Apr. 30, 2021

(86) PCT No.: PCT/CN2021/091548

§ 371 (c)(1),
(2) Date: Oct. 21, 2022

(87) PCT Pub. No.: WO2021/219135

PCT Pub. Date: Nov. 4, 2021

(65) Prior Publication Data

US 2023/0167140 A1 Jun. 1, 2023

(30) Foreign Application Priority Data

Apr. 30, 2020 (CN) ......................... 202010362849.9
Aug. 14, 2020 (CN) ......................... 202010818839.1

(51) Int. Cl.
*C07F 9/09* (2006.01)

(52) U.S. Cl.
CPC .................................... *C07F 9/093* (2013.01)

(58) Field of Classification Search
CPC ....................................................... C07F 9/093
See application file for complete search history.

(56) References Cited

FOREIGN PATENT DOCUMENTS

| | | | | |
|---|---|---|---|---|
| CN | 108367080 A | | 8/2018 | |
| WO | 2017098047 A1 | | 6/2017 | |
| WO | WO-2020058321 A1 | * | 3/2020 | ............. C07F 9/117 |

OTHER PUBLICATIONS

Bartlett "Exploiting Chemical Diversity for Drug Discovery" Edited by Paul A Bartlett and Michael Entzeroth, The Royal Society of Chemistry, 2006, pp. 113-118.*
"Find ETDs Home » Thesis Resources » Find ETDs" Online: "https://ndltd.org/thesis-resources/find-etds/" Accessed Jan. 31, 2023.*
Irwin "ZINC—A Free Database of Commercially Available Compounds for Virtual Screening" J. Chem. Inf. Model. 2005, 45, 177-182.*
Kim "PubChem in 2021: new data content and improved web interfaces" Nucleic Acids Research, 2021, vol. 49, Database issue Published online Nov. 5, 2020.*
STN Registry/Zregistry (CAS Registrysm) Sep. 2016 2 pages.*
Sundaresan, Protein Science (2002), 11:1330-1339.*
McConathy, Prim Care Companion J Clin Psychiatry. 2003; 5(2): 70-73.*
Venkatesh, J. Pharm. Sci. 89, 145-154 (2000) (p. 146, left column).*
J. G. Cannon, Chapter Nineteen in Burger's Medicinal Chemistry and Drug Discovery, Fifth Edition, vol. I: Principles and Practice, Wiley-Interscience 1995, pp. 783-802, 784.*
Konieczny, Org. Biomol. Chem., 2016, 14, 2504-2514.*
Dorwald F. A. Side Reactions in Organic Synthesis, 2005, Wiley: VCH, Weinheim p. IX of Preface p. 1-15.*
Miyamoto, Molecular Pharmaceutics (2013), 10(7), 2723-2729.*
O Nemoto, Bioorg. Med. Chem. Lett. 22 (2012) 6425-642.*
Joan Perello et al., First-time-in-human randomized clinical trial in healthy volunteers and haemodialysis patients with SNF472, a novel inhibitor of vascular calcification, British Journal of Clinical Pharmacology, 2018, vol. 84, pp. 2867-2876 (10 pages).
Joan Perello et al., Mechanism of action of SNF472, a novel calcification inhibitor to treat vascular, British Journal of Pharmacology—Research Paper, 2020, 177(19) (49 pages).
Kana M. Sureshan et al., Sulfonate protecting groups. Regioselective sulfonylation of myo-inositol orthoesters—improved synthesis of precursors of D- and L-myo-inositol 1,3,4,5-tetrakisphosphate, myo-inositol 1,3,4,5,6-pentakisphosphate and related derivatives, Carbohydrate Research 337, Elsevier, 2002, pp. 2399-2410 (14 pages).
David Curiel et al., Electrochemically Induced Intermolecular Anion Transfer, Chemistry A European Journal, 2009, vol. 15, pp. 7534-7538 (5 pages).
Sagar U. Nigwekar, M.D., M.M.Sc. et al., Calciphylaxis, The New England Journal of Medicine, 2018, vol. 378, No. 18, pp. 1704-1714 (11 pages).

(Continued)

*Primary Examiner* — Nizal S Chandrakumar
(74) *Attorney, Agent, or Firm* — Morgan, Lewis & Bockins LLP

(57) ABSTRACT

Involved are an inositol derivative and a use thereof. Specifically, provided is a compound, said compound includes two or many parts, as represented by formula (D), connected via a common central linker L2, where formula (D) is as shown below.

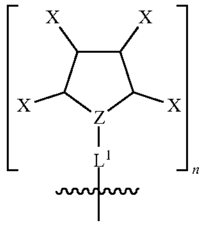

10 Claims, No Drawings

(56) References Cited

OTHER PUBLICATIONS

Debra L. Mohler et al., The synthesis of tethered ligand dimers for PPARc-RXR protein heterodimers, Organic & Biomolecular Chemistry, 2006, pp. 2082-2087 (6 pages).
S. M. Forget et al., Kinetic evaluation of glucose 1-phosphate analogues with a thymidylyltransferase using a continuous coupled enzyme assay, Organic & Biomolecular Chemistry, 2015, vol. 13, pp. 866-875 (10 pages).
Laurent Dubois et al., Enantioselective Borane Reduction of Acetophenone Catalysed by Oxazaborolidines Derived from Chiral Diethanolamines, Tetrahedron Asymmetry, 1995, vol. 6, No. 5, pp. 1097-1104 (8 pages).

* cited by examiner

INOSITOL DERIVATIVE AND USE THEREOF

CROSS-REFERENCE TO RELATED APPLICATIONS

The present application is a national stage application of International Patent Application No. PCT/CN2021/091548, filed Apr. 30, 2021, which claims the benefit of and priority to Chinese Patent Application No. CN202010362849.9, filed Apr. 30, 2020, and Chinese Patent Application No. CN202010818839.1, filed Aug. 14, 2021, both of which are incorporated herein by reference in their entirety.

TECHNICAL FIELD

The present disclosure relates to the technical field of pharmaceuticals, and particularly relates to inositol derivatives and use thereof.

BACKGROUND

At present, the incidence rate of chronic renal disease in China is up to 10.8% and is increasing year by year, and it is estimated that there will be nearly three million patients with end stage renal disease (ESRD) in 2018. In ESKD patients undergoing hemodialysis, the mortality rate from cardiovascular events is 5-30 times higher than that of normal patients. Clinically, cardiovascular calcification (CVC) is found in at least 80% of patients undergoing hemodialysis. CVC is a secondary disorder and is mainly associated with disturbances in calcium and phosphorus metabolism, and the formation and growth of calcium crystals are key mechanisms of CVC. At present, usually vitamin D, phosphate conjugates, calcimimetics and the like are used for clinic treatment.

Coronary atherosclerosis, arteriosclerosis, left ventricular hypertrophy, myocardial ischemia and the like caused by calcium deposition in large blood vessels are important causes of the increase in the morbidity rate and mortality rate of patients with chronic renal disease. Calciphylaxis is a serious form of CVC, and is a rare but life-threatening disease characterized clinically by calcified vascular blockage of small vessels of subcutaneous fatty tissue layer and corium layer, and it can lead to severe pain and ischemic skin necrosis changes (Nigwekar S U et al., *N Engl J Med.* 2018, 378(18), 1704-1714). Once a patient is diagnosed with calciphylaxis, the prognosis is poor. Calciphylaxis primarily affects ESRD patients and has not drawn sufficient clinical attention. A high proportion of ESRD patients have the problem of extraosseous calcification, and although most of the extraosseous calcification is not calciphylaxis, calciphylaxis cannot be simply regarded as common vascular calcification in ESRD patients. Infections and other wound-related complications caused by calciphylaxis are the main causes of morbidity and hospitalization, patients usually receive only analgesics and wound treatment, and no "permanent cure" therapy is approved for marketing.

SNF472 is an intravenous formulation of the sodium salt of IP6 developed by Sanifit corporation. It can inhibit the continuous growth of hydroxyapatite (HAP) crystal (the main component of calcium deposit) and prevent the vascular blockage by binding to the crystal at the calcified part (Perelló J et al. *Br J Clin Pharmacol.* 2018, 84(12), 2867-2876). In 2012, SNF472 was approved by FDA and EMA as an orphan drug for use in the treatment of calciphylaxis.

SUMMARY

The present disclosure provides a compound of formula (I) or a pharmaceutically acceptable salt thereof, or a stereoisomer, rotamer or tautomer thereof, (I)

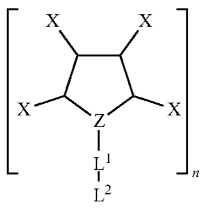

formed by connecting, via a common linker $L^2$, two or more moieties of formula (D) shown below:

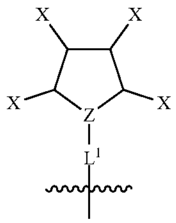

, wherein,

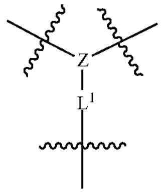

is

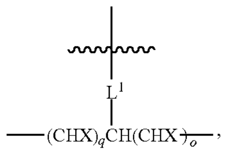

, o and q are each independently selected from the group consisting of 0 to 2, the value of o+q is 0, 1 or 2, and $L^1$ represents —O—, —NH—, —C(═O)—, —OC(═O)—, —NHC(═O)—, —S— or a single bond; at least one X is each independently selected from $R^1$, the $R^1$ being selected from or comprising polyethylene glycol of formula $R^4—(OCH_2CH_2)_gO—$ or $R^4—(OCH_2CH_2)_g—$ or polyglycerol of formula $R^4—O—(CH_2—CHOR^5—CH_2O)_g—$, the remaining X are each independently selected from the group consisting of hydrogen, —OH, $OPO_3^{2-}$, $OPSO_2^{2-}$, $OSO_3^-$ and $CO_2^-$, and each formula (D) is identical or different, wherein the polyethylene glycol or the polyglycerol is optionally substituted with one or more groups selected from the group consisting of hydroxy, deuterium, halogen, a nitrile group, nitro, amino, $C_{1-6}$ alkyl, $C_{1-6}$ alkoxy, $—OC(O)R^4$, $C_{3-7}$ cycloalkyl and $C_{3-7}$ cycloalkylene;

$L^2$ is a common central linker connected to formula (D), comprises $C_{2-20}$ linear or branched alkylene, $C_{2-20}$ linear or branched alkyleneoxy, $C_{2-20}$ linear or branched alkyleneamino, $C_{2-20}$ linear or branched alkylenemercapto, $C_{2-20}$ linear or branched alkenylene, $C_{2-20}$ linear or branched alkenyleneoxy, $C_{2-20}$ cycloalkylene, $—(OCH_2CH_2)_eO—$, $—(OCH_2CH_2)_e—$ or $—O—(CH_2—CHOR^2—CH_2O)_e—$, and optionally comprises a moiety A, wherein the moiety A is selected from the group consisting of an oxygen atom, a nitrogen atom, a sulfur atom, $C_{1-6}$ alkyl, $C_{3-7}$ cycloalkyl, and 5-membered or 6-membered heterocyclyl or aryl ring group or heteroaryl ring group, and the alkylene, alkyleneoxy, alkyleneamino, alkylenemercapto, alkenylene, alkenyleneoxy, cycloalkylene, $—(OCH_2CH_2)_eO—$, $—(OCH_2CH_2)_e—$ or $—O—(CH_2—CHOR^2—CH_2O)_e—$ is optionally substituted with one or more groups selected from the group consisting of hydroxy, halogen, deuterium, amino, a nitrile group, $C_{1-6}$ alkyl, $C_{1-6}$ alkoxy, $C_{3-7}$ cycloalkyl and $C_{3-7}$ cycloalkylene, the $C_{1-6}$ alkyl, $C_{3-7}$ cycloalkyl or $C_{3-7}$ cycloalkylene being optionally substituted with halogen, hydroxy, deuterium, amino, a nitrile group or nitro;

when the moiety A is selected from the group consisting of $C_{1-6}$ alkyl and a nitrogen atom, A can be optionally substituted with $R^3$, wherein $R^3$ is selected from the group consisting of hydrogen, hydroxy, alkyl, alkoxy, cycloalkyl, heterocyclyl, aryl, heteroaryl, SR', NR'(R"), COOR' and CONR'(R"), the alkyl, alkoxy, cycloalkyl, heterocyclyl, aryl or heteroaryl being optionally substituted with one or more groups selected from the group consisting of alkyl, alkoxy, cycloalkyl, heterocyclyl, alkenyl, alkynyl, aryl, heteroaryl, nitro, a nitrile group, hydroxy, halogen, haloalkyl, haloalkoxy, halocycloalkyl, haloheterocyclyl, haloaryl and haloheteroaryl;

when the moiety A is selected from a sulfur atom, A can be optionally substituted with oxygen;

$R^4$ is selected from the group consisting of hydrogen, $C_{1-6}$ alkyl and $C_{3-7}$ cycloalkyl, the $C_{1-6}$ alkyl or $C_{3-7}$ cycloalkyl being optionally substituted with one or more groups selected from the group consisting of deuterium, a nitrile group, nitro, amino, hydroxy and halogen; further, $R^4$ is preferably hydrogen, methyl, ethyl, trifluoromethyl or cyclopropyl;

$R^2$ or $R^5$ is each independently selected from the group consisting of hydrogen, $C_{1-6}$ alkyl and a glycerol chain, preferably hydrogen, methyl and ethyl;

R' or R" is independently selected from the group consisting of hydrogen, hydroxy, alkyl, alkoxy, alkenyl, acyl, aryl and heteroaryl, the alkyl, alkoxy, aryl or heteroaryl being optionally substituted with one or more groups selected from the group consisting of halogen, alkyl, cycloalkyl, alkoxy, alkenyl, alkynyl, oxy, hydroxy, nitro, a nitrile group and $—R^a$; and $R^a$ is selected from the group consisting of aryl and heteroaryl, the aryl or heteroaryl being optionally substituted with one or more groups selected from the group consisting of halogen, alkyl, cycloalkyl, alkoxy, alkenyl, alkynyl, oxy, hydroxy, aryl, heteroaryl, nitro, a nitrile group, haloalkyl, haloalkoxy, halocycloalkyl, haloheterocyclyl, haloaryl and haloheteroaryl;

g is 1-200;

n is selected from the group consisting of 2 to 8, e.g., 2, 3, 4, 6, 7 and 8;

e is an integer of 1-20 (including but not limited to 1, 2, 3, 4, 6, 7, 12, 13, 14, 16 or 17). "—OC(═O)—" or "—NHC(═O)—" in the present disclosure does not particularly indicate that the functional group attached thereto is at the left or right end. For example, "—OC(═O)—" has the same definition as "—C(═O)O—". "—NHC(═O)—" has the same definition as "—C(═O)NH—".

In some embodiments, $L^1$ represents "—OC(═O)—" or "—C(═O)O—". In some embodiments, $L^1$ represents "—NHC(═O)—" and "—C(═O)NH—". In some embodiments, $L^1$ represents —O—. In some embodiments, $L^1$ represents —C(═O)—. In some embodiments, $L^1$ represents —S— or a single bond.

In some embodiments,

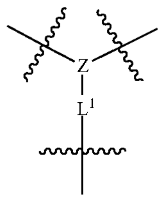

in the compound of the present disclosure is selected from the group consisting of $CHL^1$-, $CH(L^1-)CHX$, $CHXCH(L^1-)$, $CHXCH(L^1-)CHX$, $CHX—CHXCH(L^1-)CHX$, $CH(L^1-)CHX—CHX$, $CHXCH(L^1-)$ $CHX—CHX$ and $CHX—CHXCH(L^1-)CHX—CHX$, wherein "—" represents a bond.

In some embodiments, the compound of the present disclosure comprises a 5-membered to 7-membered ring, wherein at least four ring members may be represented by the formula CH—X, and one ring member may be represented by the formula $—CH-L^1$.

In some embodiments, the compound of the present disclosure comprises a 5-membered ring, wherein four ring members may be represented by the formula CH—X, and one ring member may be represented by the formula $—CH-L^1$-.

In some embodiments, the compound of the present disclosure comprises a 6-membered ring, wherein five ring members may be represented by the formula CH—X, and one ring member may be represented by the formula $—CH-L^1$-.

In some embodiments, the compound of the present disclosure comprises a 7-membered ring, wherein six ring members may be represented by the formula CH—X, and one ring member may be represented by the formula $—CH-L^1$-.

In some embodiments, the compound of the present disclosure comprises a 6-membered ring, wherein five ring members may be represented by the formula CH—X, and one ring member may be represented by the formula $—CH-L^1$-. In some embodiments, the compound of formula (I) is:

(II)

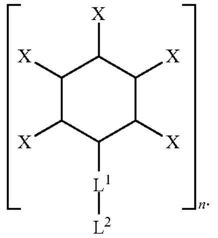

In some embodiments, the compound of the present disclosure comprises a moiety of formula (D) shown as formula (Da) or (db):

(Da)

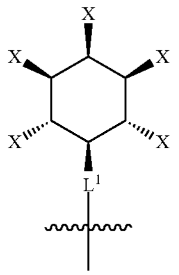

and (Db)

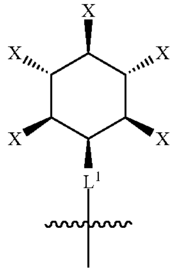

wherein, $L^1$ and X are as defined in the compound of formula (I) described above.

Polyglycerol is shown as formula $R^4$—O—($CH_2$—CHOH—$CH_2O)_g$—, wherein $R^4$ is selected from the group consisting of hydrogen, methyl and ethyl, and g is 1-200; branched or hyperbranched polyglycerol is shown as formula $R^4$—O—($CH_2$—CHOR$^5$—$CH_2O)_g$—, wherein $R^5$ is selected from the group consisting of hydrogen, $C_{1-6}$ alkyl and a glycerol chain, and $R^4$ is selected from the group consisting of hydrogen, methyl and ethyl.

Glycerol chain is shown as formula $R^4$—O—($CH_2$—CHOR$^2$—$CH_2O)_g$—, wherein $R^2$ is hydrogen.

polyethylene glycol is shown as formula is $R^4$—$(OCH_2CH_2)_g$O— or $R^4$—$(OCH_2CH_2)_g$—, wherein $R^4$ is selected from the group consisting of hydrogen, methyl and ethyl, and g is 1-200.

The polyethylene glycol or polyglycerol in the present disclosure has a molar mass selected from the group consisting of 100 g/mol to 3000 g/mol, particularly 100 g/mol to 2500 g/mol, more particularly 100 g/mol to 2000 g/mol, or 200 g/mol to 3000 g/mol, particularly 300 g/mol to 2500 g/mol, more particularly 400 g/mol to 2000 g/mol.

In some embodiments, at least one X in the compound is selected from $R^1$, the $R^1$ being selected from or comprising polyglycerol of formula $R^4$—O—($CH_2$—CHOH—$CH_2$ $O)_g$—, wherein $R^4$ is selected from the group consisting of hydrogen, methyl and ethyl, and g is 1-200. In some other embodiments, g is 3-20. In some other embodiments, g is 10-20. In some other embodiments, g is 9-45. In the compound of formula I provided in some other embodiments, g is 2 to 100, 2 to 50, 2 to 20, or 2 to 10.

In some embodiments, at least one X in the compound is selected from $R^1$, the $R^1$ being selected from or comprising branched or hyperbranched polyglycerol of formula $R^4$—O—($CH_2$—CHOR$^5$—$CH_2O)_g$—, wherein $R^5$ is selected from the group consisting of hydrogen and a glycerol chain, and $R^4$ is selected from the group consisting of hydrogen, methyl and ethyl. In some other embodiments, 1, 2, 3, 4, or 5 X in the compound are selected from $R^1$, the $R^1$ being selected from or comprising polyglycerol of formula $R^4$—O—($CH_2$—CHOH—$CH_2O)_g$— or branched or hyperbranched polyglycerol of formula $R^4$—O—($CH_2$—CHOR$^5$—$CH_2O)_g$—, wherein $R^5$ is selected from the group consisting of hydrogen and a glycerol chain, $R^4$ is selected from the group consisting of hydrogen, methyl and ethyl, and g is 1-200. In some embodiments, X in the compound is selected from $R^1$, the $R^1$ being selected from or comprising polyglycerol of formula $R^4$—O—($CH_2$—CHOH—$CH_2O)_g$— or branched or hyperbranched polyglycerol of formula $R^4$—O—($CH_2$—CHOR$^5$—$CH_2O)_g$—, which has a molar mass of 100 g/mol to 3000 g/mol, particularly 100 g/mol to 2500 g/mol, more particularly about 100 g/mol to 2000 g/mol, or 200 g/mol to 3000 g/mol, particularly 300 g/mol to 2500 g/mol, more particularly about 400 g/mol to 2000 g/mol.

In some embodiments, at least one X in the compound is selected from $R^1$, the $R^1$ being selected from or comprising polyethylene glycol of formula $R^4$—$(OCH_2CH_2)_g$O— or $R^4$—$(OCH_2CH_2)_g$—, wherein $R^4$ is selected from the group consisting of hydrogen, methyl and ethyl, g is 1-200, and the polyethylene glycol is optionally substituted with one or more groups selected from the group consisting of hydroxy, deuterium, halogen, $C_{1-6}$ alkyl, $C_{3-7}$ cycloalkyl and $C_{3-7}$ cycloalkylene. In some other embodiments, g is 3-20. In some other embodiments, g is 10-20. In some other embodiments, g is 9-45.

In some embodiments, at least one X in the compound is selected from $R^1$, the $R^1$ being selected from or comprising polyethylene glycol of formula $R^4$—$(OCH_2CH_2)_g$O— or $R^4$—$(OCH_2CH_2)_g$—, polyglycerol of $R^4$O($CH_2$—CHOH—$CH_2O)_g$— or branched or hyperbranched polyglycerol of $R^4$—O—($CH_2$—CHOR$^5$—$CH_2O)_g$—, wherein g is 2-100, and the polyethylene glycol is optionally substituted with one or more groups selected from the group consisting of hydroxy, deuterium, halogen, $C_{1-6}$ alkyl, $C_{3-7}$ cycloalkyl and $C_{3-7}$ cycloalkylene. In some other embodiments, g is 7-50, and in some other embodiments, g is 7-15. In some other embodiments, g is 40-50. In the compound of formula I provided in some other embodiments, g is 2 to 100, 2 to 50, 2 to 20, or 2 to 10. In some embodiments, 3 X in the compound are selected from $R^1$ and on the same moiety of formula (D), the $R^1$ being selected from or comprising polyethylene glycol of formula $R^4$—$(OCH_2CH_2)_g$O— or $R^4$—$(OCH_2CH_2)_g$—, wherein the polyethylene glycol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some other embodiments, 1, 2, 3, 4 or 5 X in the compound are selected from $R^1$, the $R^1$ being selected from or comprising polyethylene glycol of formula $R^4$—$(OCH_2CH_2)_g$O— or $R^4$—$(OCH_2CH_2)_g$—, wherein $R^4$ is selected from the group consisting of hydrogen, methyl and ethyl, g is 1-200, and the polyethylene glycol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some embodiments, X in the compound is selected from $R^1$, the $R^1$ being selected from or comprising polyethylene glycol of formula $R^4$—$(OCH_2CH_2)_g$O— or $R^4$—$(OCH_2CH_2)_g$—, wherein the polyethylene glycol is optionally substituted with one or more groups selected from the group consisting of hydroxy, deuterium, halogen, $C_{1-6}$ alkyl, $C_{3-7}$ cycloalkyl and $C_{3-7}$ cycloalkylene, and has a molar mass of 100 g/mol to 3000 g/mol, particularly 100 g/mol to 2500 g/mol, more particularly 100 g/mol to 2000 g/mol, or 200 g/mol to 3000 g/mol, particularly 300 g/mol to 2500 g/mol, more particularly 400 g/mol to 2000 g/mol.

In some embodiments, at least 2 or 3 X in the compound described above are selected from $R^1$, the $R^1$ being selected from or comprising polyethylene glycol of formula $R^4$—$(OCH_2CH_2)_gO$— or $R^4$—$(OCH_2CH_2)_g$—, wherein the polyethylene glycol is optionally substituted with one or more groups selected from the group consisting of hydroxy, deuterium, halogen, $C_{1-6}$ alkyl, $C_{3-7}$ cycloalkyl and $C_{3-7}$ cycloalkylene, and the remaining X are all $OPO_3^{2-}$, $OPSO_2^{2}$— or $OSO_3^-$. In some other embodiments, at least 2 X in the compound described above are selected from $R^1$, the $R^1$ being selected from or comprising polyethylene glycol of formula $R^4$—$(OCH_2CH_2)_gO$— or $R^4$—$(OCH_2CH_2)_g$—, wherein the polyethylene glycol is optionally substituted with one or more groups selected from the group consisting of hydroxy, deuterium, halogen, $C_{1-6}$ alkyl, $C_{3-7}$ cycloalkyl and $C_{3-7}$ cycloalkylene, and on the same moiety of formula (D), the remaining X are all $OPO_3^{2-}$, $OPSO_2^{2}$— or $OSO_3^-$.

In some embodiments, at least one X on the moiety of formula (D) in the compound described above is selected from $R^1$, the $R^1$ being selected from or comprising polyethylene glycol of formula $R^4$—$(OCH_2CH_2)_gO$— or $R^4$—$(OCH_2CH_2)_g$—, or polyglycerol of formula $R^4$—O—$(CH_2$—CHOH—$CH_2O)_g$—, wherein $R^4$ is selected from the group consisting of hydrogen, methyl and ethyl, g is 1-200, and the polyethylene glycol or polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some embodiments, at least 2 or 3 X on the moiety of formula (D) in the compound described above are selected from $R^1$, the $R^1$ being selected from or comprising polyethylene glycol of formula $R^4$—$(OCH_2CH_2)_gO$— or $R^4$—$(OCH_2CH_2)_g$—, wherein $R^4$ is selected from the group consisting of hydrogen, methyl and ethyl, g is 1-200, and the polyethylene glycol is optionally substituted with one or more groups selected from the group consisting of hydroxy, deuterium, halogen, $C_{1-6}$ alkyl, $C_{3-7}$ cycloalkyl and $C_{3-7}$ cycloalkylene. Further, the polyethylene glycol has a molar mass of 100 g/mol to 3000 g/mol, particularly 100 g/mol to 2500 g/mol, more particularly 100 g/mol to 2000 g/mol, or 200 g/mol to 3000 g/mol, particularly 300 g/mol to 2500 g/mol, more particularly 400 g/mol to 2000 g/mol.

In some embodiments, at least 2 or 3 X on the moiety of formula (D) in the compound described above are selected from $R^1$, the $R^1$ being selected from or comprising polyethylene glycol of formula $R^4$—$(OCH_2CH_2)_gO$— or $R^4$—$(OCH_2CH_2)_g$—, wherein $R^4$ is selected from the group consisting of hydrogen, methyl and ethyl, g is 1-200, the polyethylene glycol is optionally substituted with one or more groups selected from the group consisting of hydroxy, deuterium, halogen, $C^{1-6}$ alkyl, $C_{3-7}$ cycloalkyl and $C_{3-7}$ cycloalkylene, and the remaining X are all $OPO_3^{2-}$, $OPSO_2^{2}$— or $OSO_3^-$. Further, the polyethylene glycol has a molar mass of 100 g/mol to 3000 g/mol, particularly 100 g/mol to 2500 g/mol, more particularly 100 g/mol to 2000 g/mol, or 200 g/mol to 3000 g/mol, particularly 300 g/mol to 2500 g/mol, more particularly 400 g/mol to 2000 g/mol.

In some embodiments, at least 2 or 3 X on the moiety of formula (D) in the compound described above are selected from $R^1$, the $R^1$ being selected from or comprising polyglycerol of formula $R^4$—O—$(CH_2$—CHOH—$CH_2O)_g$—, wherein $R^4$ is selected from the group consisting of hydrogen, methyl and ethyl, g is 1-200, and the polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene. Further, the polyethylene glycol has a molar mass of 100 g/mol to 3000 g/mol, particularly 100 g/mol to 2500 g/mol, more particularly 100 g/mol to 2000 g/mol, or 200 g/mol to 3000 g/mol, particularly 300 g/mol to 2500 g/mol, more particularly 400 g/mol to 2000 g/mol.

In some embodiments, at least 2 or 3 X on the moiety of formula (D) in the compound described above are selected from $R^1$, the $R^1$ being selected from or comprising polyglycerol of formula $R^4$—O—$(CH_2$—CHOH—$CH_2O)_g$—, wherein the polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene, and the remaining X are all $OPO_3^{2-}$, $OPSO_2^{2}$— or $OSO_3^-$, wherein $R^4$ is selected from the group consisting of hydrogen, methyl and ethyl, and g is 1-200. Further, the polyethylene glycol has a molar mass of 100 g/mol to 3000 g/mol, particularly 100 g/mol to 2500 g/mol, more particularly 100 g/mol to 2000 g/mol, or 200 g/mol to 3000 g/mol, particularly 300 g/mol to 2500 g/mol, more particularly 400 g/mol to 2000 g/mol.

In some embodiments, the compound of the present disclosure or the pharmaceutically acceptable salt thereof, or the stereoisomer, rotamer, or tautomer thereof, is:

(III)

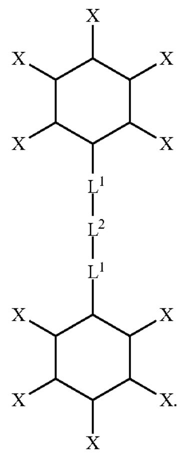

Further, the compounds of the present disclosure are different in steric configurations, which in embodiments do not affect the activity of the compounds or their efficiency in inhibiting calcium ion crystallization. In optional embodiments, the compound of formula (III) may be selected from the group consisting of:

(IIIi)

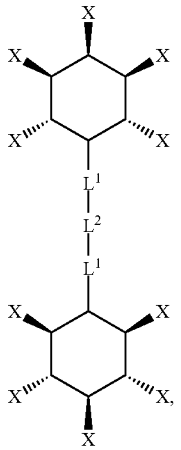

(IIIii)

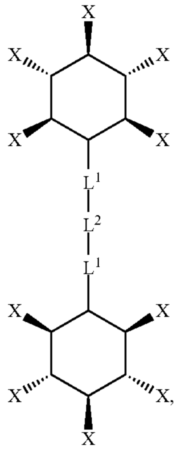

and (IIIiii)

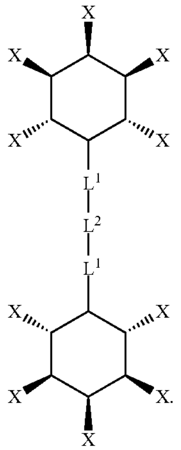

In some embodiments, in the compound described above, e.g., the formula (III), $L^2$ is selected from the group consisting of $C_{3-10}$ linear or branched alkylene and $C_{3-10}$ linear or branched alkyleneoxy, wherein the alkylene or alkyleneoxy is optionally substituted with one or more groups selected from the group consisting of hydroxy, halogen, deuterium, amino, a nitrile group, nitro, $C_{1-6}$ alkyl, $C_{1-6}$ alkoxy, $C_{3-7}$ cycloalkyl and $C_{3-7}$ cycloalkylene. In some embodiments, $L^2$ is selected from the group consisting of $C_{3-5}$ linear or branched alkylene and $C_{3-5}$ linear or branched alkyleneoxy. In some embodiments, $L^2$ is selected from the group consisting of $C_{4-8}$ linear or branched alkylene and $C_{4-8}$ linear or branched alkyleneoxy. In some embodiments, $L^2$ is selected from the group consisting of $C_{3-4}$ linear or branched alkylene and $C_{3-4}$ linear or branched alkyleneoxy.

In some embodiments, in the compound described above, e.g., the formula (III), $L^2$ is selected from $$-(CH_2)_r-A-(CH_2)_s-,$$

wherein r and s are each independently selected from the group consisting of integers of 1 to 6, e.g., 1, 2, or 3, and the $$-(CH_2)_r-A-(CH_2)_s-$$

is optionally substituted with one or more groups selected from the group consisting of hydroxy, halogen, deuterium, amino, a nitrile group, nitro, $C_{1-6}$ alkyl, $C_{1-6}$ alkoxy, $C_{3-7}$ cycloalkyl and $C_{3-7}$ cycloalkylene; A is as defined in the compound of formula (I) described above, and when the moiety A is selected from a nitrogen atom, A can be optionally substituted with $C_{1-6}$ alkyl, e.g., methyl; $L^1$ is as defined in the compound of formula (I).

In some embodiments, in the compound described above, e.g., the formula (III), $L^2$ is selected from $$-(CH_2)_r-A-(CH_2)_s-,$$

wherein the $$-(CH_2)_r-A-(CH_2)_s-$$

is optionally substituted with one or more groups selected from the group consisting of hydroxy, halogen, deuterium, amino, a nitrile group, nitro, $C_{1-6}$ alkyl, $C_{1-6}$ alkoxy, $C_{3-7}$ cycloalkyl and $C_{3-7}$ cycloalkylene, $L^1$ is selected from the group consisting of —O—, —NH—, —C(═O)—, —OC(═O)— and —S—, and A is selected from the group consisting of an oxygen atom, a nitrogen atom and a sulfur atom.

In some embodiments, in the compound described above, e.g., the formula (III), A is selected from the group consisting of an oxygen atom, a nitrogen atom, a sulfur atom and $C_{1-6}$ alkyl, and when the moiety A is selected from the group consisting of a carbon atom and a nitrogen atom, A is optionally substituted with $C_{1-6}$ alkyl, including but not limited to methyl, ethyl, propyl or butyl.

In some embodiments, in the compound described above, e.g., the formula (III), $L^2$ is selected from $$-(CH_2)_r-A-(CH_2)_s-,$$

wherein r and s are each 2 or 3, and the $$-(CH_2)_r-A-(CH_2)_s-$$

is optionally substituted with one or more groups selected from the group consisting of hydroxy, halogen, deuterium, amino, a nitrile group, nitro, $C_{1-6}$ alkyl, $C_{1-6}$ alkoxy, $C_{3-7}$ cycloalkyl and $C_{3-7}$ cycloalkylene; $L^1$ is selected from the group consisting of —O— and —OC(=O)—; A is selected from the group consisting of an oxygen atom, a nitrogen atom, a sulfur atom and $C_{1-6}$ alkyl, and when the moiety A is selected from the group consisting of a carbon atom and a nitrogen atom, A is optionally substituted with $C_{1-6}$ alkyl, including but not limited to methyl, ethyl, propyl or butyl.

In some other embodiments, in the compound described above, e.g., the formula (III), $L^2$ is selected from the group consisting of $—(OCH_2CH_2)_eO—$, $—(OCH_2CH_2)_e—$ and $—O—(CH_2—CHOR^2—CH_2O)_e—$, wherein e is an integer of 1-20, e.g., 2, 3, 4, 5, 6, 7 or 8, and the $—(OCH_2CH_2)_eO—$, $—(OCH_2CH_2)_e—$ or $—O—(CH_2—CHOR^2—CH_2O)_e—$ is optionally substituted with one or more groups selected from the group consisting of hydroxy, halogen, deuterium, amino, a nitrile group, nitro, $C_{1-6}$ alkyl, $C_{1-6}$ alkoxy, $C_{3-7}$ cycloalkyl and $C_{3-7}$ cycloalkylene.

In some other embodiments, in the compound described above, e.g., the formula (III), $L^1$ is a single bond, and the polyethylene glycol has a molar mass of less than 2000 g/mol.

In some embodiments, $L^2$ in formula (III) is $—(OCH_2CH_2)_eCH_2O—$, e is 1-20, and $L^1$ is a single bond.

In some other embodiments, $L^2$ in formula (III) is $—O—(CH_2—CHOH—CH_2O)_e—$, e is 1-20, and $L^1$ is a single bond.

In an optional embodiment, the compound of formula (III) or the pharmaceutically acceptable salt thereof, or the stereoisomer, rotamer, or tautomer thereof, is:

(IIIa)

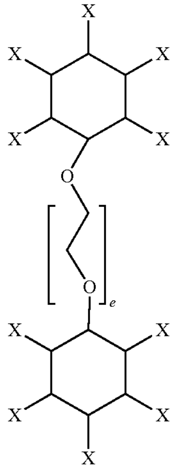

or

-continued (IIIb)

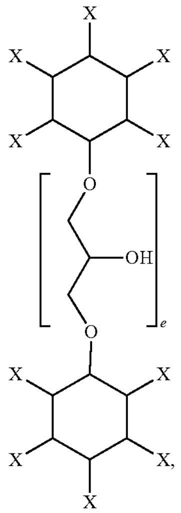

wherein X is as defined in claim 1; further, $R^1$ is preferably or comprises polyethylene glycol of formula $R^4—(OCH_2CH_2)_gO—$ or $R^4—(OCH_2CH_2)_g—$, and $R^4$ is preferably selected from the group consisting of hydrogen, methyl, ethyl, trifluoromethyl and cyclopropyl, the polyethylene glycol being optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some embodiments, in the compound described above, e.g., the formula (III), at least two X are selected from $R^1$ and on the same formula (D), the IV being selected from or comprising polyethylene glycol of formula $R^4—(OCH_2CH_2)_gO—$ or $R^4—(OCH_2CH_2)_g—$, wherein the polyethylene glycol is optionally substituted with one or more groups selected from the group consisting of hydroxy, deuterium, halogen, $C_{1-6}$ alkyl, $C_{3-7}$ cycloalkyl and $C_{3-7}$ cycloalkylene; and the remaining X are independently selected from the group consisting of hydrogen, —OH, $OPO_3^{2-}$, $OPSO_2^{2}—$ or $OSO_3^-$ and $CO_2^-$.

In some embodiments, in the compound described above, e.g., the formula (III), 3 X are selected from $R^1$ and on the same formula (D), the $R^1$ being selected from or comprising polyethylene glycol of formula $R^4—(OCH_2CH_2)_gO—$ or $R^4—(OCH_2CH_2)_g—$, wherein the polyethylene glycol is optionally substituted with one or more groups selected from the group consisting of hydroxy, deuterium, halogen, $C_{1-6}$ alkyl, $C_{3-7}$ cycloalkyl and $C_{3-7}$ cycloalkylene; and the remaining X are independently selected from the group consisting of hydrogen, —OH, $OPO_3^{2-}$, $OPSO_2^{2}—$ or $OSO_3^-$ and $CO_2^-$.

In some embodiments, in the compound described above, e.g., the formula (III), $L^2$ is selected from the group consisting of: $—(OCH_2CH_2)_hO\text{-}A\text{-}(OCH_2CH_2)_jO—$, $—(OCH_2—CH_2)_hCH_2O\text{-}A\text{-}(OCH_2—CH_2)_jCH_2O—$ and $—(OCH_2CH(OH)CH_2)_hO\text{-}A\text{-}(OCH_2CH(OH)CH_2)_j—$, wherein the moiety A is selected from the group consisting of $C_{1-6}$ alkyl, $C_{3-7}$ cycloalkyl (including cyclopropyl, n-butyl, cyclopentyl or cyclohexyl), and 5-membered or 6-membered heterocyclyl or aryl ring group or heteroaryl ring group (including tetrahydrofuranyl, pyrrolyl, pyridinyl or phenyl), and the $—(OCH_2CH_2)_hO\text{-}A\text{-}(OCH_2CH_2)_jO—$, $—(OCH_2CH_2)_h\text{-}A\text{-}(OCH_2CH_2)_j—$, or $—(OCH_2CH(OR^2)CH_2)_hO\text{-}A\text{-}(OCH_2CH(OR^2)CH_2)_jO—$ is optionally substituted with one or more groups selected from hydroxy, halogen, deuterium, $C_{1-6}$ alkyl, $C_{3-7}$ cycloalkyl and $C_{3-7}$ cycloalkylene; and h or j is an integer of 1-10, e.g., 1, 2, 3 or 4. Further, $L^1$ is preferably a single bond.

In another aspect, in some embodiments, the compound of formula I or the pharmaceutically acceptable salt thereof, or the stereoisomer, rotamer, or tautomer thereof, is (III-1)

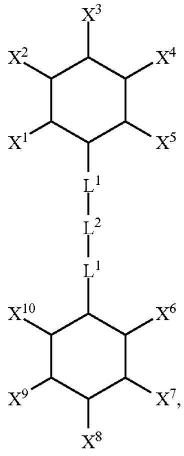

wherein at least one of $X^1$ to $X^5$ is independently selected from IV, the $R^1$ being selected from or comprising polyethylene glycol of formula $R^4$—$(OCH_2CH_2)_gO$— or $R^4$—$(OCH_2CH_2)_g$— or polyglycerol of formula $R^4$—O—$(CH_2$—$CHOR^5$—$CH_2O)_g$—, and the remaining are independently selected from the group consisting of hydrogen, —OH, $OPO_3^{2-}$, $OPSO_2^{2}$— or $OSO_3^-$ and $CO_2^-$; and $X^6$ to $X^{10}$ are each independently selected from the group consisting of hydrogen, —OH, $OPO_3^{2-}$, $OPSO_2^{2-}$, $OSO_3^-$, $CO_2^-$ and $R^1$, the $R^1$ being selected from or comprising polyethylene glycol of formula $R^4$—$(OCH_2CH_2)_gO$— or $R^4$—$(OCH_2CH_2)_g$— or polyglycerol of formula $R^4$—O—$(CH_2$—$CHOR^5$—$CH_2O)_g$—, wherein $R^4$ and $L^1$ to $L^3$ are as defined in the formula I, and the polyethylene glycol or polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some embodiments, in the formula III-1, at least one of $X^1$ to $X^5$ is independently selected from $R^1$, the $R^1$ being selected from or comprising polyethylene glycol of formula $R^4$—$(OCH_2CH_2)_gO$— or $R^4$—$(OCH_2CH_2)_g$— or polyglycerol of formula $R^4$—O—$(CH_2$—$CHOR^5$—$CH_2O)_g$—, and the remaining are independently selected from the group consisting of hydrogen, —OH, $OPO_3^{2-}$, $OPSO_2^{2-}$, $OSO_3^-$ and $CO_2^-$; and $X^6$ to $X^{10}$ are each independently selected from the group consisting of hydrogen, —OH, $OPO_3^{2-}$, $OPSO_2^{2-}$, $OSO_3^-$ and $CO_2^-$, wherein the polyethylene glycol or polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some embodiments, in the formula III-1, at least two of $X^1$ to $X^5$ are independently selected from $R^1$, the $R^1$ being selected from or comprising polyethylene glycol of formula $R^4$—$(OCH_2CH_2)_gO$— or $R^4$—$(OCH_2CH_2)_g$— or polyglycerol of formula $R^4$—O—$(CH_2$—$CHOR^5$—$CH_2O)_g$—, the remaining are independently selected from the group consisting of hydrogen, —OH, $OPO_3^{2-}$, $OPSO_2^{2-}$, $OSO_3^-$ and $CO_2^-$; and $X^6$ to $X^{10}$ are each independently selected from the group consisting of hydrogen, —OH, $OPO_3^{2-}$, $OPSO_2^{2-}$, $OSO_3^-$ and $CO_2^-$, wherein the polyethylene glycol or polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some embodiments, in the formula III-1, at least two of $X^1$ to $X^5$ are independently selected from $R^1$, the $R^1$ being selected from or comprising polyethylene glycol of formula $R^4$—$(OCH_2CH_2)_gO$— or $R^4$—$(OCH_2CH_2)_g$— or polyglycerol of formula $R^4$—O—$(CH_2$—$CHOR^5$—$CH_2O)_g$—, and the remaining are independently selected from the group consisting of $OPO_3^{2-}$, $OPSO_2^{2-}$, $OSO_3^-$ and $CO_2^-$; and $X^6$ to $X^{10}$ are each independently selected from the group consisting of hydrogen, —OH, $OPO_3^{2-}$, $OPSO_2^{2-}$, $OSO_3^-$ and $CO_2^-$, wherein the polyethylene glycol or polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some embodiments, in the formula III-1, at least two of $X^1$ to $X^5$ are independently selected from $R^1$, the $R^1$ being selected from or comprising polyethylene glycol of formula $R^4$—$(OCH_2CH_2)_gO$— or $R^4$—$(OCH_2CH_2)_g$— or polyglycerol of formula $R^4$—O—$(CH_2$—$CHOR^5$—$CH_2O)_g$—, and the remaining are independently selected from the group consisting of $OPO_3^{2-}$ and $CO_2^-$; and $X^6$ to $X^{10}$ are each independently selected from the group consisting of hydrogen, —OH, $OPO_3^{2-}$, $OPSO_2^{2-}$, $OSO_3^-$ and $CO_2^-$, wherein the polyethylene glycol or polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some embodiments, in the formula III-1, at least two of $X^1$ to $X^5$ are independently selected from $R^1$, the $R^1$ being selected from or comprising polyethylene glycol of formula $R^4$—$(OCH_2CH_2)_gO$— or $R^4$—$(OCH_2CH_2)_g$—, and the remaining are independently selected from the group consisting of $OPO_3^{2-}$ and $CO_2^-$; and $X^6$ to $X^{10}$ are each independently selected from the group consisting of hydrogen, —OH, $OPO_3^{2-}$, $OPSO_2^{2-}$, $OSO_3^-$ and $CO_2^-$, wherein the polyethylene glycol or polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some embodiments, in the formula III-1, at least one of $X^6$ to $X^{10}$ is independently selected from $R^1$, the $R^1$ being selected from or comprising polyethylene glycol of formula $R^4$—$(OCH_2CH_2)_gO$— or $R^4$—$(OCH_2CH_2)_g$— or polyglycerol of formula $R^4$—O—$(CH_2$—$CHOR^5$—$CH_2O)_g$—, and the remaining are independently selected from the group consisting of $OPO_3^{2-}$ and $CO_2^-$, wherein the polyethylene glycol or polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some embodiments, in the formula III-1, at least one of $X^6$ to $X^{10}$ is independently selected from $R^1$, the $R^1$ being selected from or comprising polyethylene glycol of formula $R^4$—$(OCH_2CH_2)_gO$— or $R^4$—$(OCH_2CH_2)_g$—, and the remaining are independently selected from the group consisting of $OPO_3^{2-}$ and $CO_2^-$, wherein the polyethylene glycol or polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some embodiments, in the formula III-1, at least two of $X^6$ to $X^{10}$ are independently selected from $R^1$, the $R^1$ being selected from or comprising polyethylene glycol of formula $R^4$—$(OCH_2CH_2)_gO$— or $R^4$—$(OCH_2CH_2)_g$— or polyglycerol of formula $R^4$—O—$(CH_2$—$CHOR^5$—$CH_2O)_g$—, and the remaining are independently selected from the group consisting of $OPO_3^{2-}$ and $CO_2^-$, wherein the polyethylene glycol or polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some embodiments, in the formula III-1, at least two of $X^6$ to $X^{10}$ are independently selected from $R^1$, the $R^1$ being selected from or comprising polyethylene glycol of formula $R^4$—$(OCH_2CH_2)_gO$— or $R^4$—$(OCH_2CH_2)_g$—, and the remaining are independently selected from the group consisting of $OPO_3^{2-}$ and $CO_2^-$, wherein the polyethylene glycol or polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some embodiments, in the formula III-1, one of $X^1$ to $X^5$ is independently selected from $R^1$, the $R^1$ being selected from or comprising polyethylene glycol of formula $R^4$—$(OCH_2CH_2)_gO$— or $R^4$—$(OCH_2CH_2)_g$—, and the remaining are independently selected from the group consisting of $OPO_3^{2-}$ and $CO_2^-$; and one of $X^6$ to $X^{10}$ is independently selected from $R^1$, the $R^1$ being selected from or comprising polyethylene glycol of formula $R^4$—$(OCH_2CH_2)_gO$— or $R^4$—$(OCH_2CH_2)_g$—, and the remaining are independently selected from the group consisting of $OPO_3^{2-}$ and $CO_2^-$, wherein the polyethylene glycol or polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some embodiments, in the formula III-1, two of $X^1$ to $X^5$ are independently selected from $R^1$, the $R^1$ being selected from or comprising polyethylene glycol of formula $R^4$—$(OCH_2CH_2)_gO$— or $R^4$—$(OCH_2CH_2)_g$—, and the remaining are independently selected from the group consisting of $OPO_3^{2-}$ and $CO_2^-$; and two of $X^6$ to $X^{10}$ are independently selected from $R^1$, the $R^1$ being selected from or comprising polyethylene glycol of formula $R^4$—$(OCH_2CH_2)_gO$— or $R^4$—$(OCH_2CH_2)_g$—, and the remaining are independently selected from the group consisting of $OPO_3^{2-}$ and $CO_2^-$, wherein the polyethylene glycol or polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

Further, the formula III-1 has different steric configurations, which in embodiments does not affect the activity of the compounds or their efficiency in inhibiting calcium ion crystallization. In optional embodiments, the compound of formula (III) may be selected from the group consisting of:

(IIIi-1)

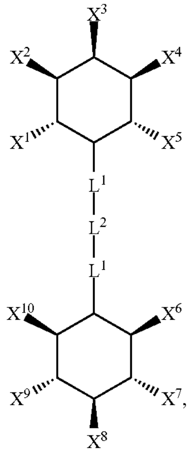

(IIIii-1)

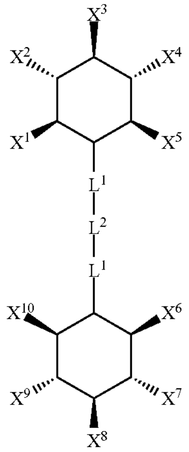

and (IIIiii-1)

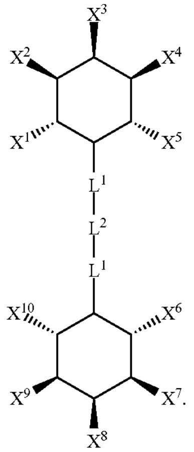

In some embodiments, at least two of $X^1$ to $X^5$ in the formula III-1 are independently selected from $R^1$, the $R^1$ being selected from or comprising polyethylene glycol of formula $R^4$—$(OCH_2CH_2)_gO$— or $R^4$—$(OCH_2CH_2)_g$— or polyglycerol of formula $R^4$—O—$(CH_2$—$CHOR^5$—$CH_2O)_g$—; and $X^6$ to $X^{10}$ are each independently selected from the group consisting of hydrogen, —OH, $OPO_3^{2-}$, $OPSO_2^{2-}$, $OSO_3^-$ and $CO_2^-$, wherein $R^4$ and $L^1$ to $L^3$ are as defined in the formula I, and the polyethylene glycol or polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some embodiments, in the formula III-1, at least three of $X^1$ to $X^5$ are independently selected from $R^1$, the $R^1$ is selected from or comprises polyethylene glycol of formula $R^4—(OCH_2CH_2)_gO—$ or $R^4—(OCH_2CH_2)_g—$ or polyglycerol of formula $R^4—O—(CH_2—CHOR^5—CH_2O)_g—$; and $X^6$ to $X^{10}$ are each independently selected from the group consisting of hydrogen, —OH, $OPO_3^{2-}$, $OPSO_2^{2-}$, $OSO_3^-$ and $CO_2^-$, wherein $R^4$ and $L^1$ to $L^3$ are as defined in the formula I, and the polyethylene glycol or polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some other embodiments, in the formula III-1, $X^1$ and $X^4$ are independently selected from $R^1$, the $R^1$ being selected from or comprising polyethylene glycol of formula $R^4—(OCH_2CH_2)_gO—$ or $R^4—(OCH_2CH_2)_g—$ or polyglycerol of formula $R^4—O—(CH_2—CHOR^5—CH_2O)_g—$; and $X^2$, $X^4$, $X^5$, and $X^6$ to $X^{10}$ are each independently selected from the group consisting of hydrogen, —OH, $OPO_3^{2-}$, $OPSO_2^{2-}$, $OSO_3^-$ and $CO_2^-$, wherein $R^4$ and $L^1$ to $L^3$ are as defined in the formula I, and the polyethylene glycol or polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene.

In some other embodiments, in the formula III-1, $X^2$ and $X^4$ are selected from $R^1$, the $R^1$ being selected from or comprising polyethylene glycol of formula $R^4—(OCH_2CH_2)_gO—$ or $R^4—(OCH_2CH_2)_g—$ or polyglycerol of formula $R^4—O—(CH_2—CHOR^5—CH_2O)_g—$, wherein the polyethylene glycol or polyglycerol is optionally substituted with one or more groups selected from the group consisting of hydroxy, deuterium, halogen, $C_{1-6}$ alkyl, $C_{3-7}$ cycloalkyl and $C_{3-7}$ cycloalkylene; and $X^1$, $X^4$, $X^5$, and $X^6$ to $X^{10}$ are each independently selected from the group consisting of hydrogen, —OH, $OPO_3^{2-}$, $OPSO_2^{2-}$, $OSO_3^-$ and $CO_2^-$, wherein $R^4$ and $L^1$ to $L^3$ are as defined in the formula I.

In certain embodiments, $X^6$ to $X^{10}$ in the formula III-1 are selected from the group consisting of $OPO_3^{2-}$, $OSO_3^-$ and $CO_2^-$. In some embodiments, $X^6$ to $X^{10}$ in the formula III-1 are selected from the group consisting of $OPO_3^{2-}$ and $OSO_3^-$. In some embodiments, $X^6$ to $X^{10}$ in the formula III-1 are selected from $OPO_3^{2-}$.

Further, in some embodiments, the polyethylene glycol in the formula III-1 is optionally substituted with one or more groups selected from the group consisting of hydroxy, halogen, deuterium, $C_{1-6}$ alkyl, $C_{3-7}$ cycloalkyl, and $C_{3-7}$ cycloalkylene. In certain embodiments, the polyethylene glycol in the formula III-1 is substituted with one or more groups selected from the group consisting of deuterium and $C_{1-6}$ alkyl. In some embodiments, the polyethylene glycol in the formula III-1 is substituted with one or more groups selected from the group consisting of deuterium, methyl, ethyl, and propyl.

In some other embodiments, the compound of formula I or the pharmaceutically acceptable salt thereof, or the stereoisomer, rotamer, or tautomer thereof is (IIIa-1)

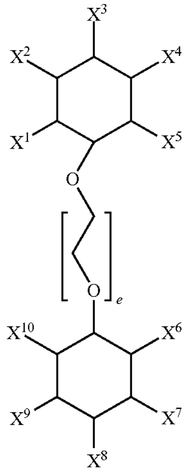

or (IIIb-1)

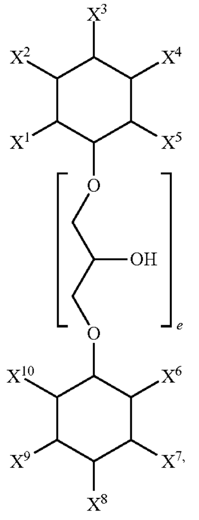

wherein $X^1$ to $X^{10}$ are as defined in the formula III-1.

In some embodiments, $L^2$ in the formula I is a common central linker connected to formula (D) and comprises $C_{2-20}$ linear or branched alkylene, $C_{2-20}$ linear or branched alkyleneoxy, $—(OCH_2CH_2)_eO—$ or $—(OCH_2CH_2)_e—$, the alkylene, alkyleneoxy, $—(OCH_2CH_2)_eO—$, or $—(OCH_2CH_2)_e—$ being optionally substituted with one or more groups selected from the group consisting of hydroxy, deuterium, amino, $C_{1-6}$ alkyl, $C_{1-6}$ alkoxy, $C_{3-7}$ cycloalkyl, and $C_{3-7}$ cycloalkylene.

In some other embodiments, $L^2$ in the formula I is a common central linker connected to formula (D) and comprises $C_{2-10}$ linear or branched alkylene, $—(OCH_2CH_2)_eO—$ or $(OCH_2CH_2)_e—$, the alkylene, $—(OCH_2CH_2)_eO—$ or $—(OCH_2CH_2)_e—$ being optionally substituted with one or more groups selected from the group consisting of hydroxy, deuterium, amino, $C_{1-6}$ alkyl, $C_{1-6}$ alkoxy, $C_{3-7}$ cycloalkyl, and $C_{3-7}$ cycloalkylene; $L^1$ represents —O— or a single bond. In some other embodiments, e in the formula I is 2 to 15, 2 to 10, 2 to 8, or 2 to 4.

In another aspect, the compound of the present disclosure is:

$$A-(L^2-D)_f \quad \text{(IV)}$$

wherein, the moiety A is selected from the group consisting of a nitrogen atom, $C_{1-6}$ alkyl, $C_{3-7}$ cycloalkyl, and 5-membered or 6-membered heterocyclyl or aryl ring group or heteroaryl ring group, the $C_{1-6}$ alkyl, $C_{3-7}$ cycloalkyl, or 5-membered or 6-membered heterocyclyl or aryl ring group or heteroaryl ring group being optionally substituted with halogen, hydroxy, alkyl, alkoxy, cycloalkyl, heterocyclyl, aryl, heteroaryl, SR', NR'(R"), COOR' or CONR'(R");

e is 3 to 8, e.g., 3, 4, 5 or 6;

R', R" and $L^2$ are as defined in the compound of formula (I) described above.

The compound or the pharmaceutically acceptable salt thereof, or the stereoisomer, rotamer, or tautomer thereof provided by some embodiments is:

(V)

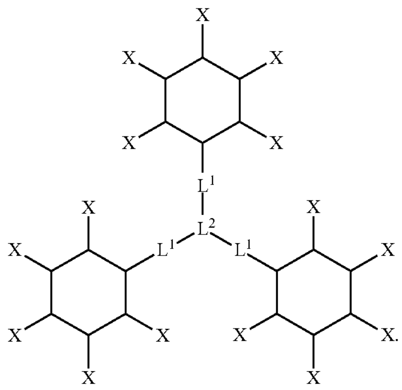

In some embodiments, in the compound of the present disclosure, e.g., the compound of formula (V), $L^2$ is selected from:

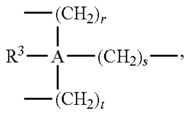

wherein r, s and t are each independently selected from the group consisting of integers of 1 to 6, e.g., 1, 2 or 3; A and $R^3$ are as defined in the compound of formula (I) described above; and $L^1$ represents —O—, —NH—, —C(═O)—, —OC(═O)—, —NHC(═O)—, —S— or a single bond.

In some embodiments, in the compound of the present disclosure, e.g., the compound of formula (V), $L^2$ is selected from:

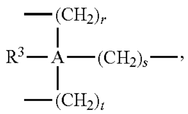

wherein r, s and t are each independently selected from the group consisting of integers of 1 to 6, e.g., 1, 2 or 3; A and $R^3$ are as defined in the compound of formula (I) described above; and $L^1$ represents —O—, —NH—, —C(═O)—, —OC(═O)— or a single bond.

In some embodiments, in the compound of the present disclosure, e.g., the compound of formula (V), $L^2$ is selected from:

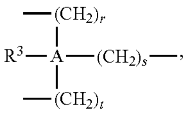

wherein r, s and t are each independently selected from the group consisting of integers of 1 to 6, e.g., 1, 2 or 3; A and $R^3$ are as defined in the compound of formula (I) described above; and $L^1$ represents —O— or —OC(═O)—; A is selected from the group consisting of a nitrogen atom and $C_{1-6}$ alkyl (including but not limited to methyl, ethyl, propyl, or butyl). Further, $R^3$ is selected from the group consisting of hydrogen, hydroxy, $C_{1-6}$ alkyl (including but not limited to methyl, ethyl, propyl, or butyl), $C_{1-6}$ alkoxy (including but not limited to methoxy, ethoxy, propoxy, or butoxy), and $C_{3-7}$ cycloalkyl (including but not limited to cyclopropyl, cyclobutyl, or cyclopentyl).

In some embodiments, in the compound of the present disclosure, e.g., the compound of formula (V), $L^2$ is selected from:

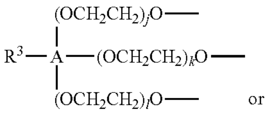

or

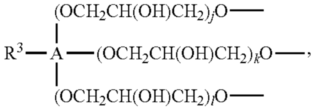

wherein the moiety A is selected from the group consisting of a nitrogen atom, $C_{1-6}$ alkyl, $C_{3-7}$ cycloalkyl, and 5-membered or 6-membered heterocyclyl or aryl ring group or heteroaryl ring group, the carbon atom, nitrogen atom, $C_{3-7}$ cycloalkyl, or 5-membered or 6-membered heterocyclyl or aryl ring group or heteroaryl ring group being optionally substituted with halogen, hydroxy, alkyl, alkoxy, cycloalkyl, heterocyclyl, aryl, heteroaryl, SR', NR'(R"), COOR' or CONR'(R"), preferably a carbon atom, a nitrogen atom or phenyl; and j, k and 1 are each independently selected from the group consisting of integers of 1 to 6, e.g., 1, 2 or 3. Further, wherein $L^1$ is selected from the group consisting of —C(═O)—, —OC(═O)—, —NHC(═O)—, and a single bond; and $R^3$ is as defined in the compound of formula (I) described above.

In some embodiments, in the compound described above, e.g., the formula (V), $R^3$ is selected from the group consisting of hydrogen, $C_{1-6}$ alkyl (including but not limited to methyl, ethyl, propyl, or pentyl), $C_{1-6}$ alkoxy (including but not limited to methoxy, ethoxy, propoxy, or pentoxy), $C_{3-7}$ cycloalkyl (including but not limited to cyclopropyl, cyclobutyl, or cyclopentyl), 5-membered or 6-membered heterocyclyl (including but not limited to furyl), 5-membered or 6-membered aryl (including but not limited to phenyl), and 5-membered or 6-membered heteroaryl (including but not limited to pyridyl).

In some embodiments, in the compound described above, e.g., the formula (V), at least two X are selected from $R^1$ and on the same formula (D), the $R^1$ being selected from or comprising polyethylene glycol of formula $R^4$—$(OCH_2CH_2)_gO$— or $R^4$—$(OCH_2CH_2)_g$—, wherein the polyethylene glycol is optionally substituted with one or more groups selected from the group consisting of hydroxy, halogen, deuterium, $C_{1-6}$ alkyl, $C_{3-7}$ cycloalkyl and $C_{3-7}$ cycloalkylene; and the remaining X are independently selected from the group consisting of hydrogen, —OH, $OPO_3^{2-}$, $OPSO_2^{2-}$, $OSO_3^-$ and $CO_2^-$.

In some other embodiments, the compound of the present disclosure or the pharmaceutically acceptable salt thereof, or the stereoisomer, rotamer, or tautomer thereof, is:

(Va)

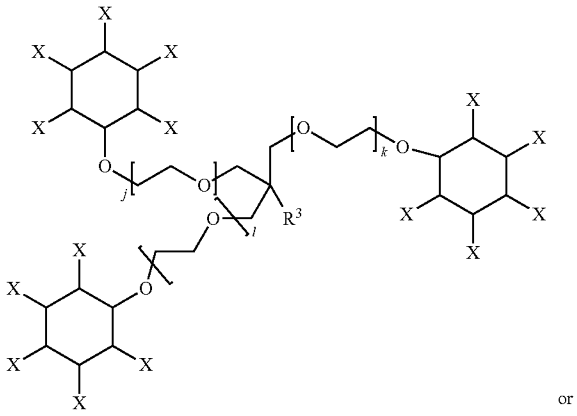

or (Vb)

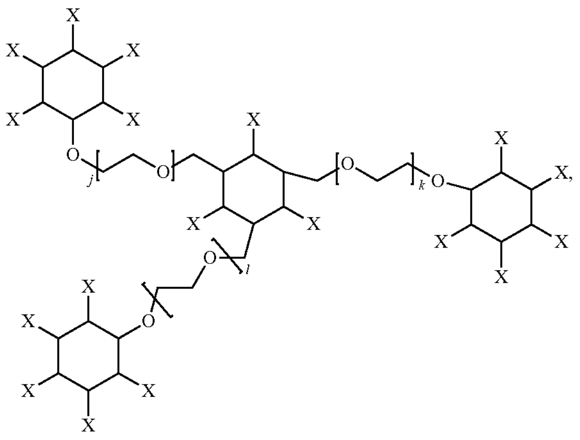

wherein j, k and 1 are each independently selected from the group consisting of integers of 1 to 6, e.g., 1, 2 or 3; and X is as defined in the formula (I).

In some other embodiments, the compound of the present disclosure or the pharmaceutically acceptable salt thereof, or the stereoisomer, rotamer, or tautomer thereof, is (Va)

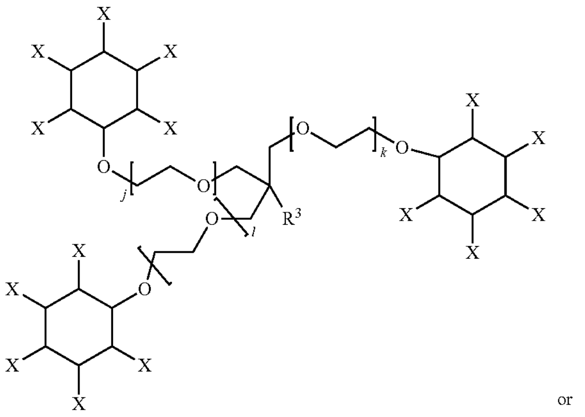

or (Vb)

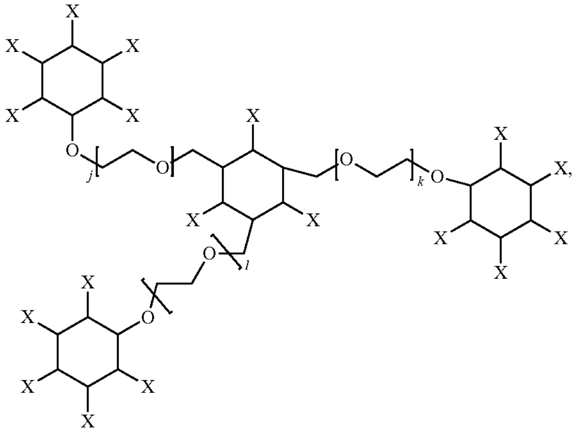

wherein X is selected from $R^1$, the $R^1$ being selected from or comprising polyethylene glycol of formula $R^4$—$(OCH_2CH_2)_gO$— or $R^4$—$(OCH_2CH_2)_g$—, wherein the polyethylene glycol is optionally substituted with one or more groups selected from the group consisting of hydroxy, halogen, deuterium, $C_{1-6}$ alkyl, $C_{3-7}$ cycloalkyl and $C_{3-7}$ cycloalkylene, and $R^4$ is selected from the group consisting of hydrogen, methyl, ethyl, trifluoromethyl and cyclopropyl.

In some embodiments, in the compound described above, e.g., the formula (Va), $R^3$ is selected from the group consisting of hydrogen, hydroxy, alkyl, alkoxy, cycloalkyl, heterocyclyl, aryl, and heteroaryl.

In some embodiments, in the compound described above, e.g., the formula (Va), $R^3$ is selected from $C_{1-6}$ alkyl, e.g., methyl, ethyl, or propyl. In some embodiments, in the compound described above, e.g., the formula (Va), $R^3$ is selected from $C_{1-6}$ alkoxy, e.g., methoxy or ethoxy.

In some embodiments, in the compound described above, e.g., the formula (Va), $R^3$ is selected from $C_{3-7}$ cycloalkyl, e.g., methoxy or ethoxy.

In another aspect, the compound of the present disclosure or the pharmaceutically acceptable salt thereof, or the stereoisomer, rotamer, or tautomer thereof, is (VI)

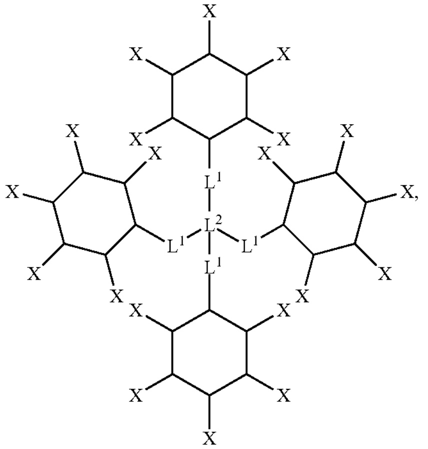

wherein X, $L^1$ and $L^2$ are as defined in the compound (I) described above.

In some embodiments, in the compound described above, e.g., the formula (VI), $L^1$ is selected from the group consisting of —C(═O)—, —OC(═O)—, —NHC(═O)— and a single bond.

In some embodiments, in the compound described above, e.g., the formula (VI), $L^2$ is selected from the group consisting of:

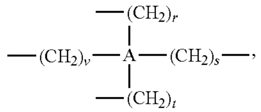

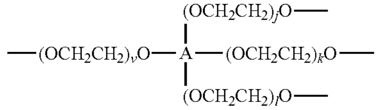

and

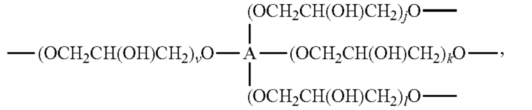

wherein the moiety A is selected from the group consisting of $C_{1-6}$ alkyl, $C_{3-7}$ cycloalkyl, and 5-membered or 6-membered heterocyclyl or aryl ring group or heteroaryl ring group, the carbon atom, nitrogen atom, $C_{3-7}$ cycloalkyl or 5-membered or 6-membered heterocyclyl or aryl ring group or heteroaryl ring group being optionally substituted with halogen, hydroxy, alkyl, alkoxy, cycloalkyl, heterocyclyl, aryl, heteroaryl, SR', NR'(R"), COOR' or CONR'(R"), preferably a nitrogen atom, $C_{1-6}$ alkyl or phenyl; and r, s, t, j, k, 1 and v are each independently selected from the group consisting of integers of 1 to 6, e.g., 1, 2 or 3.

In some embodiments, in the compound described above, e.g., the formula (VI), at least two X are selected from $R^1$ and on the same formula (D), the $R^1$ being selected from or comprising polyethylene glycol of formula $R^4$—$(OCH_2CH_2)_gO$— or $R^4$—$(OCH_2CH_2)_g$—, wherein the polyethylene glycol is optionally substituted with one or more groups selected from the group consisting of hydroxy, halogen, deuterium, $C_{1-6}$ alkyl, $C_{3-7}$ cycloalkyl and $C_{3-7}$ cycloalkylene; and the remaining X are independently selected from the group consisting of hydrogen, —OH, $OPO_3^{2-}$, $OPSO_2^{2-}$, $OSO_3^-$ and $CO_2^-$.

In some embodiments, in the compound of formula (VI) described above, A is selected from the group consisting of $C_{1-6}$ alkyl (e.g., methyl, ethyl, or propyl), $C_{3-7}$ cycloalkyl (e.g., n-butyl, cyclopentyl, or cyclohexyl), 6-membered aromatic ring group (e.g., phenyl).

In some embodiments, in the compound, the moiety A is

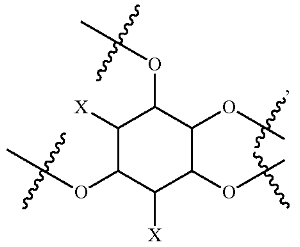

wherein X are each independently selected from the group consisting of hydroxy, $OPO_3^{2-}$, $OPSO_2^{2}$—, and $OSO_3^-$.

In some embodiments, in the compound, the moiety A is

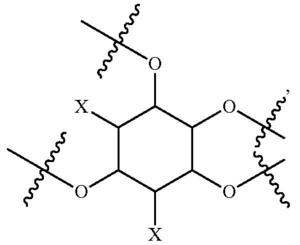

wherein X are all $OPO_3^{2-}$, $OPSO_2^{2}$— or $OSO_3^-$.

In some embodiments, in the compound of formula (VI) described above, $L^2$ is selected from the group consisting of:

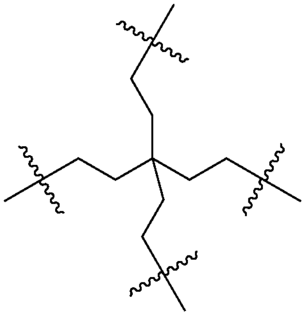

and

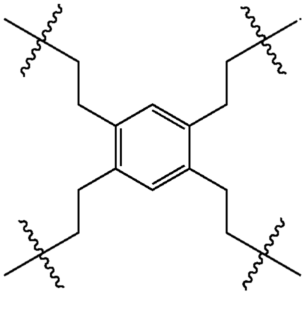

In some embodiments, in the compound of formula (VI), $R^1$ comprises polyethylene glycol of formula $R^4$—$(OCH_2CH_2)_gO$— or $R^4$—$(OCH_2CH_2)_g$—, wherein the polyethylene glycol is optionally substituted with one or more groups selected from the group consisting of hydroxy, halogen, deuterium, $C_{1-6}$ alkyl, $C_{3-7}$ cycloalkyl and $C_{3-7}$ cycloalkylene, and $R^4$ is selected from the group consisting of hydrogen, methyl, ethyl, trifluoromethyl and cyclopropyl.

In another aspect, in the compound of the present disclosure, n is 5 or 6. In some embodiments, wherein $L^2$ comprises $C_{2-20}$ linear or branched alkylene, $-(OCH_2CH_2)_eO-$, $-(OCH_2CH_2)_e-$ or $-O-(CH_2-CHOR^2-CH_2O)_e-$, and comprises a moiety A, wherein the moiety A is selected from the group consisting of $C_{1-6}$ alkyl, $C_{3-7}$ cycloalkyl, and 5-membered or 6-membered heterocyclyl or aryl ring group or heteroaryl ring group, the alkylene, $-(OCH_2CH_2)_eO-$, $-(OCH_2CH_2)_e-$ or $-O-(CH_2-CHOR^2-CH_2O)_e-$ being optionally substituted with one or more groups selected from the group consisting of hydroxyl, halogen, deuterium, $C_{1-6}$ alkyl, $C_{3-7}$ cycloalkyl and $C_{3-7}$ cycloalkylene.

In some embodiments, in the compound, the moiety A is

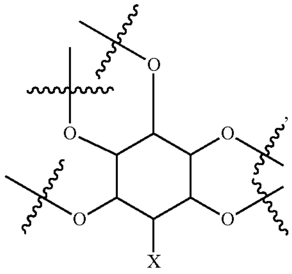
, wherein X are each independently selected from the group consisting of hydroxy, $OPO_3^{2-}$, $OPSO_2^{2}-$, and $OSO_3^-$.

In some embodiments, in the compound, the moiety A is

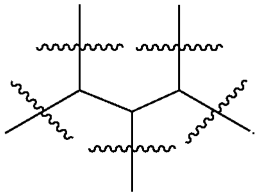
.

In some embodiments, in the compound of the present disclosure, n is 5, and $L^2$ is selected from:

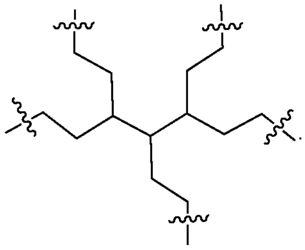
.

In some embodiments, in the compound of formula (I) of the present disclosure, $L^2$ comprises $C_{2-10}$ linear or branched alkylene, $C_{2-10}$ linear or branched alkyleneoxy, $C_{2-10}$ linear or branched alkyleneamino, $C_{2-10}$ linear or branched alkylenemercapto, $C_{2-10}$ linear or branched alkenylene, $C_{2-10}$ linear or branched alkenyleneoxy, or $C_{2-10}$ cycloalkylene-$(OCH_2CH_2)_eO-$, $-(OCH_2CH_2)_e-$ or $-O-(CH_2-CHOR^2-CH_2O)_e-$, and $L^2$ is further optionally substituted with one or more groups selected from the group consisting of hydroxy, halogen, deuterium, $C_{1-6}$ alkyl, $C_{3-7}$ cycloalkyl, and $C_{3-7}$ cycloalkylene.

In some embodiments, in the compound of formula (I) of the present disclosure, $R^3$ is selected from the group consisting of hydrogen, hydroxy, $C_{1-6}$ alkyl, $C_{1-6}$ alkoxy, $C_{3-7}$ cycloalkyl, 5-membered or 6-membered heterocyclyl or aryl ring group or heteroaryl ring group.

In some embodiments, in the compound of formula (I) of the present disclosure, $L^1$ represents $-O-$, $-C(=O)-$, $-OC(=O)-$, or a single bond.

In some embodiments, wherein $R^2$ or $R^5$ is selected from the group consisting of hydrogen, methyl and ethyl.

In some embodiments, at least three X in the compound of formula (I) are each independently selected from $R^1$, the $R^1$ being selected from or comprising polyethylene glycol of formula $R^4-(OCH_2CH_2)_gO-$ or $R^4-(OCH_2CH_2)_g-$, wherein $R^4$ is selected from the group consisting of hydrogen, methyl and ethyl, g=1-200, and the polyethylene glycol is optionally substituted with one or more groups selected from the group consisting of hydroxy, halogen, deuterium, $C_{1-6}$ alkyl, $C_{3-7}$ cycloalkyl and $C_{3-7}$ cycloalkylene; and the remaining X are all $OPO_3^{2-}$, $OPSO_2^{2}-$, or $OSO_3^-$.

In some embodiments, three X in the compound of formula (I) of the present disclosure are each independently selected from $R^1$ and on the same formula (D), the $R^1$ being selected from or comprising polyethylene glycol of formula $R^4-(OCH_2CH_2)_gO-$ or $R^4-(OCH_2CH_2)_g-$, wherein $R^4$ is selected from the group consisting of hydrogen, methyl and ethyl, g=1-200, and the polyethylene glycol is optionally substituted with one or more groups selected from the group consisting of hydroxy, halogen, deuterium, $C_{1-6}$ alkyl, $C_{3-7}$ cycloalkyl and $C_{3-7}$ cycloalkylene; and the remaining X are all $OPO_3^{2-}$, $OPSO_2^{2}-$ or $OSO_3^-$.

In some embodiments, the polyglycerol or polyethylene glycol in the compound of formula (I) of the present disclosure has a molar mass selected from the group consisting of 100 g/mol to 3000 g/mol, preferably 100 g/mol to 2500 g/mol, and more preferably 100 g/mol to 2000 g/mol.

In another aspect, $L^2$ in the compound of the present disclosure is selected from the group consisting of:

$-(OCH_2CH_2)_2O-$,

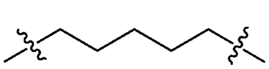
, $-(OCH_2CH_2)_3O-$,

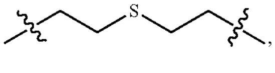
, $-(OCH_2CH_2)_4O-$,

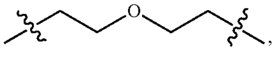
, $-(OCH_2CH_2)_5O-$,

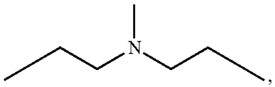
,

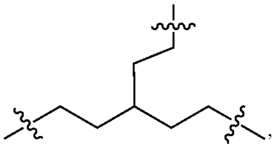
,

-continued

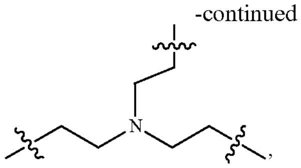

,

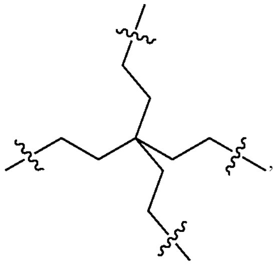

,

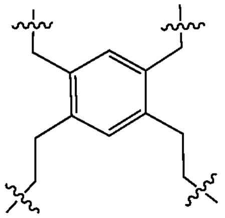

and

-continued

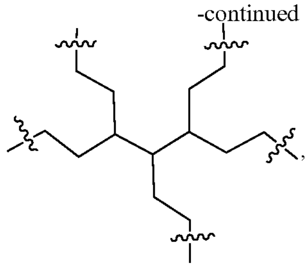

, and the $L^2$ is further optionally substituted with one or more groups selected from the group consisting of hydroxy, halogen, deuterium, amino, a nitrile group, nitro, $C_{1-6}$ alkyl, $C_{1-6}$ alkoxy, $C_{3-7}$ cycloalkyl and $C_{3-7}$ cycloalkylene.

The typical compound of the present disclosure or the pharmaceutically acceptable salt thereof, or the stereoisomer, rotamer, or tautomer thereof, includes, but is not limited to:

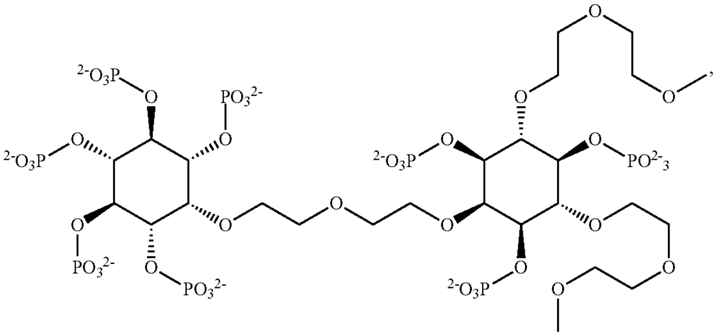

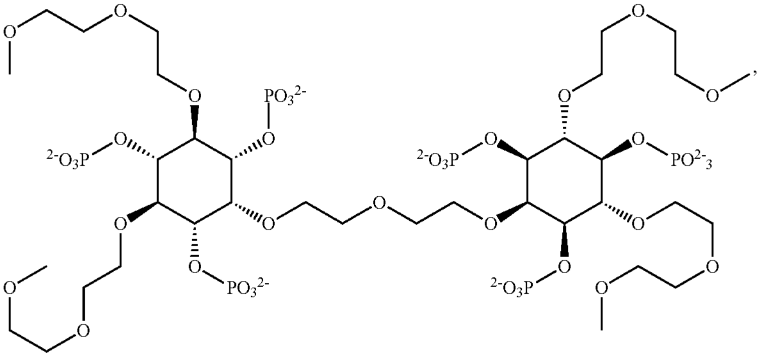

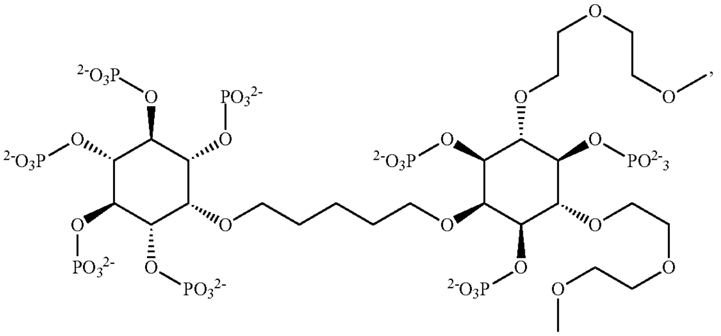

-continued
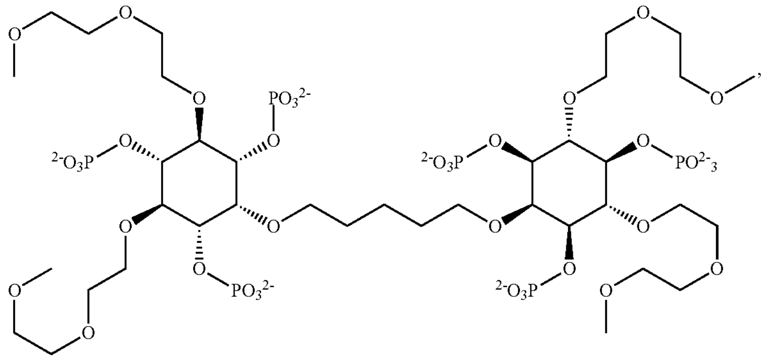
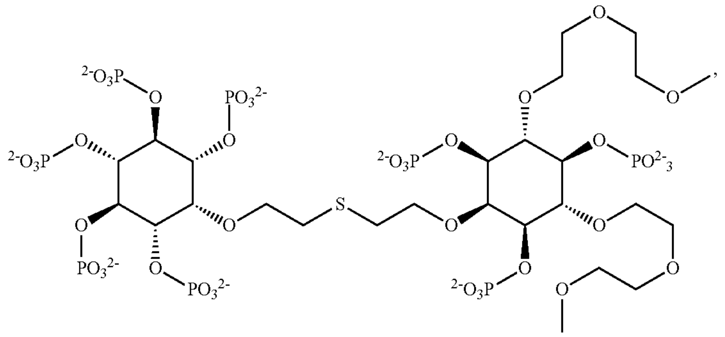
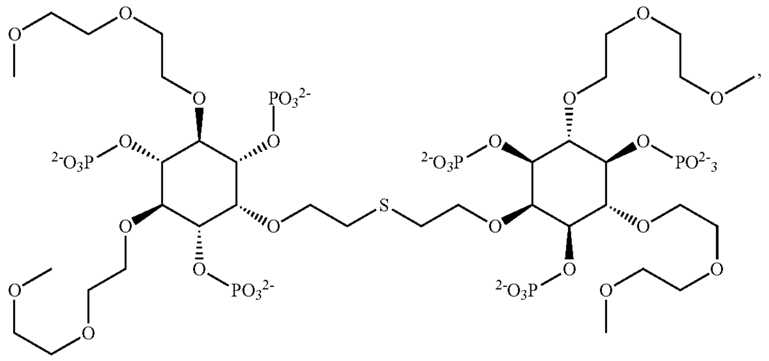
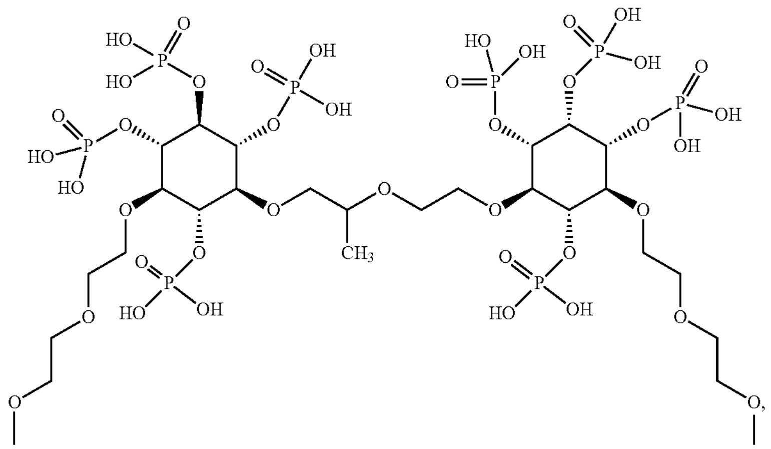

-continued
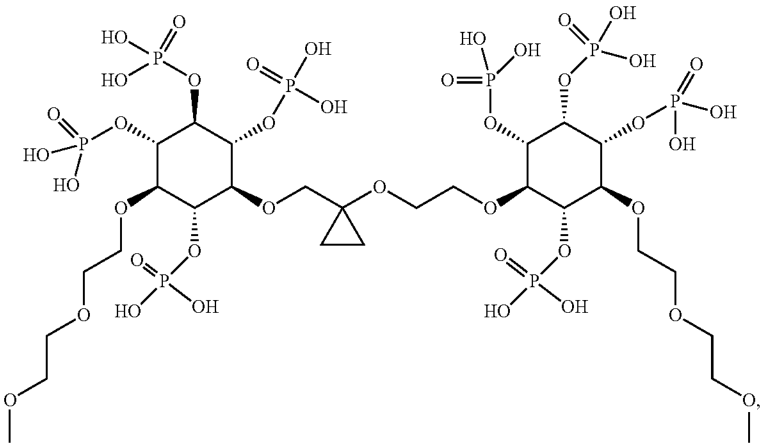
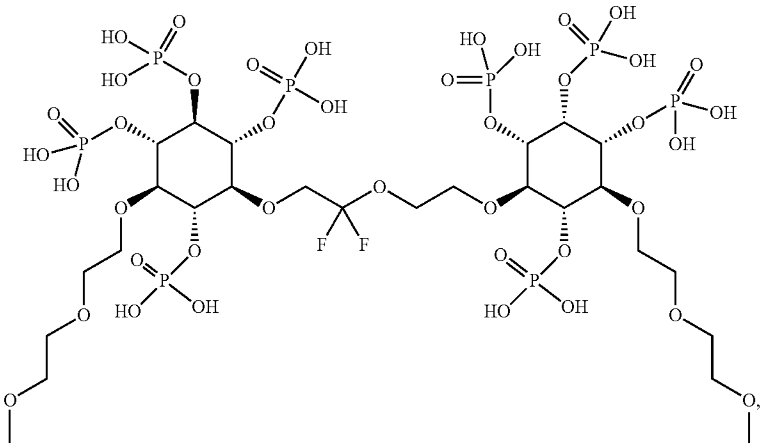
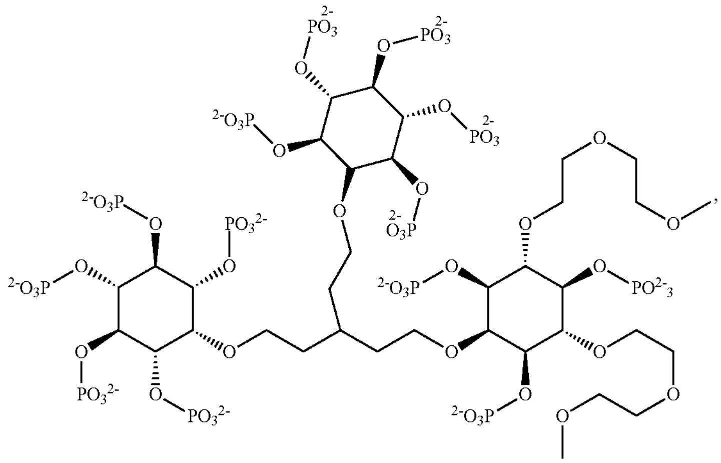

-continued
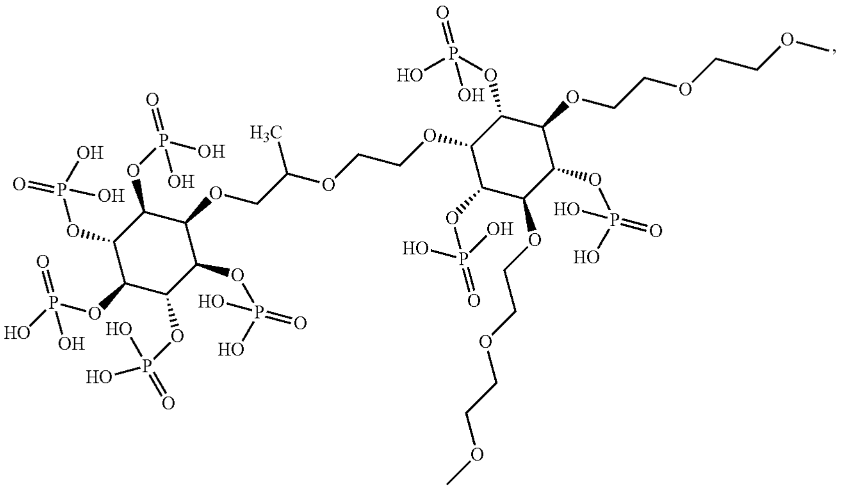
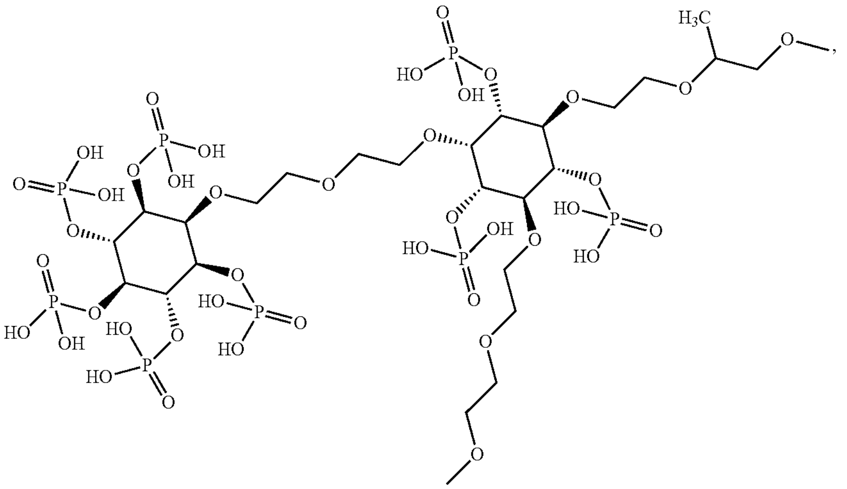
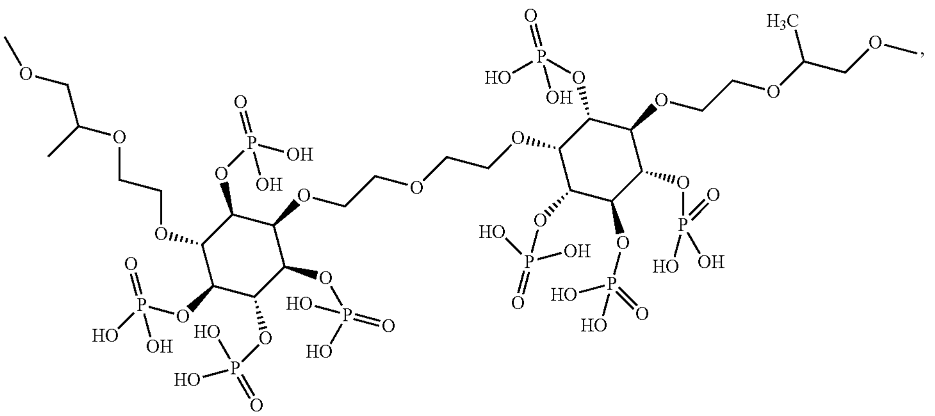

-continued
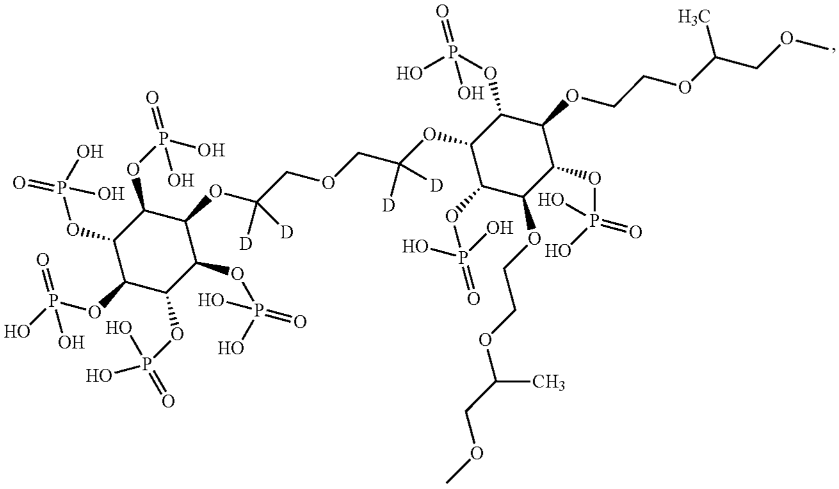
,
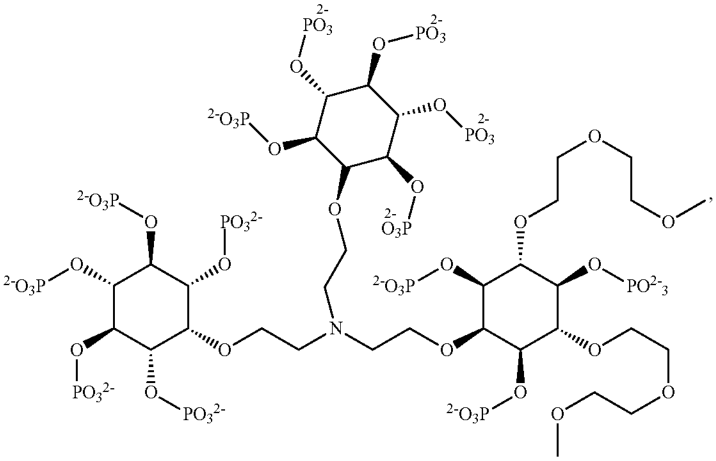
,
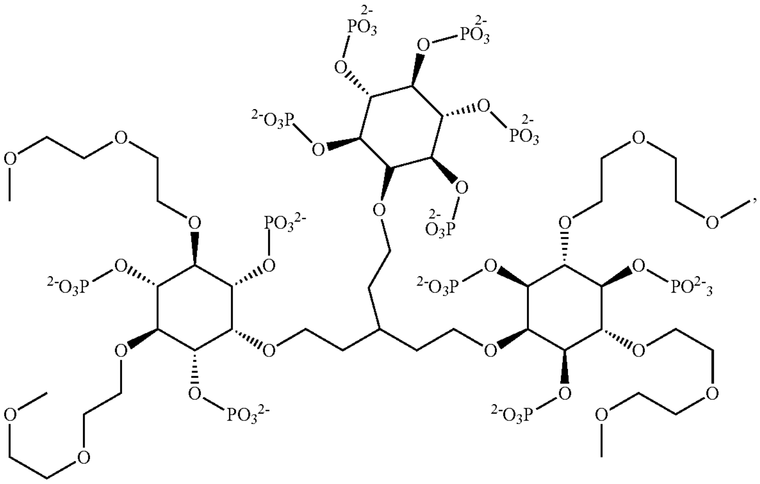
,

-continued
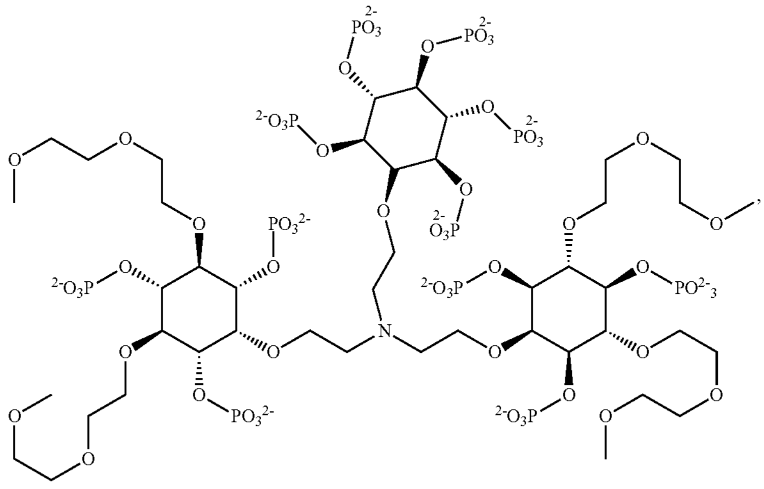
,
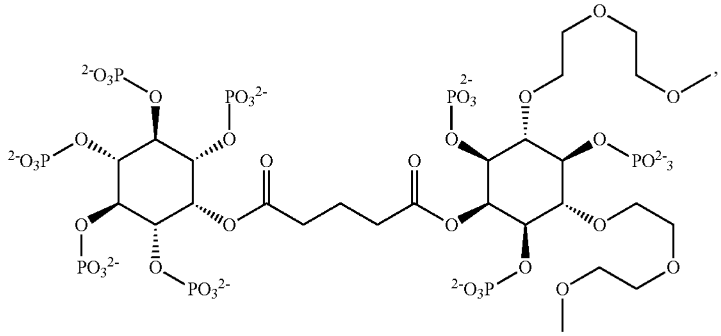
,
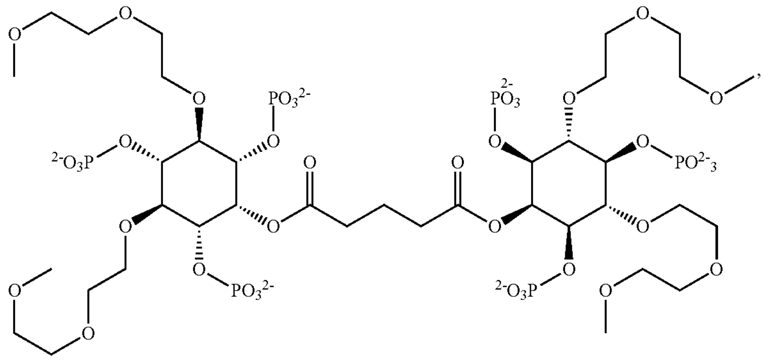
,
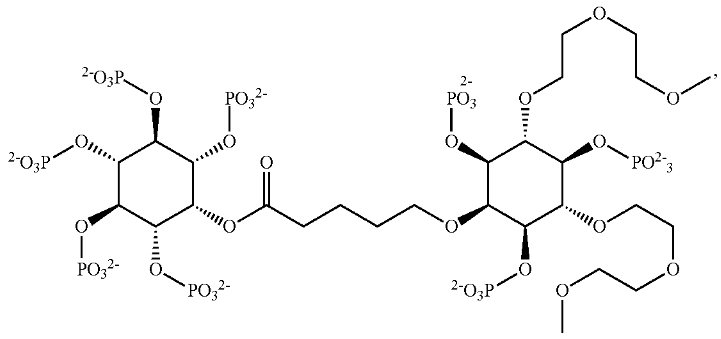
,

-continued
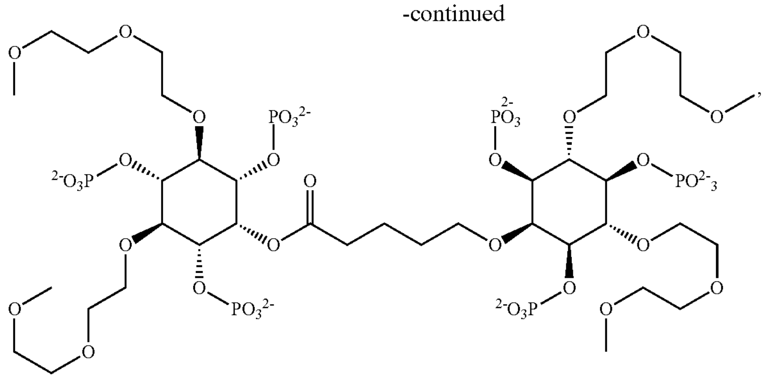
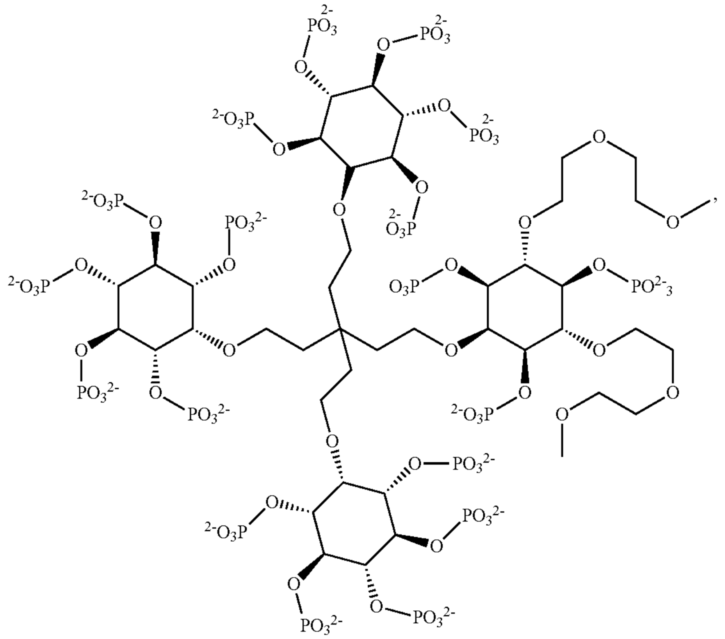
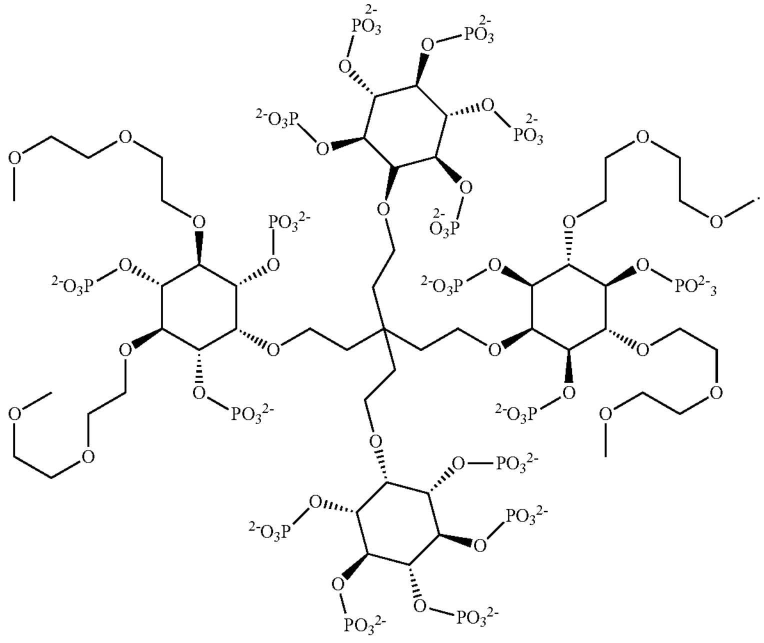

In another aspect, the typical compound of the present disclosure or the pharmaceutically acceptable salt thereof, or the stereoisomer, rotamer, or tautomer thereof, includes, but is not limited to:
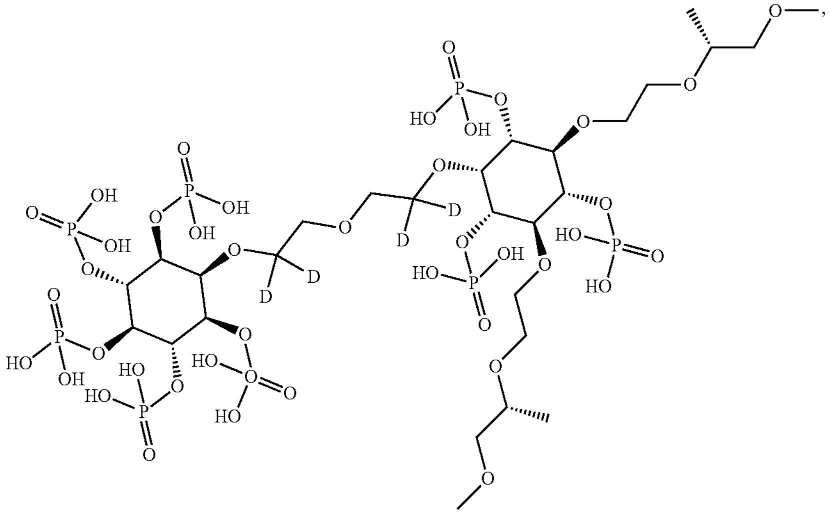
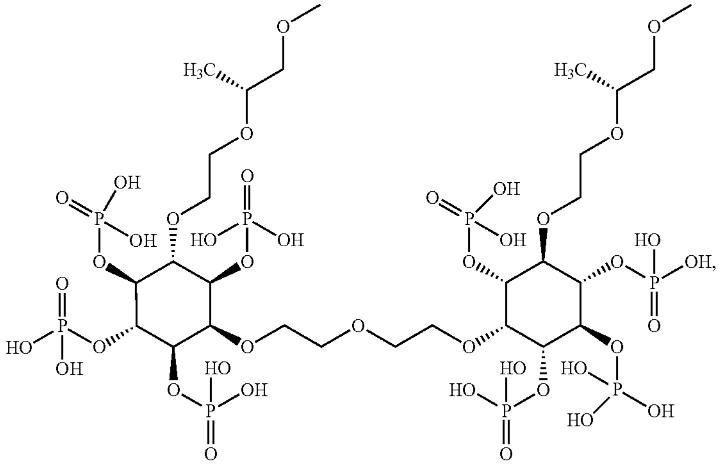
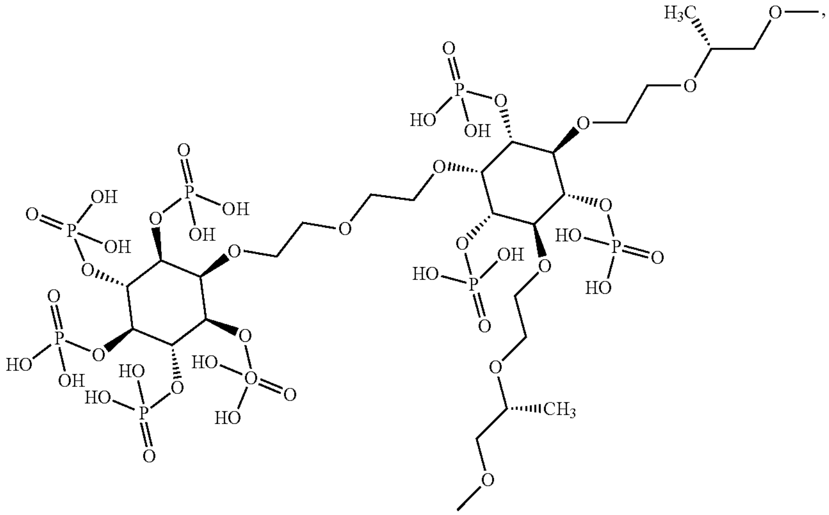

-continued
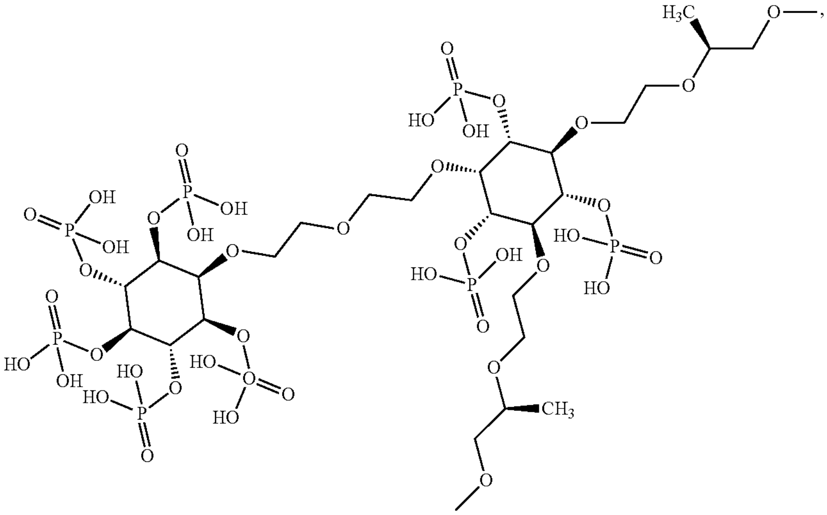
,
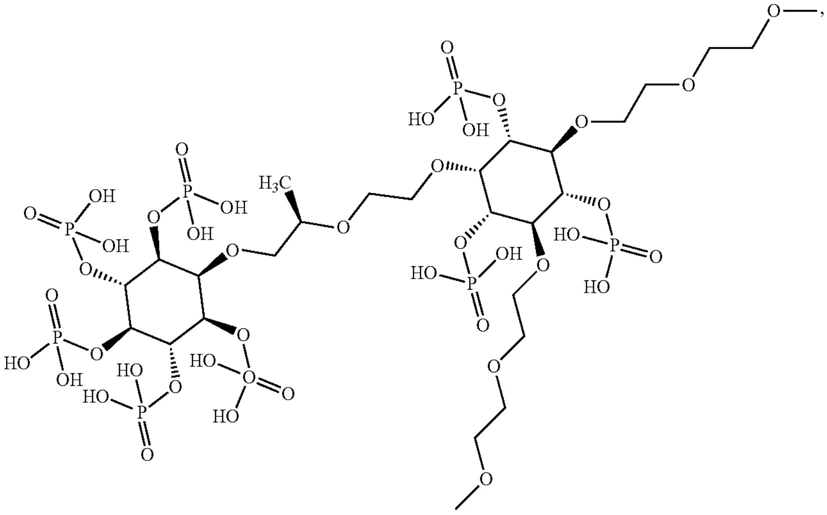
,
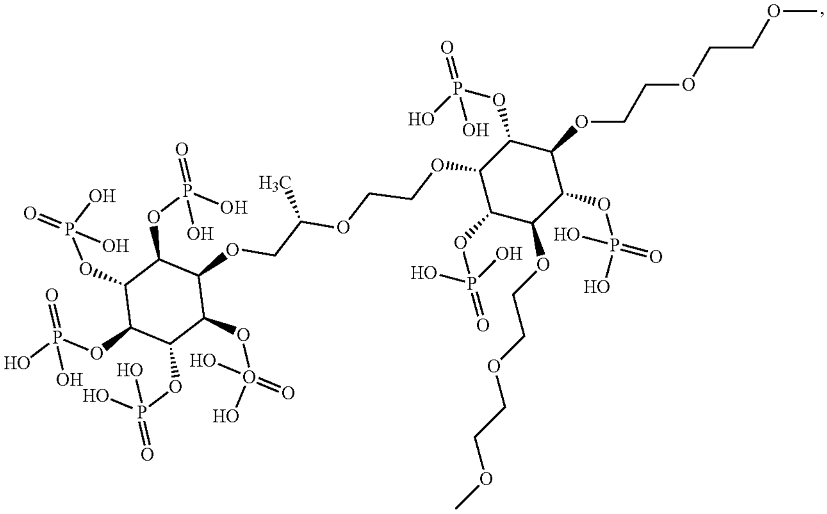
,

In another aspect, the present disclosure also provides the following compounds or pharmaceutically acceptable salts thereof, or stereoisomers, rotamers or tautomers thereof:
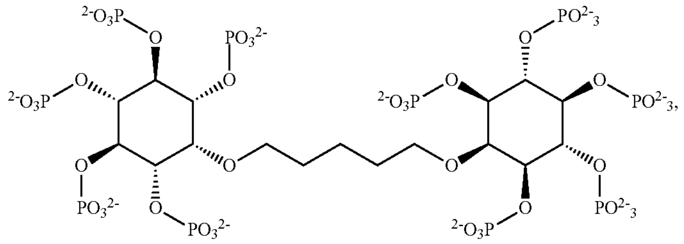
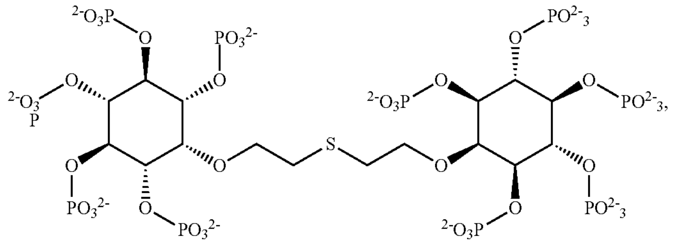
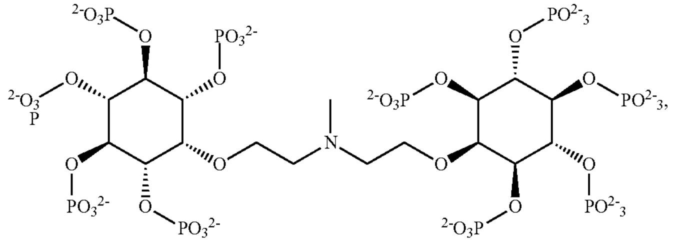
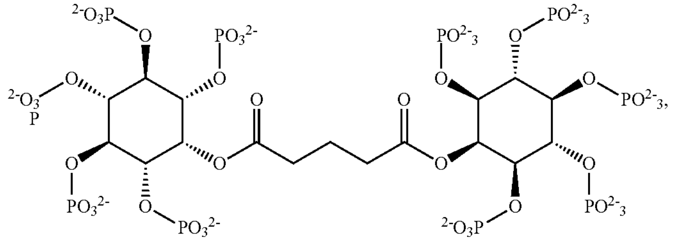
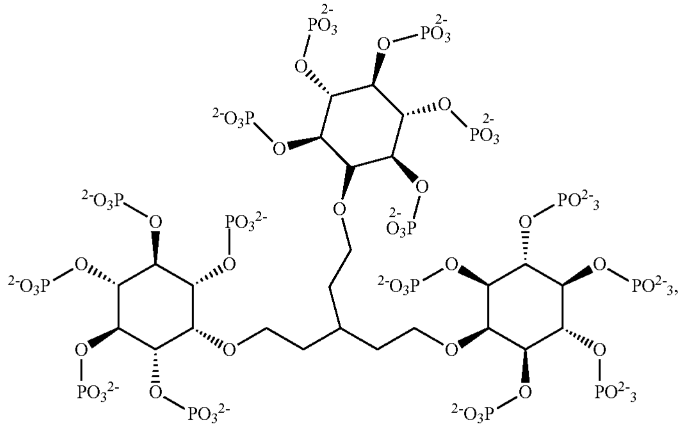

-continued
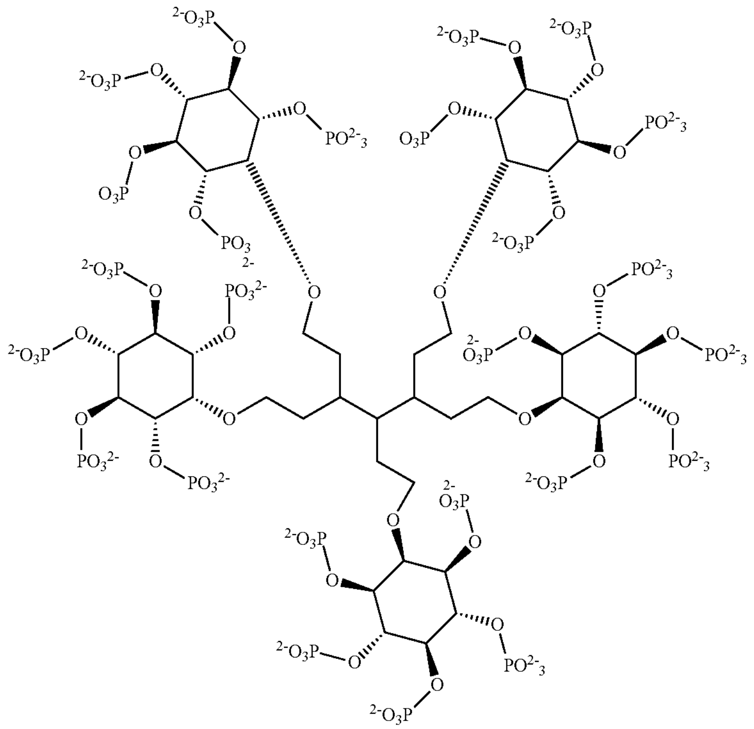
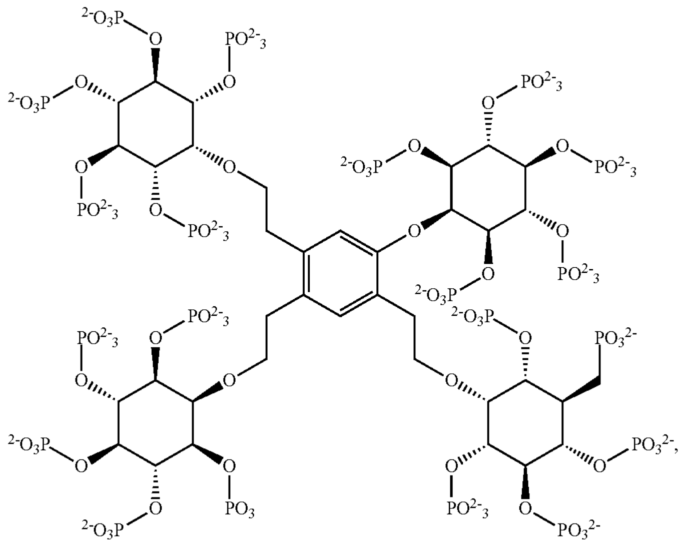
,

-continued

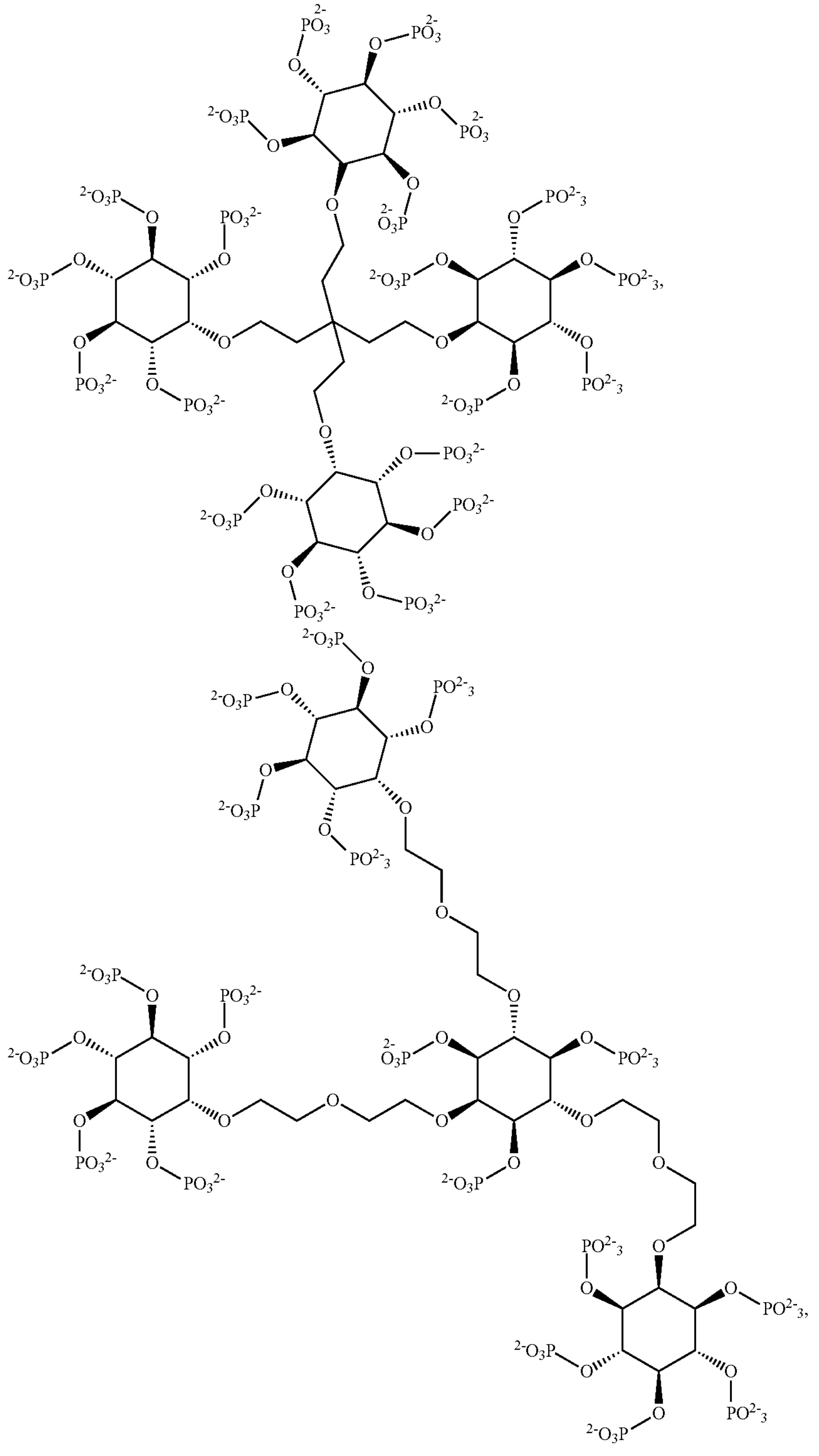

In another aspect, the present disclosure also provides a pharmaceutical composition, which comprises at least one therapeutically effective amount of the compound of formula (I) or the pharmaceutically acceptable salt thereof, or the stereoisomer, rotamer or tautomer thereof, and a pharmaceutically acceptable auxiliary material optionally selected from at least one of pharmaceutically acceptable excipients.

In some embodiments, the pharmaceutical composition is in unit dose of 0.001-1000 mg.

In some embodiments, the pharmaceutical composition comprises 0.01%-99.99% of the compound of formula (I) described above or the pharmaceutically acceptable salt thereof based on the total weight of the composition. In certain embodiments, the pharmaceutical composition comprises 0.01%-99.99% of a pharmaceutically acceptable excipient based on the total weight of the composition.

In another aspect, the present disclosure provides use of the compound or the pharmaceutically acceptable salt thereof, or the stereoisomer, rotamer or tautomer thereof described in the above schemes, or the pharmaceutical composition described above, in preparing a medicament for treating or preventing a disease associated with calcium disorders, wherein the disease associated with calcium disorders is selected from the group consisting of kidney stone, cardiovascular calcification, cardiovascular diseases, osteoporosis, bone cancer, podagra, calcific tendonitis, calcinosis cutis, rheumatoid arthritis, bone mineral diseases, osteomalacia, adynamic bone, calciphylaxis and cardiovascular diseases.

The compound of the present disclosure may be present in any form commonly used in pharmaceutical technology. Specific embodiments include, but are not limited to, sodium salts, magnesium salts, potassium salts or mixtures of the forms described above. Other pharmaceutically acceptable salts are known to those skilled in the art and may be obtained, inter alia, from Haynes et al, *J. Pharmaceutical Sci.* 94, 2005, 2111-2120. In some embodiments, the compounds described above, e.g., the compound of formula (I), are present in the form of their sodium salts, magnesium salts, or potassium salts.

In another aspect, the hydrogen in the functional group of the compound of the present disclosure can be deuterated to obtain the corresponding deuterated compound. The deuterated compound retains the selectivity and potential comparable to those of the hydrogen analog; deuterium bonds are more stable, which make "ADME", i.e., "toxic pharmacokinetics", different, thereby providing clinically beneficial effects.

Toxic pharmacokinetics include the absorption, distribution, metabolism and excretion of exogenous chemicals by an organism.

Terms and Definitions:

The term "pharmaceutically acceptable excipient" includes, but is not limited to, any adjuvant, carrier, excipient, glidant, sweetener, diluent, preservative, dye/colorant, flavoring agent, surfactant, wetting agent, dispersant, suspending agent, stabilizer, isotonic agent, solvent, or emulsifier that has been approved by the U.S. food and drug administration for use in humans or livestock animals.

The term "pharmaceutical composition" refers to a mixture containing one or more of the compounds described herein or a physiologically/pharmaceutically acceptable salt or pro-drug thereof, and other chemical components, for example, physiologically/pharmaceutically acceptable carriers and excipients. The purpose of the pharmaceutical composition is to promote the administration to an organism, which facilitates the absorption of the active ingredient, thereby exerting biological activities.

The compound of the present disclosure may contain one or more asymmetric centers and thus enantiomers and diastereomers may be generated. The enantiomers and diastereomers may be defined in terms of absolute stereochemistry as (R)- or (S)-, or other stereoisomeric forms of (D)- or (L)- for amino acids. The present disclosure includes all possible isomers as well as racemic and optically pure forms thereof. Optically active (+) and (−), (R)- and (S)-, or (D)- and (L)-isomers may be prepared by using chiral synthons or chiral reagents, or may be prepared by using conventional methods such as chromatography and fractional crystallization. Conventional methods for the preparation/separation of enantiomers include chiral synthesis from suitable optically pure precursors or resolution of the racemate (or the racemate of a salt or derivative) by using, for example, chiral high performance liquid chromatography (HPLC). When a compound described herein contains an olefinic double bond or other geometric asymmetric centers, it is meant that the compound includes both E and Z geometric isomers, unless otherwise specified. Moreover, all tautomeric forms are also intended to be included.

The present disclosure also comprises isotopically-labeled compounds which are identical to those recited herein but have one or more atoms replaced by an atom having an atomic mass or mass number different from the atomic mass or mass number usually found in nature. Examples of isotopes that can be incorporated into the compound of the present disclosure include isotopes of hydrogen, carbon, nitrogen, oxygen, phosphorus, sulfur, fluorine, iodine, and chlorine, such as $^{2}H$, $^{3}H$, $^{11}C$, $^{13}C$, $^{14}C$, $^{13}N$, $^{15}N$, $^{15}O$, $^{17}O$, $^{18}O$, $^{31}P$, $^{32}P$, $^{35}S$, $^{18}F$, $^{123}I$, $^{125}I$ and $^{36}Cl$.

The compound of the present invention may contain an unnatural proportion of atomic isotope at one or more of the atoms that constitute the compound. For example, the compound may be labeled with a radioisotope such as tritium ($^{3}H$). Hydrogen may be substituted with deuterium to form a deuterated drug, and the bond formed by deuterium and carbon is firmer than a bond formed by common hydrogen and carbon. The deuterated drug has the advantages of reduced toxic and side effects, increased drug stability, enhanced efficacy, prolonged drug biological half-life period and the like compared with an undeuterized drug. All isotopic variations of the compound of the present disclosure, whether radioactive or not, are intended to be included within the scope of the present disclosure.

Furthermore, substitution with heavier isotopes such as deuterium (i.e., $^{2}H$) may provide certain therapeutic advantages (e.g., increased in vivo half-life or reduced dose requirement) resulting from greater metabolic stability and hence may be preferred in some circumstances in which deuterium substitution may be partial or complete, wherein partial deuterium substitution refers to substitution of at least one hydrogen with at least one deuterium.

Unless otherwise stated, when a position is specifically designated as deuterium (D), that position shall be understood to be deuterium having an abundance that is at least 3000 times greater than the natural abundance of deuterium (which is 0.015%) (i.e., incorporating at least 45% deuterium).

The term "stereoisomer" refers to compounds composed of identical atoms bonded by the same bonds but with different three-dimensional structures, which are not interchangeable. The present disclosure contemplates various stereoisomers and mixtures thereof, including "enantiomers" that refer to a pair of stereoisomers that are non-superimposable mirror images of one another.

The term "tautomer" refers to the transfer of a proton from one atom of a molecule to another atom of the same molecule. Tautomers of any of the compounds are included in the present disclosure.

In the chemical structure of the compound of the present disclosure, a bond "" represents an unspecified configuration, namely if chiral isomers exist in the chemical structure, the bond "" may be "" or "", or contains both the configurations of "" and "". Although all of the above structural formulae are drawn as certain isomeric forms for the sake of simplicity, the present disclosure may include all isomers, such as tautomers, rotamers, geometric isomers, diastereomers, racemates and enantiomers. The term "monovalent group" refers to an atom or group obtained by "formally" removing a monovalent atom or group from a compound. The term "ylene" refers to an atom or atomic group formed by "formally" removing two monovalent atoms or one divalent atoms from a compound. Exemplary "alkyl" refers to the moiety of an alkane molecule remaining after removal of 1 hydrogen atom, and includes a linear or branched monovalent group of 1 to 20 carbon atoms. Non-limiting examples of alkyl containing 1 to 6 carbon atoms include methyl, ethyl, n-propyl, isopropyl, n-butyl, isobutyl, tert-butyl, sec-butyl, n-pentyl, 1,1-dimethylpropyl, 1,2-dimethylpropyl, 2,2-dimethylpropyl, various branched isomers thereof, and the like. The alkyl may be substituted or unsubstituted, and when it is substituted, the substitution with a substituent may be performed at any available connection site, and the substituent is preferably one or more of the following groups independently selected from the group consisting of aryl, heteroaryl and halogen.

The term "alkylene ($—CH_2—$)" refers to the moiety of an alkane molecule remaining after removal of 2 hydrogen atoms, and includes a linear and branched chain ylene group of 1 to 20 carbon atoms. Non-limiting examples of alkylene having 1 to 6 carbon atoms include methylene ($—CH_2—$), ethylene (e.g., $—CH_2CH_2—$ or $—CH(CH_3)—$), propylene (e.g, $—CH_2CH_2CH_2—$ or $—CH(CH_2CH_3)—$), and butylene (e.g., $—CH_2CH_2CH_2CH_2—$). The alkylene may be substituted or unsubstituted, and when it is substituted, the substitution with a substituent may be performed at any available connection site, and the substituent is preferably one or more of the following groups independently selected from the group consisting of aryl, heteroaryl and halogen.

Similarly, "alkyleneoxy", "alkyleneamino", "alkylenemercapto", "alkenylene", "alkenyleneoxy", "cycloalkylene" and "polyethylene glycolyl" are defined as "alkylene". For example, non-limiting examples of alkyleneoxy, including linear or branched alkyleneoxy having 2 to 20 carbon atoms, include: $—(CH_2OCH_2OCH_2OCH_2O)—$, $—(OCH_2OCH_2OCH_2)—$ and $—(CH_2O)—$. Non-limiting examples of alkylenemercapto, including linear or branched alkylenemercapto having 2 to 20 carbon atoms, include: $—(CH_2SCH_2SCH_2SCH_2S)—$, $—(SCH_2SCH_2SCH_2)—$ and $—(SCH_2)—$. Non-limiting examples of "alkyleneamino", including linear or branched alkyleneamino having 2 to 20 carbon atoms, include: $—(CH_2NCH_2NCH_2NCH_2N)—$, $—(NCH_2)—$, and $—(NCH_2NCH_2NCH_2)—$.

The term "alkyl" refers to a saturated aliphatic hydrocarbon group, and includes linear alkyl having 2 to 20 carbon atoms or branched alkyl having 2 to 20 carbon atoms. Non-limiting examples include n-butyl, n-pentyl, n-hexyl, or n-heptyl, and various branched chain isomers thereof, and the like. The alkyl may be substituted or unsubstituted, and when it is substituted, the substitution with a substituent may be performed at any available connection site, and the substituent is preferably one or more of the following groups independently selected from the group consisting of hydroxy, halogen, alkyl, a nitrile group, nitro, aryl, heteroaryl and alkenyl.

"Alkenyl" includes branched and linear alkenyl having 2 to 20 carbon atoms or alkenyl containing aliphatic hydrocarbon groups. For example, "$C_{2-6}$ alkenyl" refers to an alkenyl group having 2, 3, 4, 5 or 6 carbon atoms. Examples of alkenyl include, but are not limited to, ethenyl, allyl, 1-propenyl, 1-butenyl, 2-butenyl, 3-butenyl, 2-methylbut-2-enyl, 3-methylbut-1-enyl, 1-pentenyl, 3-pentenyl, and 4-hexenyl.

The term "cycloalkyl" refers to a saturated or partially unsaturated monocyclic or polycyclic hydrocarbon substituent. The cycloalkyl ring contains 2 to 20 carbon atoms, preferably 3 to 12 carbon atoms, and more preferably 3 to 7 carbon atoms. Non-limiting examples of monocyclic cycloalkyl include cyclopropyl, cyclobutyl, cyclopentyl, cyclopentenyl, cyclohexyl, cyclohexenyl, cyclohexadienyl, cycloheptyl, cycloheptatrienyl, cyclooctyl, and the like. Polycyclic cycloalkyl includes spiro cycloalkyl, fused cycloalkyl, and bridged cycloalkyl.

The cycloalkyl ring may be fused to an aryl, heteroaryl or heterocycloalkyl ring, wherein the ring attached to the parent structure is cycloalkyl. Non-limiting examples of cycloalkyl ring include, but are not limited to, indanyl, tetrahydronaphthyl, benzocycloheptyl, etc. The cycloalkyl may be optionally substituted or unsubstituted, and when it is substituted, the substituent is preferably one or more of groups independently selected from the group consisting of alkyl, alkenyl, alkynyl, alkoxy, alkylthio, alkylamino, halogen, mercapto, hydroxy, nitro, cyano, cycloalkyl, heterocycloalkyl, aryl, heteroaryl, cycloalkoxy, heterocycloalkoxy, cycloalkylthio, heterocycloalkylthio, oxo, carboxyl and a carboxylate group.

The term "heterocyclyl" refers to a saturated or partially unsaturated monocyclic or polycyclic hydrocarbon substituent containing 2 to 20 ring atoms, wherein one or more of the ring atoms are heteroatoms selected from the group consisting of nitrogen, oxygen and $S(O)_w$ (where w is an integer from 0 to 2), excluding a cyclic portion of —O—O—, —O—S— or —S—S—, and the remaining ring atoms are carbon atoms. The heterocyclyl preferably contains 3 to 12 ring atoms, of which 1 to 4 are heteroatoms; and more preferably contains 3 to 8 ring atoms. Non-limiting examples of monocyclic heterocyclyl include pyrrolidinyl, imidazolidinyl, tetrahydrofuranyl, tetrahydrothienyl, dihydroimidazolyl, dihydrofuranyl, dihydropyrazolyl, dihydropyrrolyl, piperidinyl, piperazinyl, morpholinyl, thiomorpholinyl, homopiperazinyl, and the like. Polycyclic heterocyclyl includes spiro heterocyclyl, fused heterocyclyl, and bridged heterocyclyl.

The heterocyclyl ring may be fused to an aryl, heteroaryl or cycloalkyl ring, wherein the ring connected to the parent structure is heterocyclyl. Non-limiting examples of the heterocyclyl ring include:

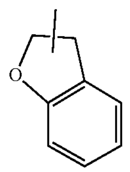

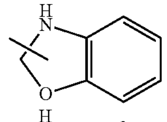

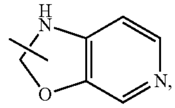
,

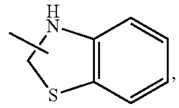
, and the like.

The heterocyclyl may be optionally substituted or unsubstituted, and when it is substituted, the substituent is preferably one or more of groups independently selected from the group consisting of alkyl, alkenyl, alkynyl, alkoxy, alkylthio, alkylamino, halogen, mercapto, hydroxy, nitro, cyano, cycloalkyl, heterocycloalkyl, aryl, heteroaryl, cycloalkoxy, heterocycloalkoxy, cycloalkylthio, heterocycloalkylthio, oxo, carboxyl and a carboxylate group.

The term "aryl" refers to a 6- to 14-membered, preferably 6- to 12-membered, carbon monocyclic or fused polycyclic (i.e., rings sharing a pair of adjacent carbon atoms) group having a conjugated π-electron system, such as phenyl and naphthyl. The aryl ring may be fused to a heteroaryl, heterocyclyl or cycloalkyl ring, wherein the ring connected to the parent structure is an aryl ring. Non-limiting examples of the aryl ring include:

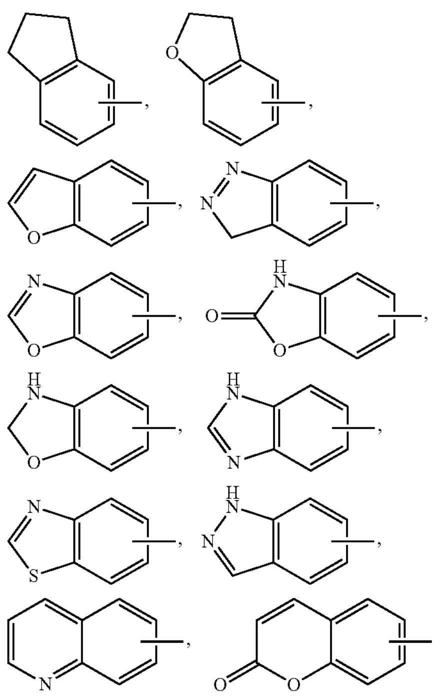

and

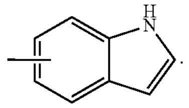

The aryl ring may be optionally substituted or unsubstituted, and when it is substituted, the substituent is preferably one or more of groups independently selected from the group consisting of alkyl, alkenyl, alkynyl, alkoxy, alkylthio, alkylamino, halogen, mercapto, hydroxy, nitro, cyano, cycloalkyl, heterocycloalkyl, aryl, heteroaryl, cycloalkoxy, heterocycloalkoxy, cycloalkylthio, heterocycloalkylthio, carboxyl and a carboxylate group, preferably phenyl.

The term "heteroaryl" refers to a heteroaromatic system containing 1 to 4 heteroatoms and 5 to 14 ring atoms, wherein the heteroatoms are selected from the group consisting of oxygen, sulfur and nitrogen. The heteroaryl is preferably 6- to 12-membered, more preferably 5- or 6-membered. For example, non-limiting examples of heteroaryl include: imidazolyl, furyl, thienyl, thiazolyl, pyrazolyl, oxazolyl, pyrrolyl, tetrazolyl, pyridyl, pyrimidinyl, thiadiazole, pyrazine,

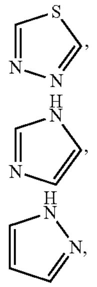

and the like.

The heteroaryl may be optionally substituted or unsubstituted, and when it is substituted, the substituent is preferably one or more of groups independently selected from the group consisting of alkyl, alkenyl, alkynyl, alkoxy, alkylthio, alkylamino, halogen, mercapto, hydroxy, nitro, cyano, cycloalkyl, heterocycloalkyl, aryl, heteroaryl, cycloalkoxy, heterocycloalkoxy, cycloalkylthio, heterocycloalkylthio, carboxyl and a carboxylate group.

The term "alkoxy" refers to —O-(alkyl) and —O-(unsubstituted cycloalkyl), wherein the alkyl is as defined above. Non-limiting examples of alkoxy include: methoxy, ethoxy, propoxy, butoxy, cyclopropyloxy, cyclobutoxy, cyclopentyloxy and cyclohexyloxy. The alkoxy may be optionally substituted or unsubstituted, and when it is substituted, the substituent is preferably one or more of groups independently selected from the group consisting of alkyl, alkenyl, alkynyl, alkoxy, alkylthio, alkylamino, halogen, mercapto, hydroxy, nitro, cyano, cycloalkyl, heterocycloalkyl, aryl, heteroaryl, cycloalkoxy, heterocycloalkoxy, cycloalkylthio, heterocycloalkylthio, carboxyl and a carboxylate group.

The term "haloalkyl" refers to an alkyl group substituted with halogen, wherein the alkyl group is as defined above.

The term "haloaryl" refers to an aryl group substituted with a halogen, where the aryl group is as defined above.

The term "haloheteroaryl" refers to a heteroaryl group substituted with halogen, wherein the heteroaryl group is as defined above.

The term "haloheterocyclyl" refers to a heterocyclyl group substituted with halogen, where the heterocyclyl group is as defined above.

The term "halocycloalkyl" refers to an cyclic group substituted with halogen, wherein the cycloalkyl group is as defined above.

The term "hydroxy" refers to —OH group.

The term "halogen" refers to fluorine, chlorine, bromine or iodine.

The term "amino" refers to $—NH_2$.

The term "cyano" refers to —CN.

The term "nitro" refers to $—NO_2$.

The term "oxo" refers to an =O substituent.

The term "thio" refers to an =S substituent.

The term "optional" or "optionally" means that the event or circumstance subsequently described may, but not necessarily, occur, and that the description includes instances where the event or circumstance occurs or does not occur. For example, "heterocyclyl group optionally substituted with alkyl" means that alkyl may be, but not necessarily, present, and that the description includes instances where the heterocyclyl group is or is not substituted with alkyl.

The term "substituted" means that one or more, preferably up to 5, more preferably 1 to 3 hydrogen atoms in the group are independently substituted with a corresponding number of substituents. It goes without saying that a substituent is only in its possible chemical position, and those skilled in the art will be able to determine (experimentally or theoretically) possible or impossible substitution without undue efforts. For example, it may be unstable when an amino or hydroxy group having a free hydrogen is bound to a carbon atom having an unsaturated (e.g., olefinic) bond. In another aspect, when the substituent is a "divalent group" such as cycloalkylene, 2 hydrogen atoms in the group are simultaneously substituted with cycloalkylene to form cycloalkyl.

The values in the present disclosure are instrument measurements, and have a certain degree of error. Generally, ±10% falls within a reasonable error range. It is of course necessary to consider the context in which the value is used, for example, for the molar mass of polyethylene glycol, the error range of the value after the measurement shall no exceed ±10%, and may be ±9%, ±8%, ±7%, ±6%, ±5%, ±4%, ±3%, ±2% or ±1%, preferably ±5%.

The structure of the compound is determined by nuclear magnetic resonance (NMR) spectroscopy and/or mass spectrometry (MS). NMR shift (8) is given in a unit of $10^{-6}$ (ppm). NMR analysis is performed using a Bruker AVANCE-400 nuclear magnetic resonance instrument, with deuterated dimethyl sulfoxide (DMSO-$d_6$), deuterated chloroform ($CDCl_3$) and deuterated methanol ($CD_3OD$) as determination solvents and tetramethylsilane (TMS) as internal standard. The spatial configurations of the optical isomers (isomers) of the compounds can be further confirmed by determining single crystal parameters.

HPLC analysis is performed using Waters ACQUITY ultra high performance LC, Shimadzu LC-20A systems, Shimadzu LC-2010HT series, or Agilent 1200 LC high performance liquid chromatograph (ACQUITY UPLC BEH C18 1.7 μm 2.1×50 mm column, Ultimate XB-C18 3.0×150 mm column, or Xtimate C18 2.1×30 mm column).

MS analysis is performed using Waters SQD2 mass spectrometer in positive/negative ion mode with a mass scan range of 100-1200.

Chiral HPLC analysis is performed using Chiralpak IC-3 100×4.6 mm I.D., 3 μm, Chiralpak AD-3 150×4.6 mm I.D., 3 μm, Chiralpak AD-3 50×4.6 mm I.D., 3 μm, Chiralpak AS-3 150×4.6 mm I.D., 3 μm, Chiralpak AS-3 100×4.6 mm I.D., 3 μm, ChiralCel OD-3 150×4.6 mm I.D., 3 μm, ChiralCel OD-3 100×4.6 mm I.D., 3 μm, ChiralCel OJ-H 150×4.6 mm I.D., 5 μm, or ChiralCel OJ-3 150×4.6 mm I.D., 3 μm chromatographic column.

Huanghai HSGF254 or Qingdao GF254 silica gel plates of specifications 0.15 mm to 0.2 mm were adopted for thin layer chromatography (TLC) analysis and 0.4 mm to 0.5 mm for TLC separation and purification.

Flash column purification is performed using a Combiflash Rf150 (TELEDYNE ISCO) or Isolara one (Biotage) system.

Forward column chromatography is generally performed using 100-200 mesh, 200-300 mesh or 300-400 mesh Yantai Huanghai silica gel as a carrier, or using a Changzhou Santai pre-fill ultrapure forward phase silica gel column (40-63 μm, 60 g, 12 g, 25 g, 40 g, 80 g or other specifications).

Reverse phase column chromatography is generally performed using a Changzhou Santai pre-fill ultrapure C18 silica gel column (20-45 μm, 100 Å, 40 g, 80 g, 120 g, 220 g or other specifications).

High pressure column purification is performed using a Waters AutoP system in combination with Waters XBridge BEH C18 OBD Prep Column, 130 Å, 5 μm, 19×150 mm or Atlantis T3 OBD Prep Column, 100 Å, 5 μm, 19×150 mm.

Chiral preparation is performed using a DAICEL CHIRALPAK IC (250×30 mm, 10 μm) or Phenomenex-Amylose-1 (250×30 mm, 5 μm) column.

Starting materials known in the present disclosure may be synthesized using or according to methods known in the art, or may be purchased from Shanghai Titan Scientific, ABCR GmbH & Co. KG, Acros Organics, Aldrich Chemical Company, Accela ChemBio Inc., Darui Chemicals, and other companies.

In the examples, the reactions can be performed in an argon atmosphere or a nitrogen atmosphere unless otherwise specified.

The argon atmosphere or nitrogen atmosphere means that the reaction flask is connected to a balloon containing about 1 L of argon or nitrogen.

The hydrogen atmosphere means that the reaction flask is connected to a balloon containing about 1 L of hydrogen.

Parr 3916EKX hydrogenator, Qinglan QL-500 hydrogenator or HC2-SS hydrogenator was used in the pressurized hydrogenation reactions.

The hydrogenation reactions usually involve 3 cycles of vacuumization and hydrogen purge.

A CEM Discover-S 908860 microwave reactor was used in the microwave reactions.

In the examples, a solution refers to an aqueous solution unless otherwise specified.

In the examples, the reaction temperature was room temperature, i.e., 20° C. to 30° C., unless otherwise specified.

The reaction progress in the examples is monitored by thin layer chromatography (TLC).

DETAILED DESCRIPTION

The present disclosure is further described below with reference to examples, which are not intended to limit the scope of the present disclosure.

Experimental procedures without conditions specified in the examples of the present disclosure are generally conducted according to conventional conditions, or according to conditions recommended by the manufacturer of the starting materials or commercial products. Reagents without specific origins indicated are commercially available conventional reagents.

Example 1

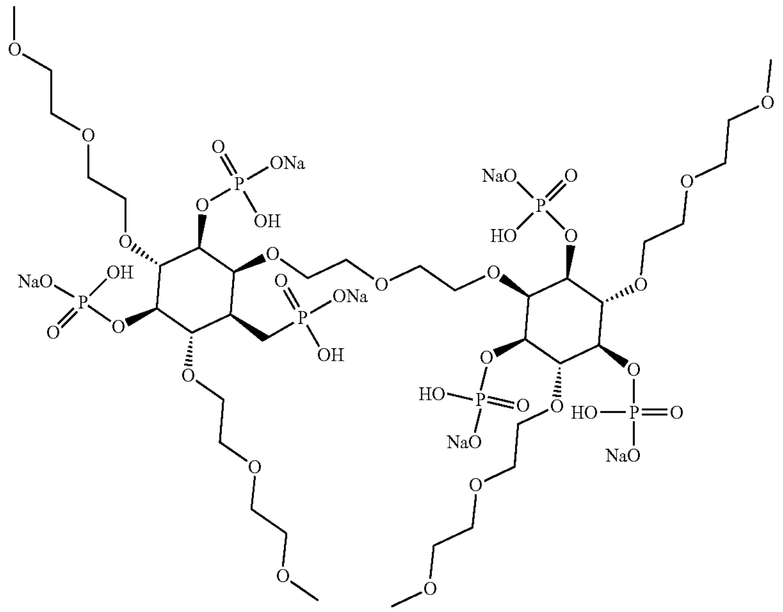

1a

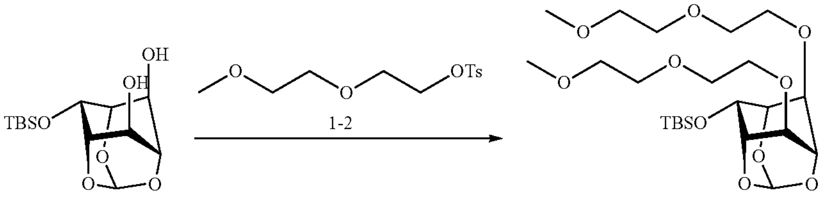

1-2

1-1

1-3

To a 250 mL single-neck flask were added compound 1-1 (synthesized according to the method in CN108367080A, 3.04 g, 10 mmol) and DMF (30 mL), and the mixture was cooled in an ice bath, followed by the addition of NaH (0.96 g, 24 mmol). Compound 1-2 (synthesized according to the method described in U.S. Pat. No. 6,645,951, 6.03 g) was dissolved in DMF (30 mL), and the solution was added dropwise to the above reaction system. The mixture was stirred at room temperature until the reaction was substantially completed, and extracted with MTBE. The organic phases were combined, dried over anhydrous sodium sulfate, filtered and concentrated. The residue was purified by silica gel column chromatography to give compound 1-3 (2.15 g).

Ms (ESI): m/z 509 $[M+H]^+$.

$^1$H-NMR (400 MHz, $CDCl_3$): δ 5.51 (s, 1H), 4.43 (s, 1H), 4.25-4.20 (m, 3H), 4.12-4.11 (m, 2H), 3.75-3.50 (m, 16H), 3.37 (s, 6H), 0.93 (s, 9H), 0.13 (s, 6H).

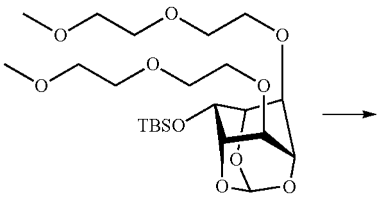

1-3

-continued

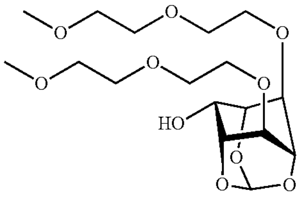

1-4

To a 100 mL plastic flask were added compound 1-3 (1.52 g, 2.99 mmol) and THF (15 mL), and the mixture was cooled in an ice bath, followed by the addition of pyridine hydrogen fluoride (15 mL, containing 65-70% HF). The resulting mixture was reacted at room temperature for 12 h. The reaction solution was added to a saturated aqueous sodium bicarbonate solution to quench the reaction, and the mixture was extracted with ethyl acetate. The organic phases were combined, dried over anhydrous sodium sulfate, filtered and concentrated to give compound 1-4 (1.1 g). Ms (ESI): m/z 395 $[M+H]^+$.

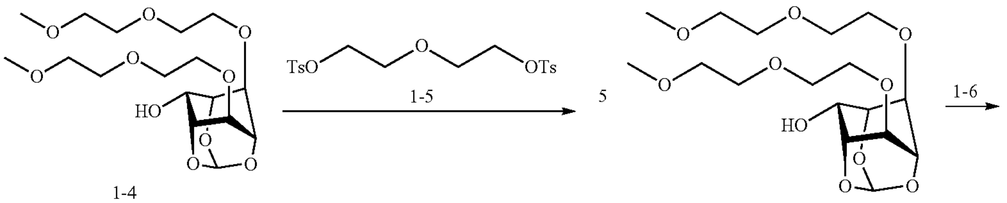

1-4

1-4

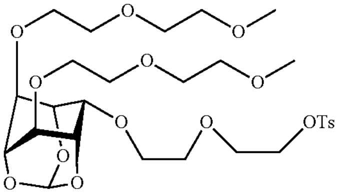

1-6

To a 100 mL single-neck flask were added compound 1-4 (1.379 g, 3.5 mmol) and DMF (14 mL), and the mixture was cooled in an ice bath, followed by the addition of NaH (120 mg). After the addition, compound 1-5 (synthesized according to the method described in U.S. Pat. No. 4,001,279, 1.75 g) was dissolved in DMF (20 mL), and the solution was added dropwise to the above reaction solution until the reaction was substantially completed. The reaction solution was diluted with water (70 mL), and extracted with MTBE (35 mL×2). The organic phases were combined, dried over anhydrous sodium sulfate, filtered and concentrated. The crude product was purified by column chromatography to give compound 1-6 (1.43 g).

Ms (ESI): m/z 637 $[M+H]^+$.

$^1$H-NMR (400 MHz, $CDCl_3$): δ 7.810-7.791 (d, 2H), 7.356-7.337 (d, 2H), 5.48 (s, 1H), 4.47-4.16 (m, 6H), 3.82-3.53 (m, 24H), 3.37 (s, 6H), 2.45 (s, 3H).

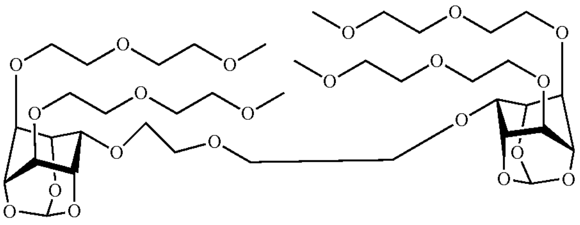

1-7

To a 50 mL single-neck flask were added compound 1-4 (0.788 g, 2 mmol) and DMF (8 mL), and the mixture was cooled in an ice bath, followed by the addition of NaH (120 mg). After the addition, compound 1-6 (1.271 g) was dissolved in DMF (12 mL), and the solution was added dropwise to the above mixture. The resulting mixture was heated to 40° C. until the reaction was substantially completed. The reaction solution was diluted with water (40 mL), and extracted with methyl tert-butyl ether. The organic phases were combined, dried over anhydrous sodium sulfate, filtered and concentrated. The crude product was purified by silica gel column chromatography to give compound 1-7 (1.08 g).

Ms (ESI): m/z 859 $[M+H]^+$.

$^1$H-NMR (400 MHz, $CDCl_3$): 5.50 (s, 2H), 4.50-4.45 (m, 2H), 4.40-4.32 (m, 4H), 4.30-4.25 (m, 4H), 3.83-3.54 (m, 42H), 3.38 (s, 12H).

To a 100 mL single-neck flask were added compound 1-7 (1.08 g, 1.26 mmol), MeOH (29 mL) and 0.1 N HCl (29 mL), and the mixture was heated to slight reflux. The reaction solution was directly concentrated to give the crude product (1.06 g). Ms (ESI): m/z 839 $[M+H]^+$.

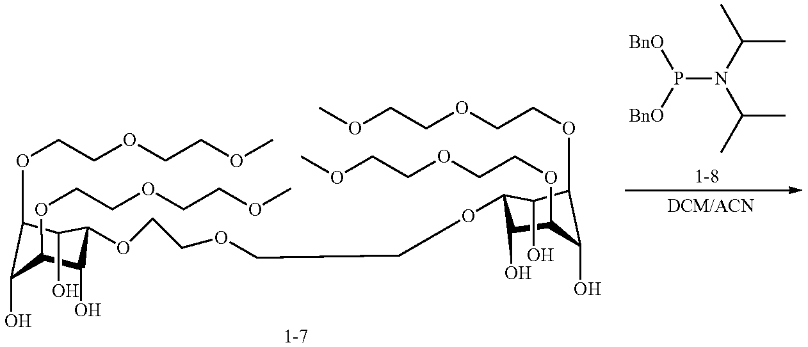

1-7

-continued

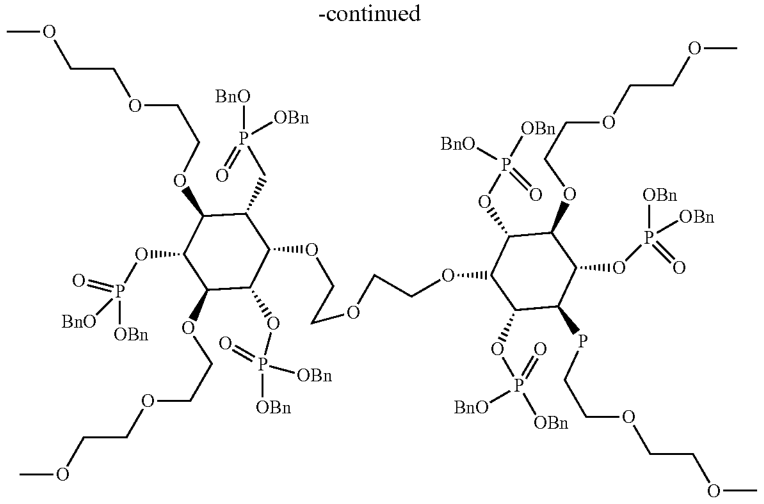

1-9

To a 50 mL single-neck flask were added the product of the previous step (600 mg, 0.7161 mmol) and tetrazole (451 mg, 6.444 mmol), and the mixture was dissolved in dichloromethane/acetonitrile (5 mL/18 mL), followed by the dropwise addition of compound 1-8 (2.223 g). After the addition, the resulting mixture was stirred at room temperature for 18 h. The reaction solution was cooled to −50° C., and m-chloroperoxybenzoic acid (1.312 g) was added. The mixture was heated to room temperature, and stirred until the reaction was substantially completed. The reaction was quenched with water (50 mL), and the reaction solution was extracted with methyl tert-butyl ether. The organic phases were combined, dried over anhydrous sodium sulfate, filtered, and concentrated to give a crude product. The crude product was purified by silica gel column chromatography to give compound 1-9 (453 mg, HPLC purity >98%).

$^{1}$H-NMR (400 MHz, $CDCl_3$): δ 7.30-7.26 (m, 60H), 5.05-5.00 (m, 24H), 4.27 (s, 2H), 4.15-3.90 (m, 6H), 3.81-3.74 (m, 16H), 3.54-3.28 (m, 28H), 3.16 (s, 12H).

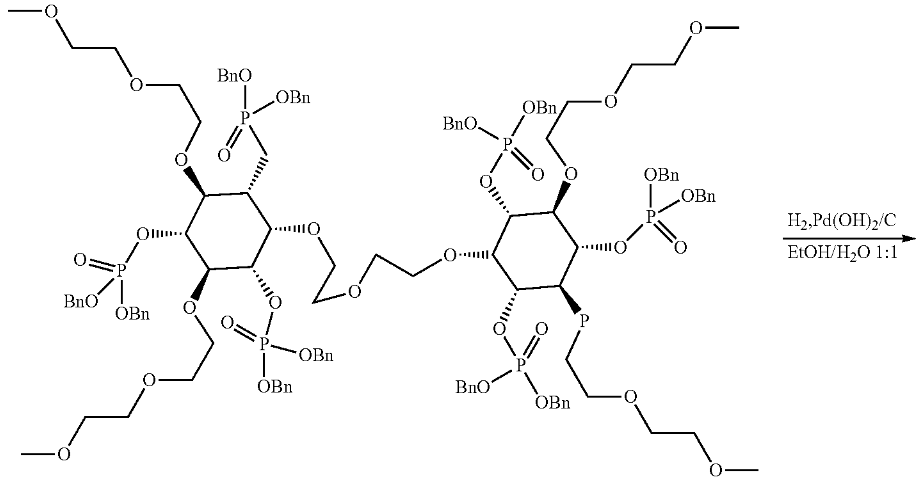

1-9

-continued
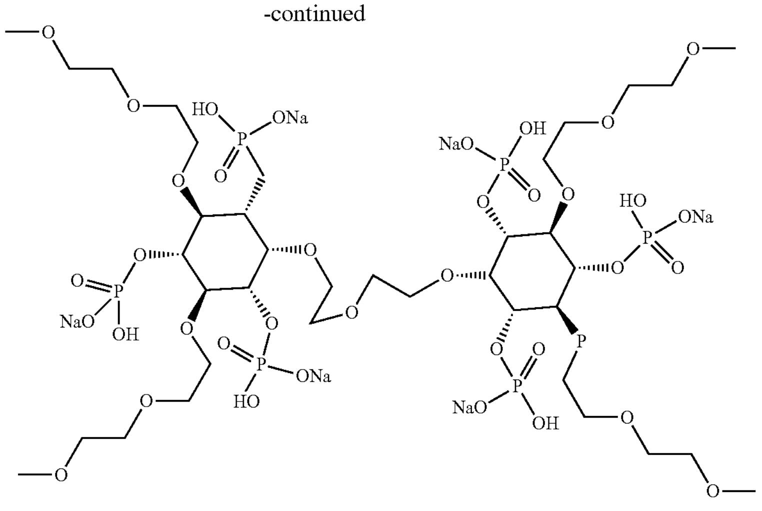
1a
To a 25 mL single-neck flask were added compound 1-9 (162 mg, 0.06 mmol), $Pd(OH)_2/C$ (50 mg, wet), $EtOH/H_2O$ (5 mL/5 mL), and sodium bicarbonate (34 mg). The mixture was reacted for 8 h under hydrogen atmosphere, and filtered. The filtrate was concentrated to remove most of organic solvent, and lyophilized to give the target product 1a (87 mg, yield: 100%).
$^1$H-NMR (400 MHz, $D_2O$): δ 4.21 (s, 2H), 3.99-3.69 (m, 50H), 3.34 (s, 12H).
Example 2
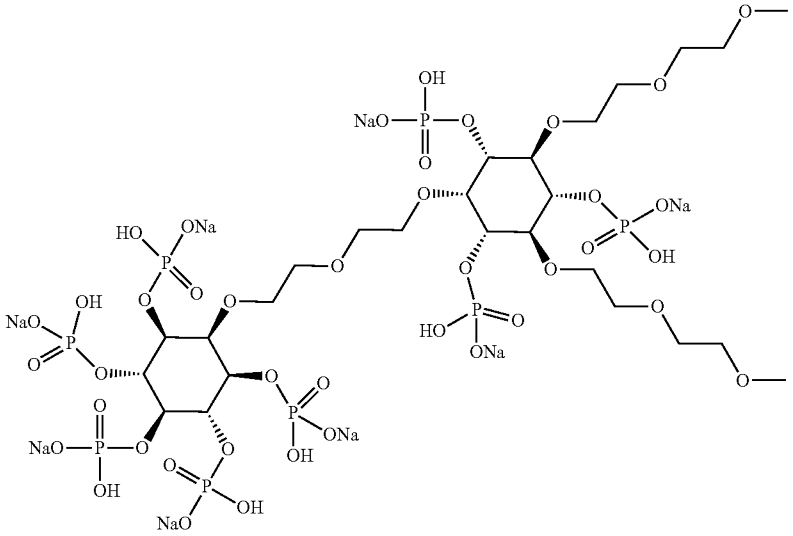
2a
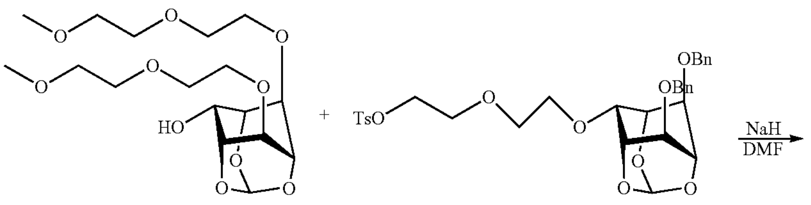
1-4 2-1

-continued

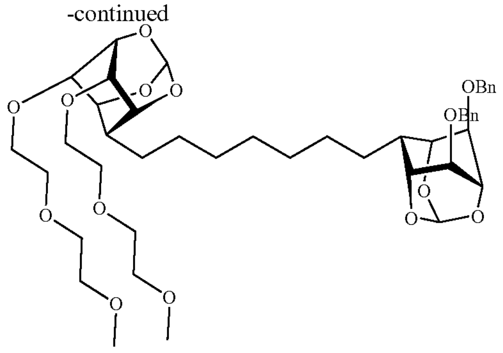

2-2

To a 250 mL single-neck flask were added compound 1-4 (1.8 g, 4.57 mmol) and DMF (20 mL), and the mixture was cooled in an ice bath, followed by the addition of NaH (220 mg). The resulting mixture was reacted at room temperature for half an hour. Compound 2-1 (3.35 g) was dissolved in DMF (40 mL), and the solution was added dropwise to the above mixture. The resulting mixture was heated to 40° C. and stirred for 18 h. The reaction solution was diluted with water (120 mL) to quench the reaction, and extracted with methyl tert-butyl ether (60 mL×3). The organic phases were combined, dried over anhydrous sodium sulfate, filtered and concentrated. The crude product was purified by silica gel column chromatography to give compound 2-2 (3 g). Ms (ESI): m/z 835[M+H]$^+$.

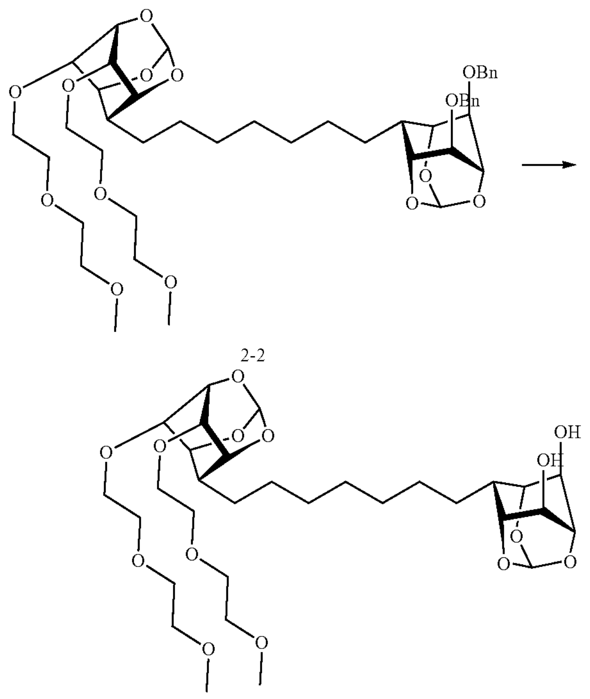

2-2

2-3

To a 250 mL hydrogenation flask were added compound 2-2 (2.8 g, 3.36 mmol), $Pd(OH)_2/C$ (1.4 g, wet) and THF (56 mL), and the mixture was heated to 40° C. and reacted for 12 h under hydrogen atmosphere (1 atm). The reaction solution was filtered, and the filtrate was concentrated. The residue was purified by silica gel column chromatography to give compound 2-3 (1.675 g). Ms: 655[M+H]$^+$.

$^1$H-NMR (400 MHz, $CDCl_3$): δ 5.50 (s, 2H), 4.54 (s, 3H), 4.47-4.24 (m, 10H), 3.93-3.53 (m, 25H), 3.38 (s, 6H).

The procedures of Example 1 were then referred to give the target product 2a.

$^1$H-NMR (400 MHz, $D_2O$): δ 4.43-3.63 (m, 36H), 3.37 (s, 6H).

Example 3

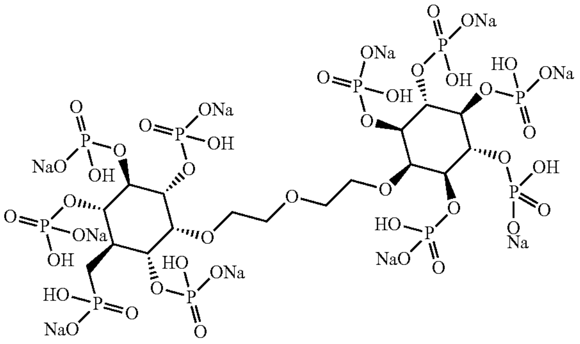

3a

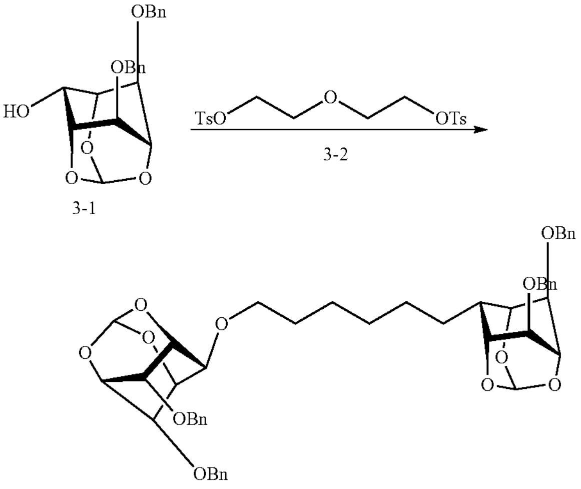

3-1

3-2

3-2

To a 250 mL single-neck flask were added compound 3-1 (synthesized according to the method described in *Organic*

*and Biomolecular Chemistry,* 2014, 13, 866-875, 4.44 g, 12 mmol) and DMF (50 mL), and the mixture was cooled in an ice bath, followed by the addition of NaH (0.624 g). Compound 3-2 (5.98 g) was dissolved in DMF (60 mL), and the solution was added dropwise to the above mixture. The resulting mixture was stirred until the reaction was substantially completed. The reaction solution was diluted with water (240 mL) to quench the reaction, and extracted with methyl tert-butyl ether (30 mL×3). The organic phases were combined, dried over anhydrous sodium sulfate, filtered and concentrated. The crude product was purified by silica gel column chromatography to give compound 3-2 (3.36 g).

Ms (ESI): m/z 811 $[M+H]^+$.

$^1$H-NMR (400 MHz, $CDCl_3$): δ 7.32-7.26 (m, 20H), 5.50 (s, 2H), 4.70-4.55 (m, 8H), 4.43 (s, 2H), 4.35-4.32 (m, 7H), 4.13-4.11 (m, 1H), 4.00-3.88 (m, 2H), 3.69-3.62 (m, 8H).

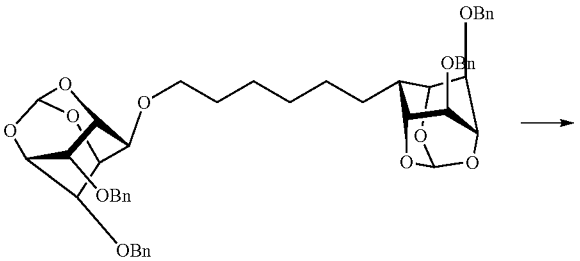

3-2

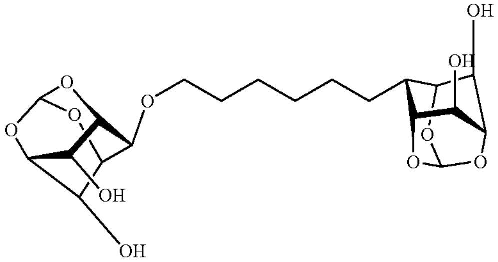

3-3

To a 250 mL hydrogenation flask were added compound 3-2 (2.6 g, 3.21 mmol), Pd/C (1.3 g, wet) and THF (52 mL), and the mixture was heated to 40° C. and reacted for 3 h under hydrogen (1 atm) atmosphere. The reaction solution was filtered, and the filtrate was concentrated. The residue was purified by silica gel column chromatography to give compound 3-3 (1.4 g, yield: 96.9%).

Ms (ESI): m/z 451 $[M+H]^+$.

$^1$H-NMR (400 MHz, $D_2O$): δ 5.50 (s, 2H), 4.50-4.44 (m, 4H), 4.40-4.30 (m, 4H), 4.25-4.24 (m, 2H), 4.00-3.90 (m, 2H), 3.82-3.80 (m, 4H), 3.73-3.71 (m, 4H).

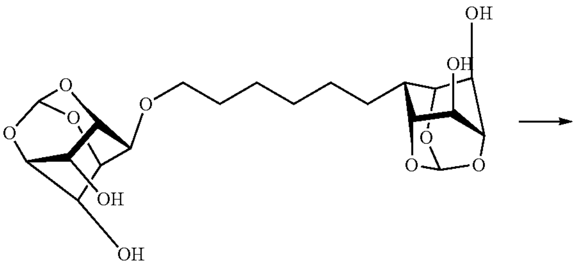

3-3

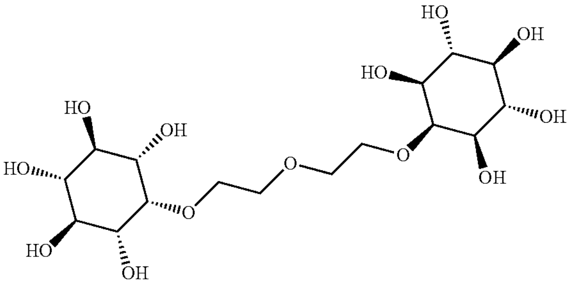

3-4

To a 250 mL single-neck flask were added compound 3-3 (1.4 g, 3.11 mmol), MeOH (30 mL), and 0.5 N HCl (30 mL), and the mixture was heated to 65° C. and reacted for 5 h. The reaction solution was directly concentrated to give compound 3-4 (1.14 g). Ms (ESI): m/z 431$[M+H]^+$.

The procedures of Example 1 were then referred to give the target product 3a.

$^1$H-NMR (400 MHz, $D_2O$): δ 4.50-4.40 (m, 4H), 4.20-3.95 (m, 12H), 3.62-3.60 (m, 4H).

Example 4

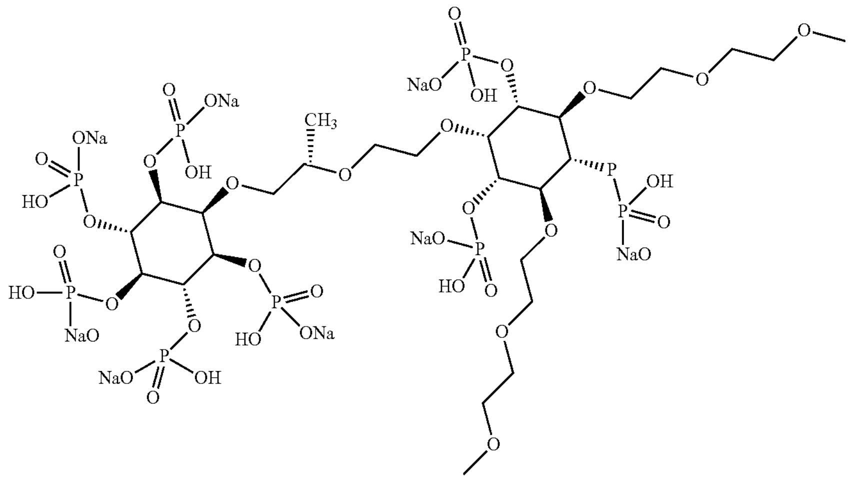

4a

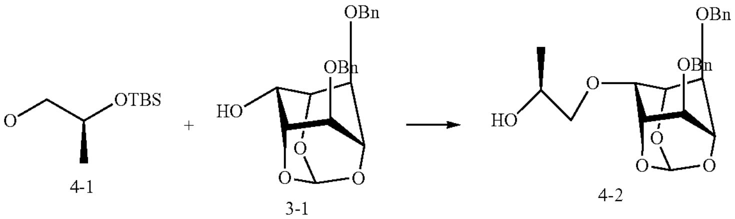

4-1 3-1 4-2

To a 50 mL single-neck flask were added compound 3-1 (740 mg, 2 mmol, synthesized according to the method described in *Organic and Biomolecular Chemistry,* 2014, 13, 866-875), compound 4-1 (1.377 g, 4 mmol, synthesized according to the method described in *Tetrahedron Asymmetry,* 1995, 5, 1097-1104) and DMSO (15 mL), and the mixture was cooled in an ice bath, followed by the addition of KOH (560 mg). The resulting mixture was stirred at 70° C. for 5 h. The reaction solution was diluted with water (30 mL) to quench the reaction, and extracted with methyl tert-butyl ether (40 mL×3). The organic phases were combined, dried over anhydrous sodium sulfate, filtered and concentrated. The crude product was purified by silica gel column chromatography to give compound 4-2 (1.02 g).

Ms (ESI): m/z 429 $[M+H]^+$.

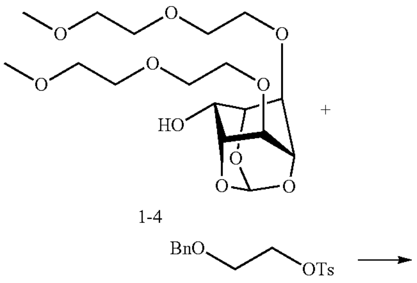

1-4

4-3

-continued

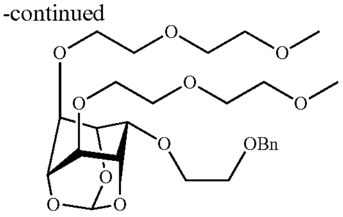

4-4

To a 100 mL single-neck flask were added compound 1-4 (1.64 g, 4.19 mmol) and DMF (5 mL), and the mixture was cooled in an ice bath, followed by the addition of NaH (252 mg). The resulting mixture was reacted at room temperature for half an hour. Compound 4-3 (1.93 g, synthesized according to the method described in *Chemistry—A European Journal,* 2009, 31, 7534-7538) was dissolved in DMF (17 mL), and the solution was added dropwise to the above mixture. The resulting mixture was heated to 45° C. and stirred for 5 h. The reaction solution was diluted with water (44 mL) to quench the reaction, and extracted with methyl tert-butyl ether (50 mL×3). The organic phases were combined, dried over anhydrous sodium sulfate, filtered and concentrated. The crude product was purified by silica gel column chromatography to give compound 4-4 (2.08 g).

Ms (ESI): m/z 529 $[M+H]^+$.

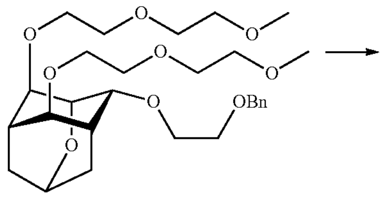

4-4

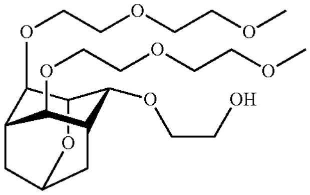

4-5

To a 100 mL hydrogenation flask were added compound 4-4 (2.08 g, 3.94 mmol), $Pd(OH)_2/C$ (1 g, wet) and THF (42 mL), and the mixture was heated to 45° C. and reacted for 5 h under hydrogen atmosphere (1 atm). The reaction solution was filtered, and the filtrate was concentrated to give compound 4-5 (1.632 g).

Ms (ESI): 439 $[M+H]^+$.

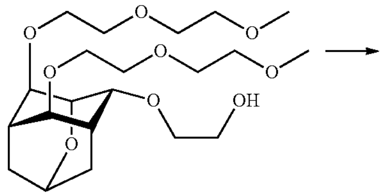

4-5

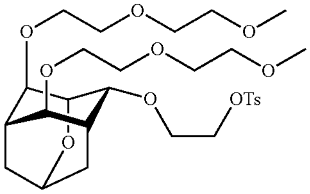

4-6

To a 100 mL single-neck flask were added compound 4-5 (1.632 g, 3.73 mmol), triethylamine (756 mg, 7.46 mmol) and dichloromethane (32 mL), and the mixture was cooled in an ice bath and reacted at room temperature for half an hour, followed by the addition of TsCl (851 mg, 4.48 mmol) and DMAP (48 mg). The resulting mixture was reacted at room temperature for 18 h. The reaction solution was directly concentrated and purified by silica gel column chromatography to give compound 4-6 (2.08 g).

Ms (ESI): m/z 593$[M+H]^+$.

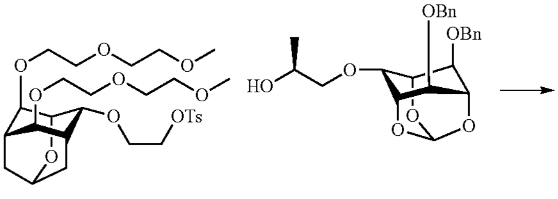

4-6 4-2

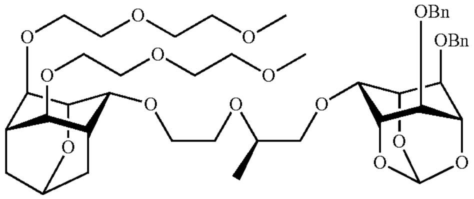

4-7

To a 50 mL single-neck flask were added compound 4-2 (0.685 g, 1.74 mmol) and DMF (10 mL), and the mixture was cooled in an ice bath, followed by the addition of NaH (139 mg). The resulting mixture was reacted at room temperature for half an hour. Compound 4-6 (1.922 g) was dissolved in DMF (10 mL), and the solution was added dropwise to the above mixture. The resulting mixture was heated to 40° C. and stirred for 18 h. The reaction solution was diluted with water (40 mL) to quench the reaction, and extracted with methyl tert-butyl ether (40 mL×3). The organic phases were combined, dried over anhydrous sodium sulfate, filtered and concentrated. The crude product was purified by silica gel column chromatography to give compound 4-7 (1.627 g).

Ms (ESI): m/z 849 $[M+H]^+$.

$^1$H-NMR (400 MHz, CDCl3) δ 7.29-7.26 (m, 10H), 5.49 (s, 2H), 4.68-4.24 (m, 10H), 3.93-3.51 (m, 25H), 3.38 (s, 6H), 1.18 (d, J=6.4 Hz, 6H).

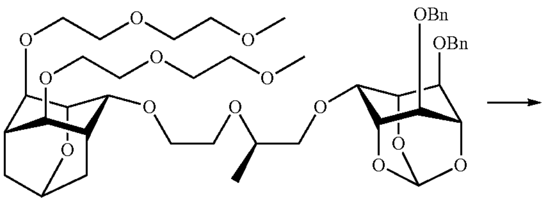

4-7

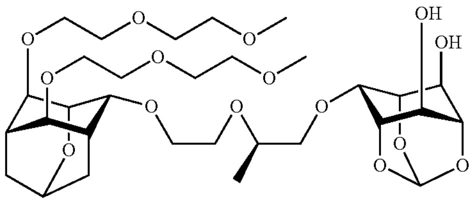

4-8

To a 100 mL hydrogenation flask were added compound 4-7 (1.627 g, 1.92 mmol), $Pd(OH)_2/C$ (0.82 g, wet) and THF (33 mL), and the mixture was heated to 45° C. and reacted for 5 h under hydrogen atmosphere (1 atm). The reaction solution was filtered, and the filtrate was concentrated. The residue was purified by silica gel column chromatography to give compound 4-8 (740 mg).
Ms (ESI): m/z 669 $[M+H]^+$.
$^1$H-NMR (400 MHz, CDCl3) δ 5.50 (s, 2H), 4.55-4.24 (m, 11H), 3.88-3.53 (m, 26H), 3.38 (s, 6H), 1.18 (d, J=6.4 Hz, 6H).
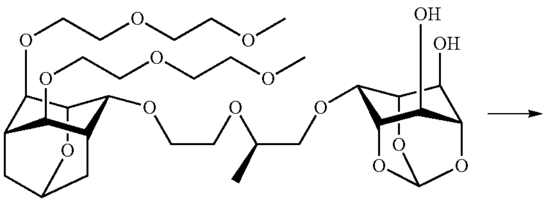
4-8
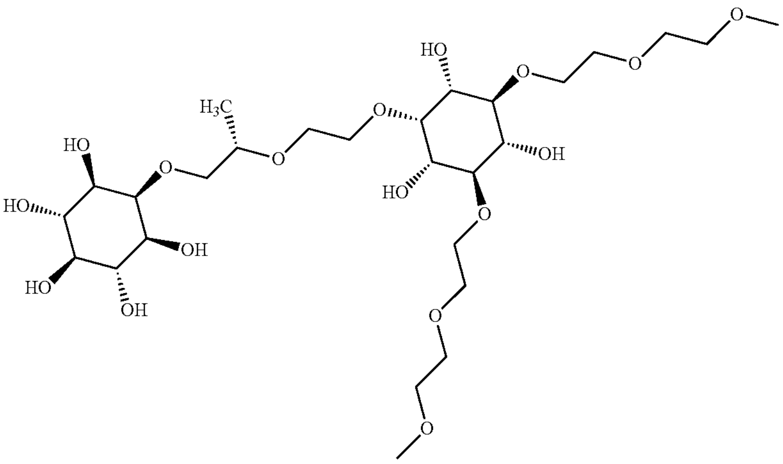
4-9
To a 50 mL single-neck flask were added compound 4-8 (740 mg, 1.11 mmol), MeOH (15 mL) and 0.5 N HCl (15 mL), and the mixture was heated to slight reflux and reacted for 2 h. The reaction solution was directly concentrated to give compound 4-9 (crude, 750 mg).
Ms (ESI): m/z 649$[M+H]^+$.
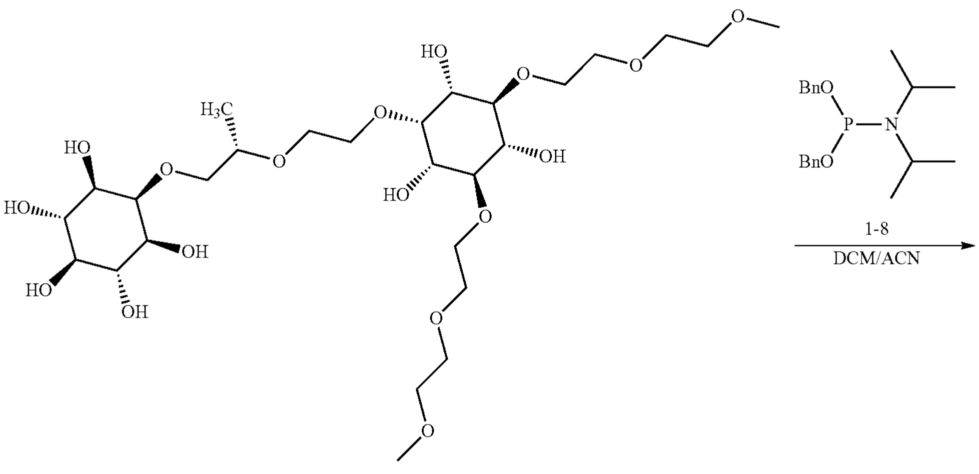
4-9

-continued

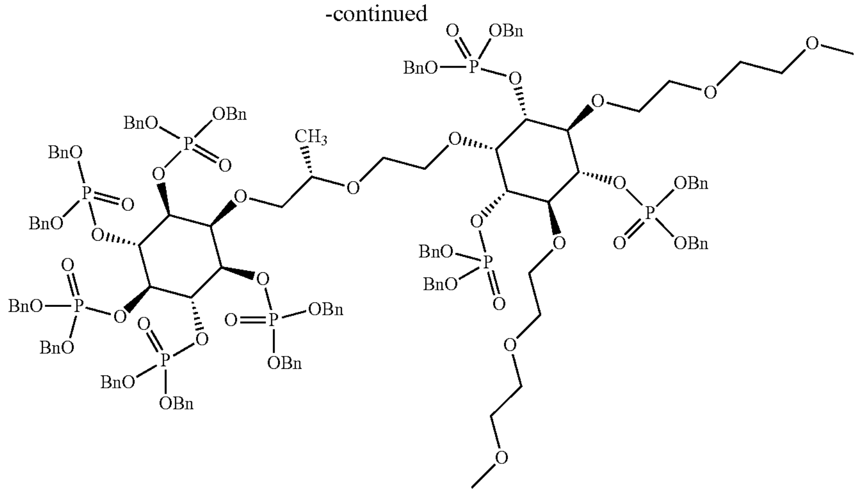

4-10

To a 100 mL single-neck flask were added compound 4-9 (350 mg, 0.54 mmol) and tetrazole (910 mg, 12.96 mmol), and the mixture was dissolved in dichloromethane/acetonitrile (35 mL/15 mL) and reacted for 20 min, followed by the dropwise addition of compound 1-8 (2.24 g). After the addition, the resulting mixture was stirred at room temperature for 1 h. The reaction solution was cooled to about −50° C., and m-chloroperoxybenzoic acid (1.98 g) was added. The mixture was heated to room temperature and stirred for 2 h. The reaction was quenched with water (50 mL), and the reaction solution was extracted with methyl tert-butyl ether. The organic phases were combined, dried over anhydrous sodium sulfate, filtered, and directly concentrated to give a crude product. The crude product was purified by silica gel column chromatography to give compound 4-10 (700 mg, HPLC purity >98%).

$^1$H-NMR (400 MHz, $CDCl_3$) δ 7.40-7.12 (m, 80H), 5.04-4.92 (m, 34H), 4.52 (s, 1H), 4.40-4.02 (m, 7H), 3.81-3.72 (m, 9H), 3.53-3.15 (m, 22H), 1.07 (d, J=6 Hz, 3H).

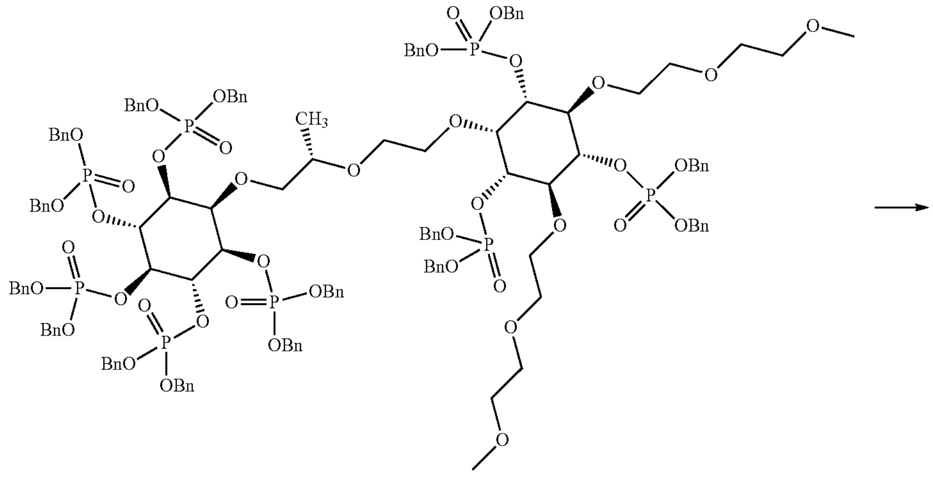

4-10

-continued

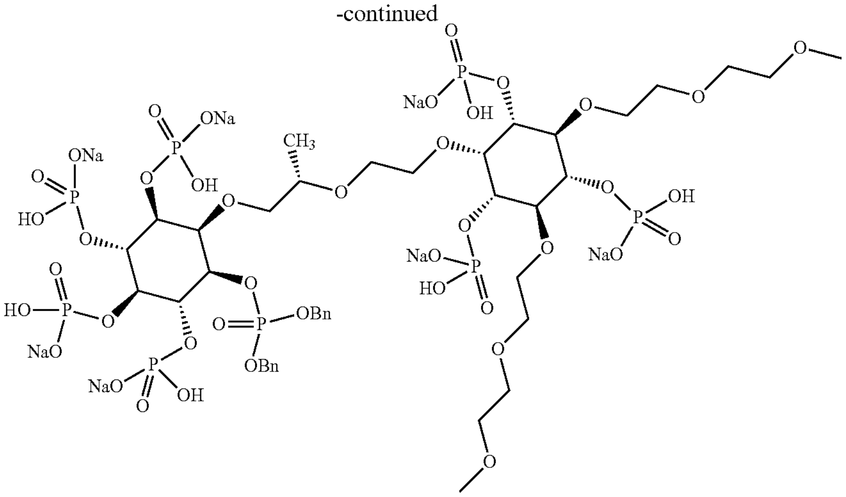

4a

To a 50 mL single-neck flask were added compound 4-10 (537 mg, 0.197 mmol), 20% $Pd(OH)_2/C$ (179 mg, wet), $EtOH/H_2O$ (16 mL/16 mL), and sodium bicarbonate (132 mg). The mixture was reacted for 3 h under hydrogen atmosphere, and filtered. The filtrate was concentrated to remove most of organic solvent, and lyophilized to give the target compound 4a (285 mg, yield: 100%).

$^1$H-NMR (400 MHz, $D_2O$) δ 4.54-4.49 (m, 2H), 4.25-3.63 (m, 42H), 3.42 (s, 6H), 1.35-1.31 (m, 3H).

Example 5

To a 100 mL single-neck flask were added compound 3-1 (0.9 g, 2.43 mmol) and DMAc (3.6 mL), and the mixture was cooled in an ice bath, followed by the addition of t-BuONa (0.47 g, 2.0 eq). After the addition, compound 3-2 (10 g, synthesized by referring to *Organic and Biomolecular Chemistry,* 2006, 4, 2082-2087) was dissolved in DMAc (27 mL), and the solution was added to the above mixture until the reaction was substantially completed. The reaction solution was diluted with water and filtered, and the filter cake was slurried and washed with MTBE. The organic phases were combined, concentrated and crystallized, and filtered to remove the filter cake, and the filtrate was concentrated. The 5a

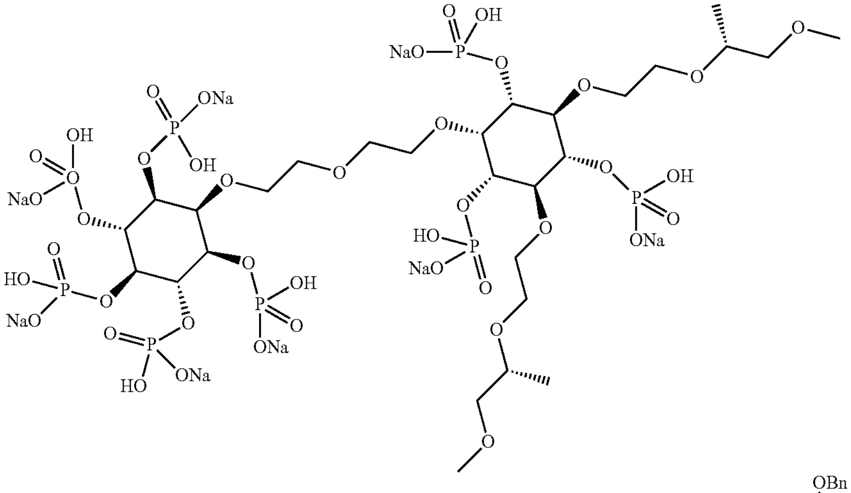

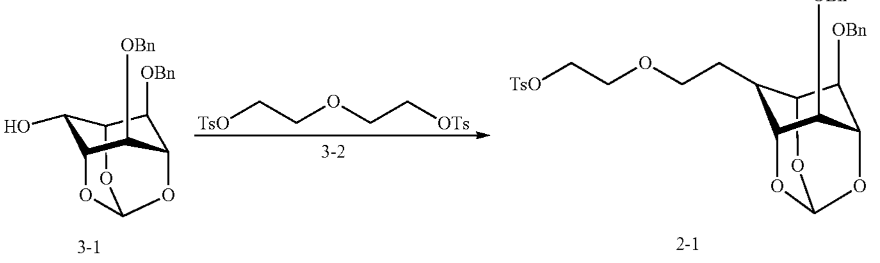

3-1 2-1 crude product was purified by column chromatography to obtain compound 2-1 (1.1 g, 73.9%).

Ms (ESI): m/z 613 $[M+H]^+$.

$^1$H-NMR (400 MHz, CDCl3): δ 7.79-7.77 (d, J=8 Hz, 2H), 7.32-7.26 (m, 12H), 5.51 (s, 1H), 4.70-4.67 (d, J=12 Hz, 2H), 4.58-4.55 (d, J=12 Hz, 2H), 4.45 (s, 1H), 4.36-4.32 (m, 4H), 4.13-4.11 (m, 2H), 3.94 (s, 1H), 3.69-3.62 (m, 6H), 2.42 (s, 3H).

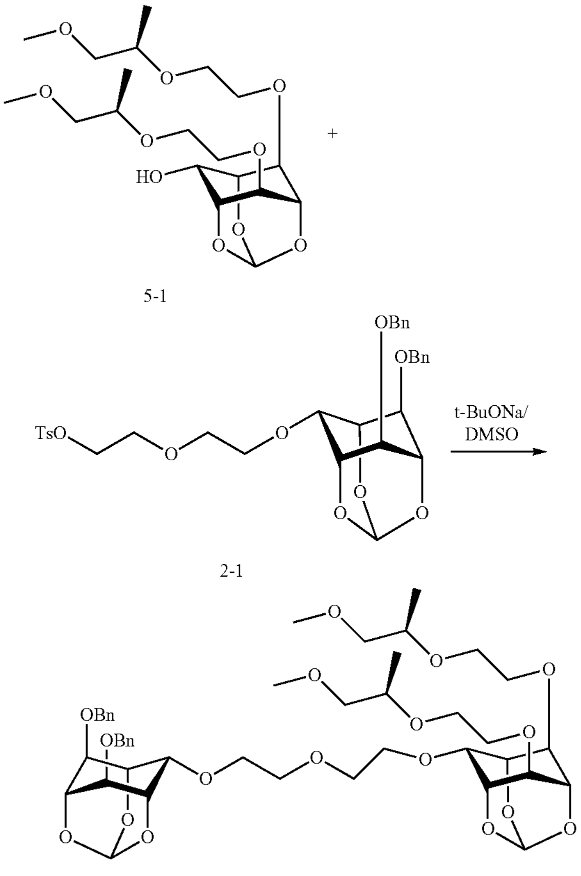

5-1

2-1

5-2

To a 250 mL reaction flask were added compound 5-1 (0.50 g, 1.18 mmol), compound 2-1 (1.09 g, 1.78 mmol) and DMSO (4 mL), and the mixture was dissolved. Sodium tert-butoxide (0.17 g) was added at room temperature. After the addition, the mixture was reacted for 3 h, followed by the addition of methanol (0.2 mL). The resulting mixture was stirred for 0.5 h at room temperature. The reaction solution was added to a 20% ammonium chloride solution and methyl tert-butyl ether, followed by liquid separation. The aqueous phase was extracted with methyl tert-butyl ether, and the organic phases were combined, washed with water and saturated brine, dried over anhydrous sodium sulfate, filtered and concentrated. The crude product was purified by silica gel column chromatography to give compound 5-2 (0.72 g, yield: 70.5%).

Ms (ESI): m/z 863 $[M+H]^+$.

$^1$H-NMR (400 MHz, CDCl3) δ 7.29 (s, 10H), 5.50 (d, J=2.2 Hz, 2H), 4.68 (d, J=11.6 Hz, 2H), 4.58 (d, J=11.6 Hz, 2H), 4.49-4.42 (m, 2H), 4.35-4.34 (m, 6H), 4.30-4.28 (m, 2H), 3.97 (s, 1H), 3.82 (s, 1H), 3.76-3.60 (m, 18H), 3.41-3.27 (m, 10H), 1.14 (d, J=6.3 Hz, 6H).

The procedures of Example 4 were then referred to give the target product 5a. M+HM+H$^1$H-NMR (400 MHz, $D_2O$) δ 4.42 (d, J=9.4 Hz, 2H), 4.17-4.10 (m, 5H), 4.00-3.74 (m, 23H), 3.47-3.38 (m, 4H), 3.31 (s, 6H), 1.11 (d, J=6.4 Hz,

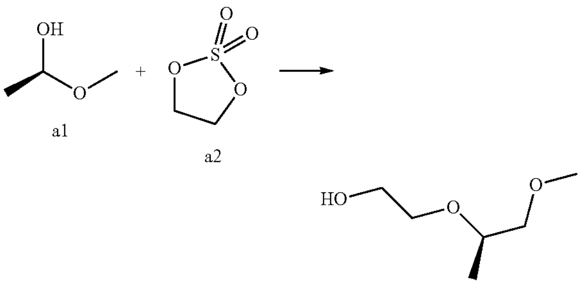

a1 a2 a3

To a 3 L three-neck flask were added compound a1 (1.01 g, 11.3 mmol) and THF (10 mL), and the mixture was cooled in an ice bath, followed by the dropwise addition of NaHMDS (6.19 mL, 1.1 eq). The resulting mixture was reacted in an ice bath for 2 h. Compound a2 (1.53 g) was added in portions to the reaction solution in an ice bath, and reacted for 2 h at room temperature until the reaction was substantially completed. Sulfuric acid and water were added to the reaction solution at room temperature and stirred for 16 h. The reaction solution was filtered, and the filtrate was concentrated. The crude product was distilled to give compound a3 (0.94 g, yield: 62.3%).

Ms (ESI): m/z 135 $[M+H]^+$.

$^1$H-NMR (400 MHz, CDCl3): δ 3.72-3.64 (m, 4H), 3.59-3.52 (m, 1H), 3.40-3.32 (m, 5H), 2.68 (s, 1H), 1.13 (d, 3H, J=6.4 Hz).

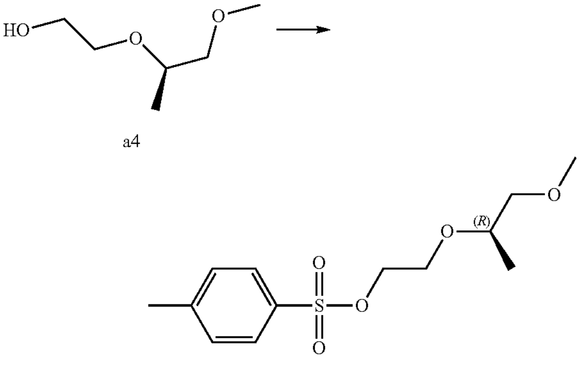

a4 a5

To a 1 L three-neck reaction flask were added compound a4 (0.72 g, 5.39 mmol), $Et_3N$ (0.654 g, 6.46 mmol), DMAP (0.066 g) and DCM (3.6 mL), and the mixture was cooled in an ice bath. Compound TsCl (1.13 g) was dissolved in DCM (3.6 mL), and the solution was added dropwise to the above mixture and reacted at room temperature for 1 h. After the addition, water was added, followed by liquid separation. The organic phase was washed sequentially with dilute hydrochloric acid and brine, dried, and filtered, and the filtrate was concentrated to give compound a5 (1.55 g, yield: 99.8%).

Ms (ESI): m/z 289 $[M+H]^+$.

¹H-NMR (400 MHz, CDCl3): δ 7.80 (d, 2H, J=8.4 Hz), 7.33 (d, 2H, J=8.0 Hz), 4.14 (t, 2H, J=2.4 Hz), 3.71 (t, 2H, J=2.6 Hz), 3.60-3.56 (m, 1H), 3.35-3.25 (m, 5H), 2.44 (s, 3H), 1.08 (d, 3H, J=6.4 Hz).

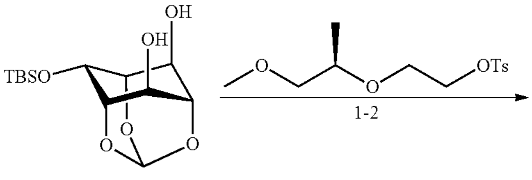

1-1

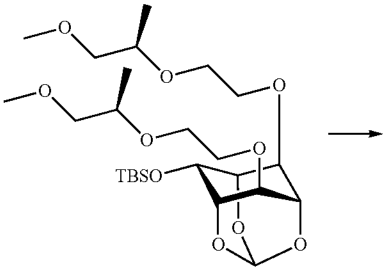

-continued

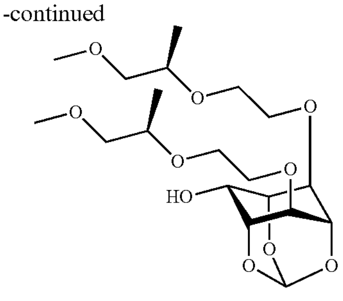

5-1

To a 1 L three-neck reaction flask were added compound 1-1 (0.30 g, 0.986 mmol), compound 1-2 (0.71 g, 2.46 mmol) and THF (4.5 mL), and a solution of NaHMDS in THF (1.7 mL, 3.45 mmol) was added dropwise and reacted until the reaction was substantially completed. The reaction solution was transferred into a 1 L Teflon flask, and cooled in an ice bath, followed by the addition of 65%-70% hydrogen fluoride pyridine solution (1.2 mL). The resulting mixture was reacted at room temperature. The reaction solution was washed with saturated sodium bicarbonate and extracted with dichloromethane. The organic phases were combined, washed with brine, dried over anhydrous sodium sulfate, filtered, and concentrated to dryness. The residue was purified by column chromatography to give compound 5-1 (0.165 g, yield: 40%).

Ms (ESI): m/z 423 $[M+H]^+$.

¹H-NMR (400 MHz, CDCl3): δ 5.46 (s, 1H), 4.47-4.45 (m, 1H), 4.30-4.23 (m, 4H), 4.08 (s, 1H), 3.76-3.71 (m, 2H), 3.67-3.60 (m, 8H), 3.41-3.31 (m, 11H), 1.16-1.15 (m, 6H).

Example 6

6a

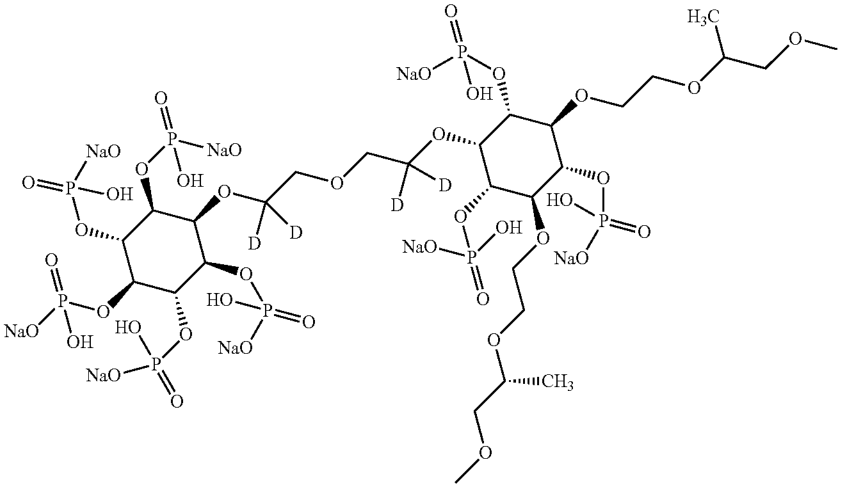

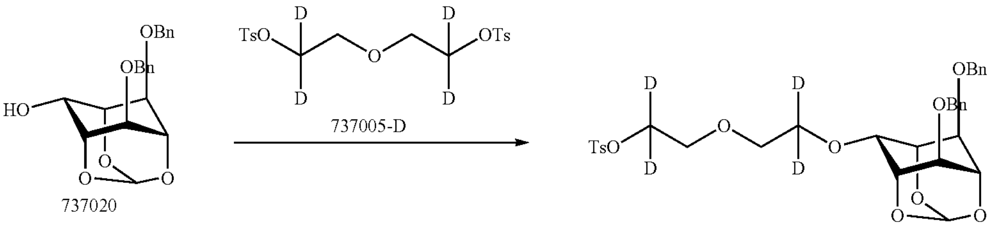

737020

737021-D

-continued

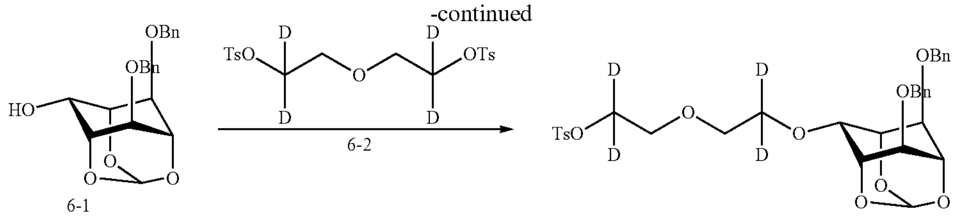

6-1

6-3

Compound 6-1 (0.85 g, 2.3 mmol) was dissolved in DMAc (3.5 mL), and the solution was cooled to 0° C., followed by the addition of t-BuONa (0.44 g, 4.6 mmol). A solution of compound 6-2 (7.7 g, 18.4 mmol, synthesized according to WO200923233A1) in DMAc (26 mL) was added dropwise and reacted until the reaction was substantially completed. The reaction solution was diluted with water (75 mL) and filtered, and the filter cake was slurried and washed with MTBE (80 mL×2). The organic phases were combined, concentrated and filtered, and the filtrate was concentrated. The crude product was purified by column chromatography to obtain compound 6-3 (1 g, 70%).

MS-ESI: m/z 617.2 $[M+H]^+$.

$^1H$ NMR (400 MHz, $CDCl_3$) δ 7.78 (d, J=8.3 Hz, 2H), 7.35-7.24 (m, 12H), 5.49 (s, 1H), 4.68 (d, J=11.6 Hz, 2H), 4.57 (d, J=11.6 Hz, 2H), 4.47-4.42 (m, 1H), 4.38-4.23 (m, 4H), 3.94 (d, J=1.3 Hz, 1H), 3.63 (d, J=24.6 Hz, 4H), 2.42 (s, 3H).

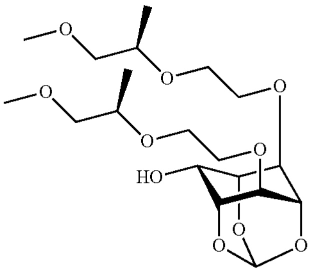

5-1

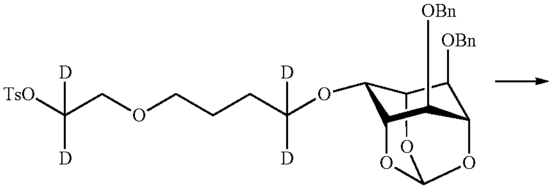

6-3

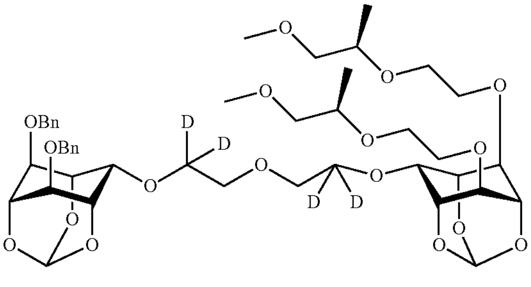

6-4

Compounds 6-3 (1 g, 1.62 mmol) and 5-1 (0.57 g, 1.35 mmol) were dissolved in DMSO (6 mL), and sodium tert-butoxide (0.19 g, 2.0 mmol) was added and reacted at room temperature for 3 h. Methanol (0.2 mL) was added. The resulting mixture was stirred for 0.5 h at room temperature. The reaction solution was added to a 20% ammonium chloride solution (100 mL) and methyl tert-butyl ether (100 mL), followed by liquid separation. The aqueous phase was extracted with methyl tert-butyl ether (50 mL), and the organic phases were combined, washed with water (100 mL) and saturated brine (100 mL), dried over anhydrous sodium sulfate, filtered and concentrated. The residue was purified by column chromatography to give 6-4 (1.05 g, yield: 90%).

MS-ESI: m/z 867.4 $[M+H]^+$.

$^1H$ NMR (400 MHz, CDCl3) δ 7.29 (s, 10H), 5.50 (d, J=2.6 Hz, 2H), 4.68 (d, J=11.7 Hz, 2H), 4.58 (d, J=11.7 Hz, 2H), 4.48-4.42 (m, 2H), 4.41-4.25 (m, 8H), 3.96 (s, 1H), 3.81 (s, 1H), 3.76-3.54 (m, 14H), 3.41-3.28 (m, 9H), 3.22 (s, 1H), 1.14 (d, J=6.2 Hz, 6H).

The procedures of Example 4 were then referred to give the target product 6a.

$^1H$ NMR (400 MHz, D2O) δ 4.38 (dd, J=19.1, 9.6 Hz, 2H), 4.19-3.59 (m, 24H), 3.50-3.38 (m, 4H), 3.31 (s, 6H), 1.11 (d, J=6.4 Hz, 6H).

Example 7

7a

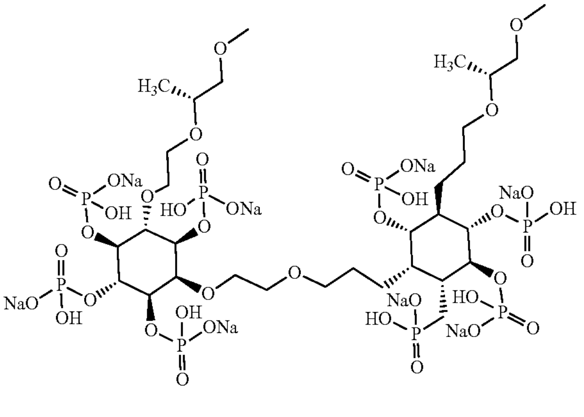

The procedures of Example 4 were referred to give the target product 7a.

$^1H$ NMR (400 MHz, D2O) δ 4.35 (dd, J=19.0, 9.5 Hz, 2H), 4.10-3.67 (m, 28H), 3.44-3.36 (m, 4H), 3.29 (s, 6H), 1.09 (d, J=4.0 Hz, 6H).

Example 8

8a

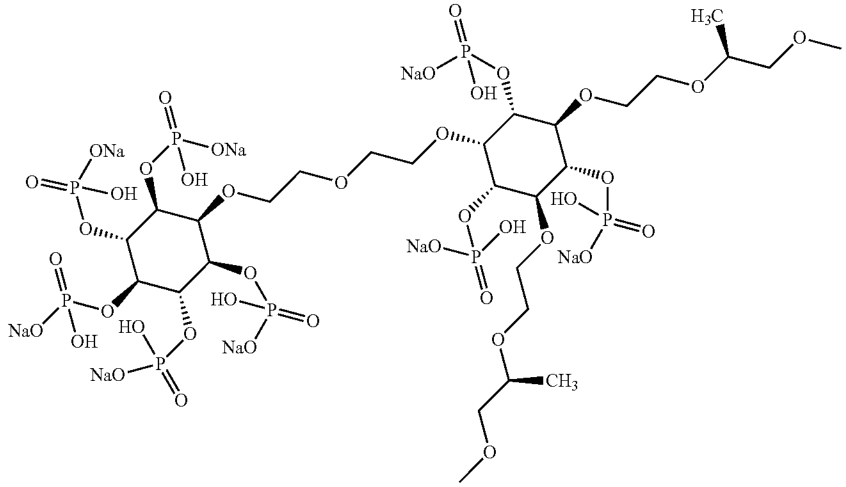

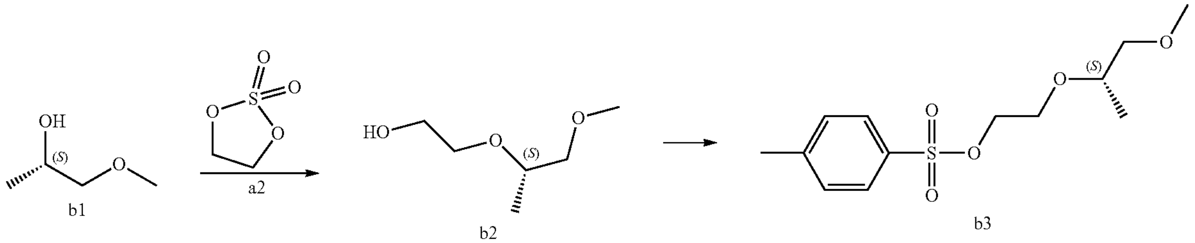

b1 b2 b3

Compound b1 (10.0 g, 11.1 mmol) was dissolved in THF (100 mL) and cooled to 0° C. NaHMDS (61 mL, 122.0 mmol) was added dropwise and reacted at 0° C. for 2 h. Compound a2 (15.2 g, 122.0 mmol) was added in portions and reacted at room temperature for 2 h. Sulfuric acid (61 mL) and water (61 mL) were added at room temperature and stirred for 16 h. NaOH was added to adjust pH to neutrality, and the reaction solution was filtered and concentrated. The residue was dissolved in methylene chloride (70 mL), and TEA (14.0 g) and DMAP (1.4 g) were sequentially added at room temperature, followed by the addition of a solution of TsCl (24.2 g) in methylene chloride (70 mL) in an ice bath. The resulting mixture was reacted at room temperature for 2 h. The reaction solution was washed sequentially with water and dilute hydrochloric acid. The organic phase was concentrated, and the residue was purified by column chromatography to give compound b3 (23 g, yield over two steps: 70%).

MS-ESI: m/z 289.1 $[M+H]^+$.

$^1$H-NMR (400 MHz, CDCl3) δ 7.79 (d, 2H, J=8.4 Hz), 7.32 (d, 2H, J=8.4 Hz), 4.13 (t, 2H, J=5.2 Hz), 3.70 (t, 2H, J=5.2 Hz), 3.61-3.54 (m, 1H), 3.32-3.24 (m, 5H), 2.43 (s, 3H), 1.07 (d, 3H, J=6.4 Hz).

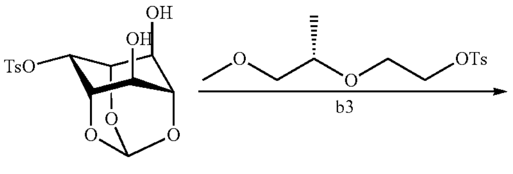

8-1

-continued

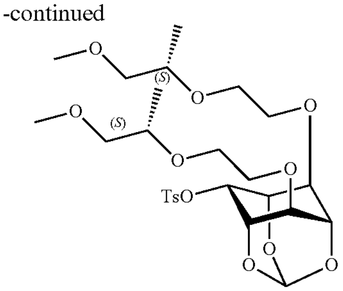

8-2

Compound 8-1 (4.0 g, 11.6 mmol, synthesized according to *Carbohydrate Research,* 2002, 337, 2399-2410) and b3 (7.0 g, 24.4 mmol) were dissolved in DMSO (40 mL), and sodium tert-butoxide (2.8 g) was added at room temperature and reacted for 16 h. The reaction was extracted with water and EA, followed by liquid separation. The organic phase was concentrated, and the residue was purified by column chromatography to give compound 8-2 (3.8 g, yield: 56%).

MS-ESI: m/z 577.2 $[M+H]^+$.

$^1$H-NMR (400 MHz, CDCl3) δ 7.86 (d, J=8.4 Hz, 2H), 7.35 (d, J=8.4 Hz, 2H), 5.46 (d, J=0.8 Hz, 1H), 5.04 (d, J=1.2 Hz, 1H), 4.45-4.43 (m, 1H), 4.27-4.21 (m, 4H), 3.68-3.58 (m, 10H), 3.41-3.30 (m, 10H), 2.44 (s, 3H), 1.15-1.13 (m, 6H).

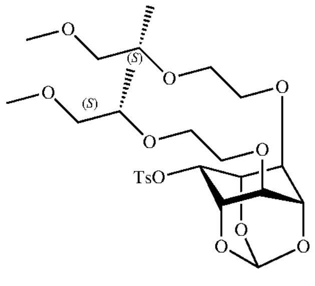

8-3

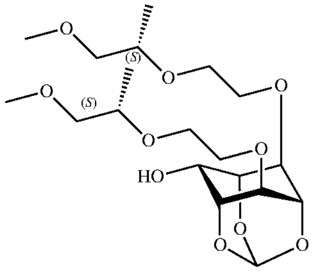

8-4

Compound 8-3 (2.0 g, 3.47 mmol) was dissolved in methanol (20 mL), and a solution of 30% sodium methoxide in methanol (10 mL) was added. The mixture was heated to 70° C. and reacted for 3 h. The reaction solution was concentrated by rotary evaporation to remove methanol, and the residue was dissolved in water until it was clarified, extracted with dichloromethane, and concentrated to give compound 8-4 (1.3 g, yield: 88%).

MS-ESI: m/z 423.2 $[M+H]^+$.

The procedures of Example 4 were then referred to give the target product 8a.

$^1H$ NMR (400 MHz, $D_2O$) δ 4.38 (dd, J=19.0, 9.5 Hz, 2H), 4.21-3.55 (m, 28H), 3.47-3.35 (m, 4H), 3.30 (s, 6H), 1.09 (d, J=6.4 Hz, 6H).

Test Example 1

The inhibition effect of the test compounds on the generation of the human plasma hydroxyapatite (HAP) was determined by the spectrophotometric pharmacodynamics (PD) assay.

Experimental Procedures 1.1 Preparation of Reagents

1) Human plasma anticoagulated with EDTA-K2.

2) Mixed solution: disodium hydrogen phosphate 5 mM, calcium chloride 41.67 mM, adjusted to pH 7.4 and filtered through a 0.22 μm filter.

3) Sodium chloride solution: 0.15 M, adjusted to pH 7.4 and filtered through a 0.22 μm filter.

2.1 Test Procedures

1) The test compounds were prepared using a 0.15 M sodium chloride solution.

2) The human plasma sample was reprocessed. A sufficient amount of plasma was taken and centrifuged at room temperature at 10000 g for 30 min for later use.

3) The plasma was added to a 96 well plate at 75 μL/well.

4) The candidate drug was added at 5 μL/well.

5) The mixed solution of disodium hydrogen phosphate and calcium chloride was added at 120 μL/well, with expected final concentrations of 1.5 mM and 12.5 mM, respectively.

6) The plate was incubated at room temperature (25° C.) on a shaker (750 rpm), and the absorbance at a wavelength of 550 nm was measured every 3 min.

7) The final reading was set as the slope of the change in absorbance between 6 min and 24 min.

3 Calculation Formula $$\text{Crystallization inhibition rate (\%)} = \frac{\text{Slope (blank control)} - \text{Slope (blank control)}}{\text{Slope (blank control)}} \times 100\%$$

4 Experimental Results

| Sample | IC50 (Mean ± SD, nM) |
|---|---|
| INS 3001 | 1864 ± 142 |
| 1a (Example 1) | 306 ± 104 |
| 2a (Example 2) | 230 ± 163 |
| 3a (Example 3) | 343 ± 154 |

Note:
INS 3001 was prepared by referring to the method described in CN108367080

Test Example 2

1 Experimental Objective

In a $Na_2HPO_4$ and NaCl buffer system, the crystallization process of hydroxyapatite (HAP) is initiated by adding high-concentration $CaCl_2$, and HAP crystals have a maximum absorption peak at a wavelength of 550 nm. The absorption peak intensity of the HAP crystals is positively correlated with the content of HAP in the system. The compound has the functions of binding to the HAP crystals and inhibiting the formation and growth of the HAP crystals. Therefore, the inhibitory activity of different series of compounds on the formation of the HAP crystals is evaluated by measuring the OD value of an inorganic salt solution system at 550 nm.

2 Experimental Procedures

1) Preparation of an inorganic salt system: 25 mM $CaCl_2$ solution; 55 mM $Na_2HPO_4.12H_2O$ solution; 1.5 M NaCl solution;

2) mixed solution: 55 mM $Na_2HPO_4 \cdot 12H_2O$, 1.5 M NaCl and $ddH_2O$ were added according to the volume ratio of 1:1:6, and adjusted to pH 7.4;

3) 160 μL of the mixed solution was added to a 96-well plate, and 20 μL of each of the compound solutions at different concentrations (100 μM, 30 μM, 10 μM, 3 μM, 1 μM, 0.3 μM, 0.1 μM, and 0.01 μM);

4) 25 mM $CaCl_2$ solution was added at 20 μL/well;

5) the plate was placed on a shaker (300 rpm) for uniformly mixing for 30 s; and 6) the absorbance at a wavelength of 550 nm was measured every 3 min at room temperature (the plate was placed on a shaker (300 rpm) for uniformly mixing for 30 s before measurement). The measurement time was 60 min.

3 Experimental Results

The formation of the HAP crystals was determined in a 96-well plate by monitoring absorbance. The absorbance at a wavelength of 550 nm was read every 3 min, and the plate was shaken continuously on a shaker for 1 h. Two linear equations were derived for the OD values during the reading of each experimental well: the first one represents a line of baseline absorbance with a slope approaching 0, and the second one represents the maximum slope of the increase of the baseline absorbance. The induction time of each sample for the information of HAP was calculated, and the intersection between the two lines (baseline absorbance and maximum slope of increase) represents the time required for the formation of the HAP crystals. The induction time was determined for each of the compounds at different concentrations and compared to the control induction time. IC50 was determined by nonlinear fitting of the time-concentration curve using GraphPad software.

TABLE 1

| Compound | IC50 (μM) |
|---|---|
| 1a | 1.04 ± 0.54 |
| 2a | 4.04 ± 2.55 |
| 3a | 5.19 ± 0.31 |
| 5a | 1.13 ± 0.26 |
| 7a | 1.35 ± 0.14 |
| 8a | 1.73 ± 0.57 |

Reference: Mechanism of action of SNF472, a novel calcification inhibitor to treat vascular calcification and calciphylaxis [J]. *British Journal of Pharmacology,* 2020, 177(19).

The invention claimed is:

1. A compound or a pharmaceutically acceptable salt thereof selected from the group consisting of:

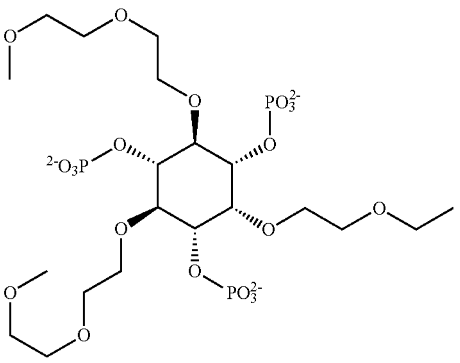

-continued

5a

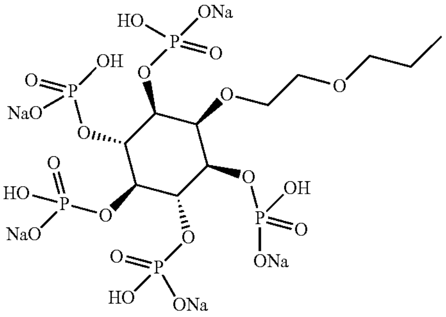

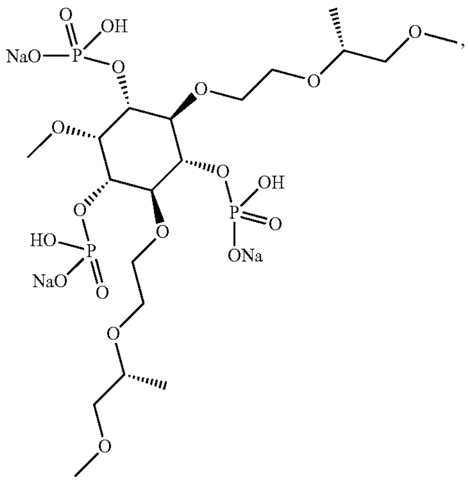

,

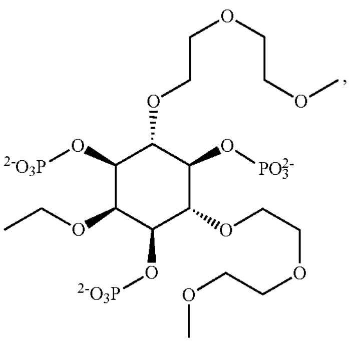

,

7a

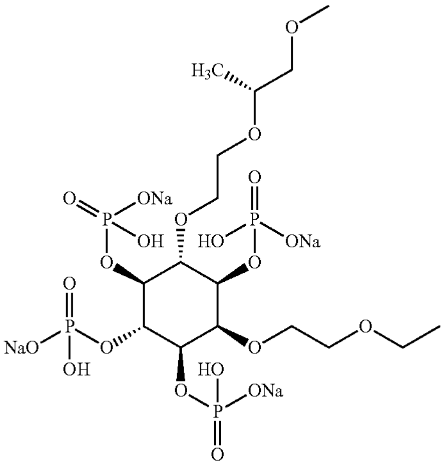

-continued
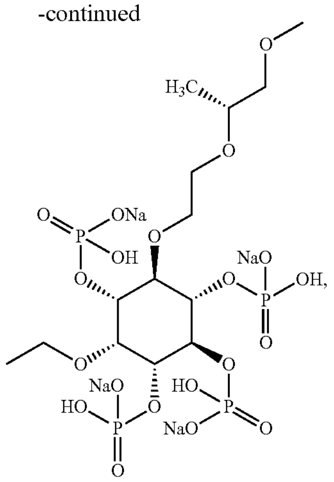
and
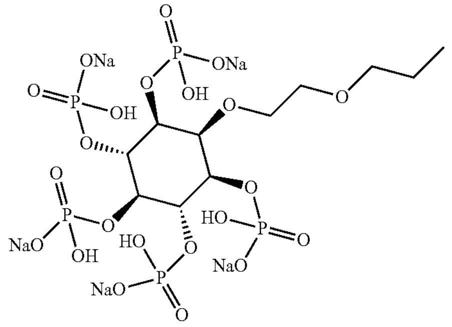
-continued
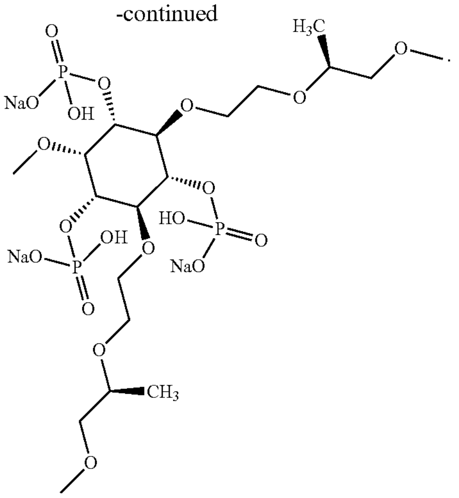
2. The compound or the pharmaceutically acceptable salt thereof of claim 1, wherein the compound or the pharmaceutically acceptable salt thereof is
8a
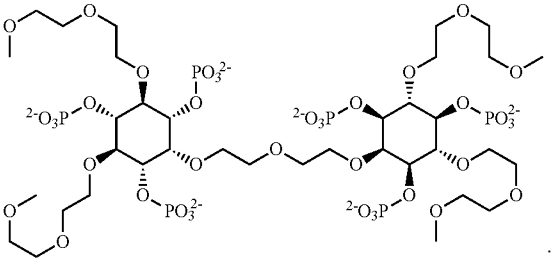
3. The compound or the pharmaceutically acceptable salt thereof of claim 1, wherein the compound or the pharmaceutically acceptable salt thereof is
5a
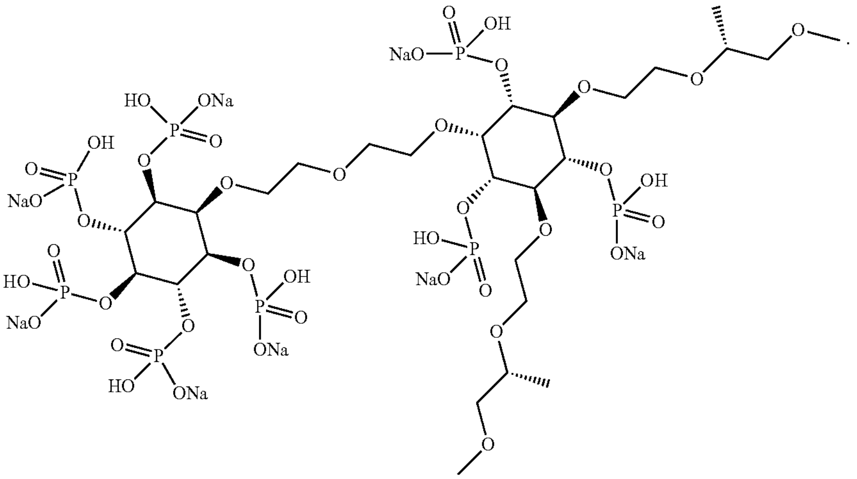

4. The compound or the pharmaceutically acceptable salt thereof of claim 1, wherein the compound or the pharmaceutically acceptable salt thereof is

7A

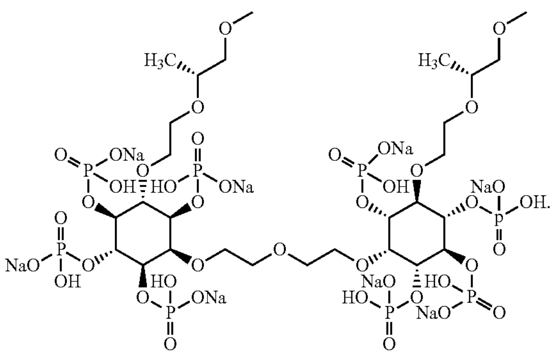

5. The compound or the pharmaceutically acceptable salt thereof of claim 1, wherein the compound or the pharmaceutically acceptable salt thereof is 8a

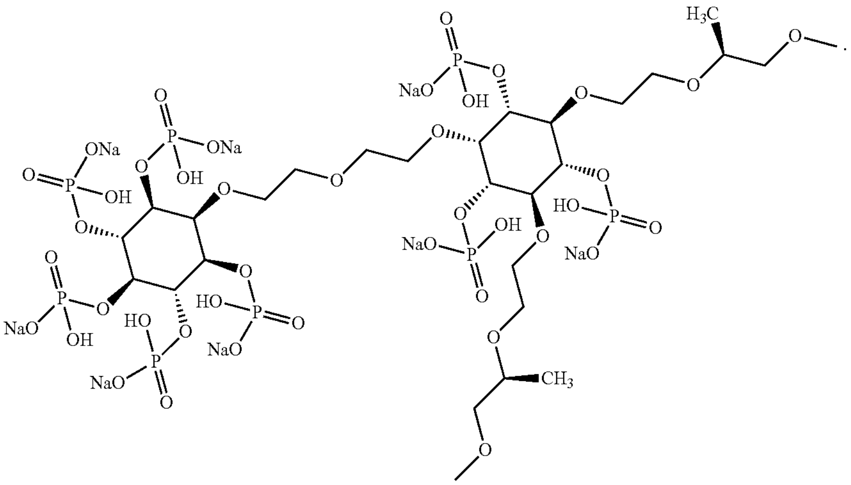

6. A pharmaceutical composition, comprising the compound or the pharmaceutically acceptable salt thereof according to claim 1 and a pharmaceutically acceptable carrier.

7. The pharmaceutical composition of claim 6, wherein the compound or the pharmaceutically acceptable salt thereof is

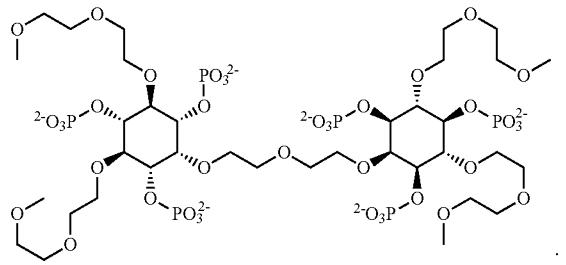

8. The pharmaceutical composition of claim 6, wherein the compound or the pharmaceutically acceptable salt thereof is 5a
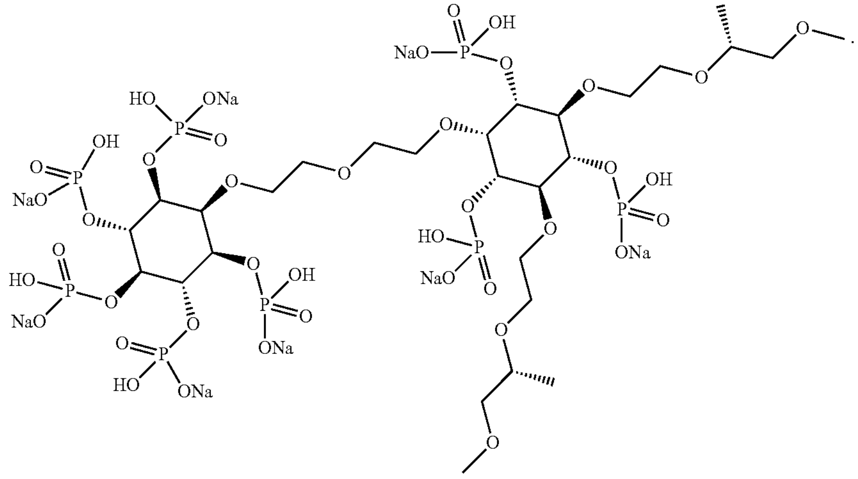
9. The pharmaceutical composition of claim 6, wherein the compound or the pharmaceutically acceptable salt thereof is
7A
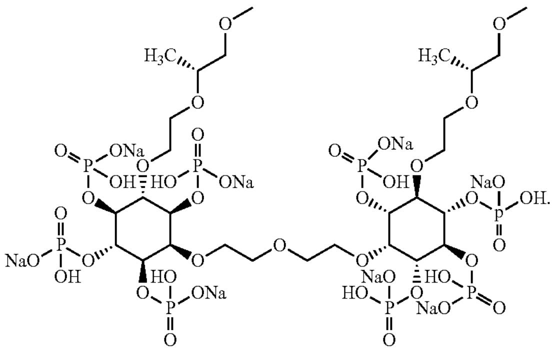
10. The pharmaceutical composition of claim 6, wherein the compound or the pharmaceutically acceptable salt thereof is
8a
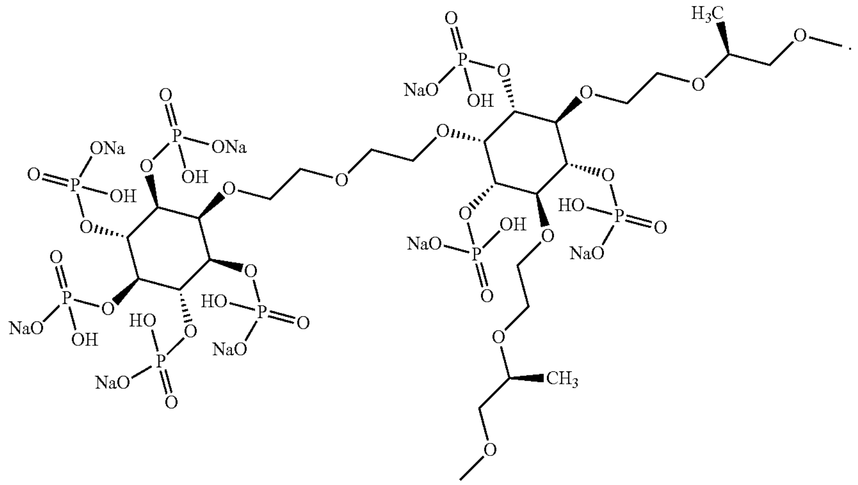
* * * * *